(12) United States Patent
Cohen et al.

(10) Patent No.: US 8,786,574 B2
(45) Date of Patent: Jul. 22, 2014

(54) E-PAPER EXTERNAL CONTROL SYSTEM AND METHOD

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 801 days.

(21) Appl. No.: 12/313,673

(22) Filed: Nov. 20, 2008

(65) Prior Publication Data

US 2010/0123689 A1    May 20, 2010

(51) Int. Cl.
*G06F 3/042* (2006.01)

(52) U.S. Cl.
USPC ......................................................... 345/175

(58) Field of Classification Search
CPC ..................................................... G06F 3/042
USPC ............ 345/175, 156, 211; 200/314; 455/3.06
See application file for complete search history.

(56) References Cited

U.S. PATENT DOCUMENTS

| | | | |
|---|---|---|---|
| 4,229,617 A | 10/1980 | Bellino et al. | |
| 4,714,364 A | 12/1987 | Takada | |
| 5,818,165 A | 10/1998 | Malhi | |
| 5,838,889 A | 11/1998 | Booker | |
| 5,921,582 A | 7/1999 | Gusack | |
| 6,243,075 B1 | 6/2001 | Fishkin et al. | |
| 6,297,838 B1 | 10/2001 | Chang et al. | |
| 6,334,063 B1 | 12/2001 | Charlier et al. | |
| 6,577,496 B1 | 6/2003 | Gioscia et al. | |
| 6,710,754 B2 | 3/2004 | Hanson et al. | |
| 6,943,773 B2 | 9/2005 | Wong et al. | |
| 7,023,418 B2 | 4/2006 | Nakamura et al. | |
| 7,109,967 B2 | 9/2006 | Hioki et al. | |
| 7,195,170 B2 | 3/2007 | Matsumoto et al. | |
| 7,196,689 B2 | 3/2007 | Moriyama | |
| 7,221,865 B2 | 5/2007 | Nonaka | |
| 7,236,291 B2 | 6/2007 | Kaga et al. | |

(Continued)

FOREIGN PATENT DOCUMENTS

| | | |
|---|---|---|
| JP | 2005-165129 | 6/2005 |
| WO | WO 2006/040725 A1 | 4/2006 |
| WO | WO 2007/111382 A1 | 10/2007 |

OTHER PUBLICATIONS

"Samsung i7: Digital Photography Review"; dpreview.com; Jan. 29, 2007; pp. 1-3; located at http://www.dpreview.com/news/2007/01/29/samsungi7.

(Continued)

*Primary Examiner* — Fred Tzeng

(57) ABSTRACT

A system for one or more portions of one or more regions of an electronic paper assembly having one or more display layers includes, but is not limited to: obtaining first information regarding one or more positions of one or more portions of one or more regions of the electronic paper assembly and sending one or more application related information portions to the electronic paper assembly based upon the obtaining of the first information. In addition to the foregoing, other related method/system aspects are described in the claims, drawings, and text forming a part of the present disclosure.

34 Claims, 56 Drawing Sheets

(56) References Cited

U.S. PATENT DOCUMENTS

| | | | |
|---|---|---|---|
| 7,292,231 B2 | 11/2007 | Kodama et al. | |
| 7,633,491 B2 | 12/2009 | Okamoto | |
| 7,639,417 B2 | 12/2009 | Kobayashi et al. | |
| 7,876,312 B2 | 1/2011 | Kodama et al. | |
| 7,880,718 B2 | 2/2011 | Cradick et al. | |
| 7,953,462 B2 | 5/2011 | Harry | |
| 2003/0098857 A1 | 5/2003 | Gettemy et al. | |
| 2003/0163527 A1 | 8/2003 | Hsu | |
| 2004/0008191 A1 | 1/2004 | Poupyrev et al. | |
| 2004/0113865 A1 | 6/2004 | Oku et al. | |
| 2005/0110702 A1 | 5/2005 | Aoki et al. | |
| 2005/0234785 A1 | 10/2005 | Burman et al. | |
| 2005/0283472 A1 | 12/2005 | Hayashi et al. | |
| 2006/0203327 A1 | 9/2006 | Yasuda | |
| 2006/0208328 A1 | 9/2006 | Sano et al. | |
| 2006/0238494 A1 | 10/2006 | Narayanaswami et al. | |
| 2006/0274036 A1 | 12/2006 | Hioki et al. | |
| 2007/0057935 A1* | 3/2007 | Takagi | 345/211 |
| 2007/0188450 A1 | 8/2007 | Hernandez et al. | |
| 2007/0194166 A1 | 8/2007 | Reinsel et al. | |
| 2007/0242033 A1 | 10/2007 | Cradick et al. | |
| 2007/0247412 A1 | 10/2007 | Yu | |
| 2007/0247422 A1 | 10/2007 | Vertegaal et al. | |
| 2007/0252804 A1 | 11/2007 | Engel et al. | |
| 2007/0273609 A1 | 11/2007 | Yamaguchi et al. | |
| 2008/0080010 A1 | 4/2008 | Korst | |
| 2008/0088727 A1 | 4/2008 | Nagata et al. | |
| 2008/0129647 A1 | 6/2008 | Canova | |
| 2008/0179173 A1* | 7/2008 | Jung et al. | 200/314 |
| 2008/0180399 A1 | 7/2008 | Cheng | |
| 2008/0192013 A1 | 8/2008 | Barrus et al. | |
| 2008/0266273 A1 | 10/2008 | Slobodin et al. | |
| 2008/0303782 A1 | 12/2008 | Grant et al. | |
| 2009/0113775 A1 | 5/2009 | Netter | |
| 2009/0122504 A1 | 5/2009 | Lee | |
| 2009/0171751 A1 | 7/2009 | Zhou et al. | |
| 2009/0231252 A1 | 9/2009 | Maegawa | |
| 2010/0053067 A1 | 3/2010 | Cohen et al. | |
| 2010/0053075 A1 | 3/2010 | Cohen et al. | |
| 2010/0053076 A1 | 3/2010 | Cohen et al. | |
| 2010/0053217 A1 | 3/2010 | Cohen et al. | |
| 2010/0060564 A1 | 3/2010 | Cohen et al. | |
| 2010/0060565 A1 | 3/2010 | Cohen et al. | |
| 2010/0064244 A1 | 3/2010 | Kilpatrick, II et al. | |
| 2010/0073263 A1 | 3/2010 | Cohen et al. | |
| 2010/0073333 A1 | 3/2010 | Cohen et al. | |
| 2010/0073334 A1 | 3/2010 | Cohen et al. | |
| 2010/0085277 A1 | 4/2010 | Cohen et al. | |
| 2010/0113161 A1 | 5/2010 | Walker et al. | |
| 2010/0117954 A1* | 5/2010 | Cohen et al. | 345/156 |
| 2010/0117955 A1* | 5/2010 | Cohen et al. | 345/156 |
| 2010/0123689 A1 | 5/2010 | Cohen et al. | |
| 2010/0124879 A1* | 5/2010 | Cohen et al. | 455/3.06 |
| 2010/0208328 A1 | 8/2010 | Heikenfeld et al. | |
| 2013/0115715 A1 | 5/2013 | Hanning | |

OTHER PUBLICATIONS

"Bright, full color e-paper under development by Ricoh"; DIGINFO TV; Feb. 8, 2013; printed on Apr. 28, 2014; pp. 1-3; Digitized Information, Inc.; located at: http://www.diginfo.tv/v/13-0006-r-en.php.

Eaton, Kit; "Color E-Paper Debuts on Waterproof MP3 Player"; GIZMODO; Oct. 20, 2008; printed on Apr. 28, 2014; pp. 1-5; gizmodo.com; located at: http://gizmodo.com/5065814/color-e-paper-debuts-on-waterproof-mp3-player.

Gizmag Team; "Fujitsu's second-gen color e-paper—brightness x 1.3, re-write speed x 2, contrast x 3"; Gizmag; May 9, 2010; printed on Apr. 28, 2014; pp. 1-5; gizmag.com; located at: http://www.gizmag.com/fujitsu-new-color-e-paper/15026/.

Heikenfeld et al.: "Review Paper: A critical review of the present and future prospects for electronic paper"; Journal of the SID; 2011, accepted on Jan. 3, 2011; pp. 129-156; vol. 19, No. 2; Society for Information Display.

Hsu et al.; "Power-Scalable Multi-Layer Halftone Video Display for Electronic Paper"; ICME; 2008; pp. 1445-1448; IEEE.

McKeegan, Noel; "Fujitsu advances color e-paper technology"; Gizmag; Oct. 10, 2007; printed on Apr. 28, 2014; pp. 1-4; gizmag.com; located at: http://www.gizmag.com/go/8152/.

* cited by examiner

FIG. 19B

535 Other Modules

| 536 Position Detection Module | 537 Relative Position Obtaining Module | 538 RFID Obtaining Module | 539 Edge Obtaining Module | 540 Inclinometer Obtaining Module |
| --- | --- | --- | --- | --- |
| 541 Accelerometer Obtaining Module | 542 Gyroscopic Obtaining Module | 543 Inertial Obtaining Module | 544 Geographical Obtaining Module | 545 Reference Obtaining Module |
| 546 GPS Obtaining Module | 547 Table Obtaining Module | 548 Position Obtaining Module | 549 Edge Detection Module | 550 Beacon Obtaining Module |
| 551 Light Obtaining Module | 552 Triangulation Obtaining Module | 553 Audio Obtaining Module | 554 Map Location Obtaining Module | 555 Location Obtaining Module |
| 556 First Info Sending Module | 557 Conformation Sending Module | 558 Conformation Change Module | 559 Sequence Sending Module | 560 Sequence Change Module |
| 561 Orientation Sending Module | 562 Orientation Change Module | 563 Sequence Sending Module | 564 Sequence Change Module | 565 Orientation Sending Module |
| 566 Orientation Change Module | 567 Sequence Sending Module | 568 Sequence Change Module | 569 Location Sending Module | 570 Other Modules |

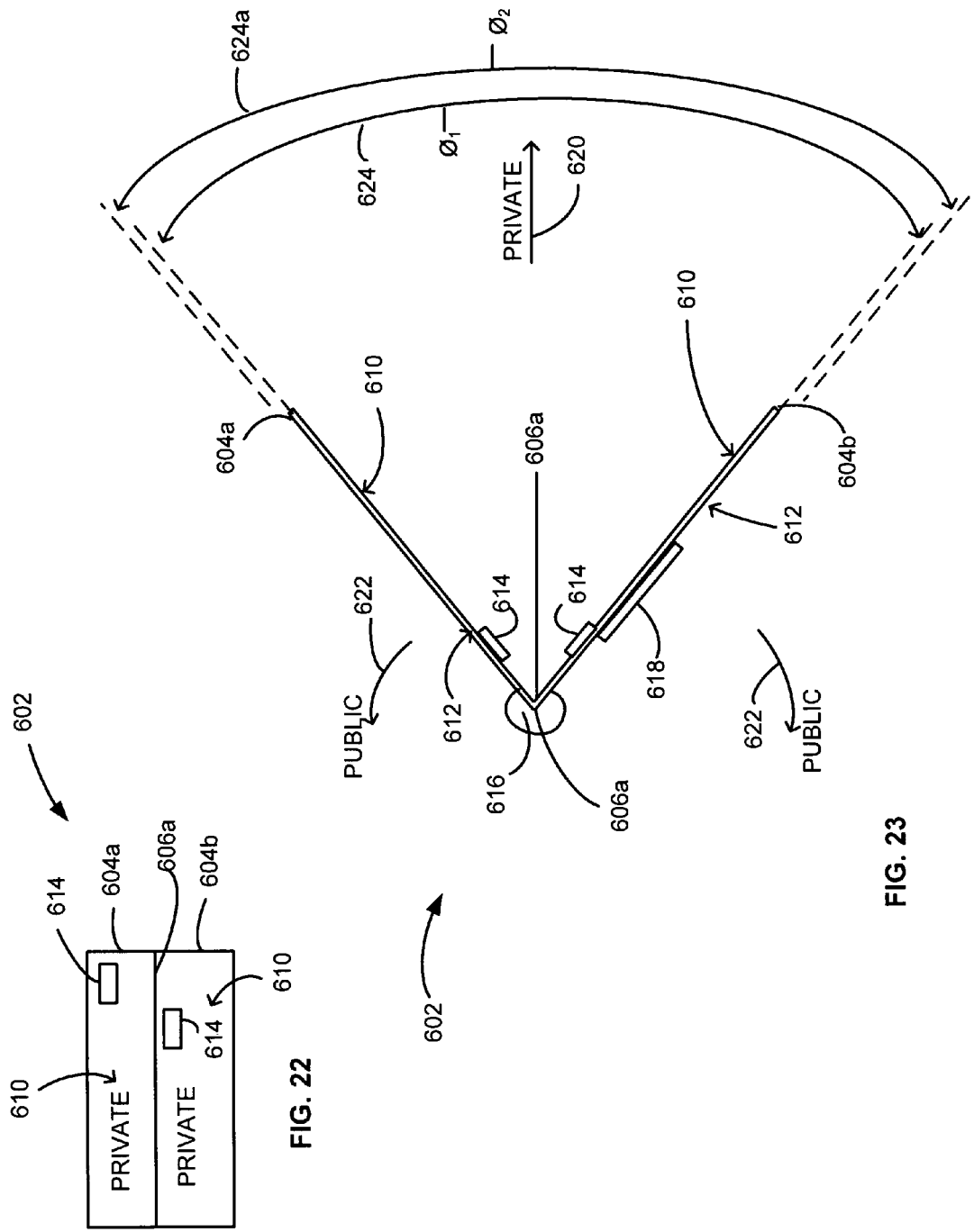

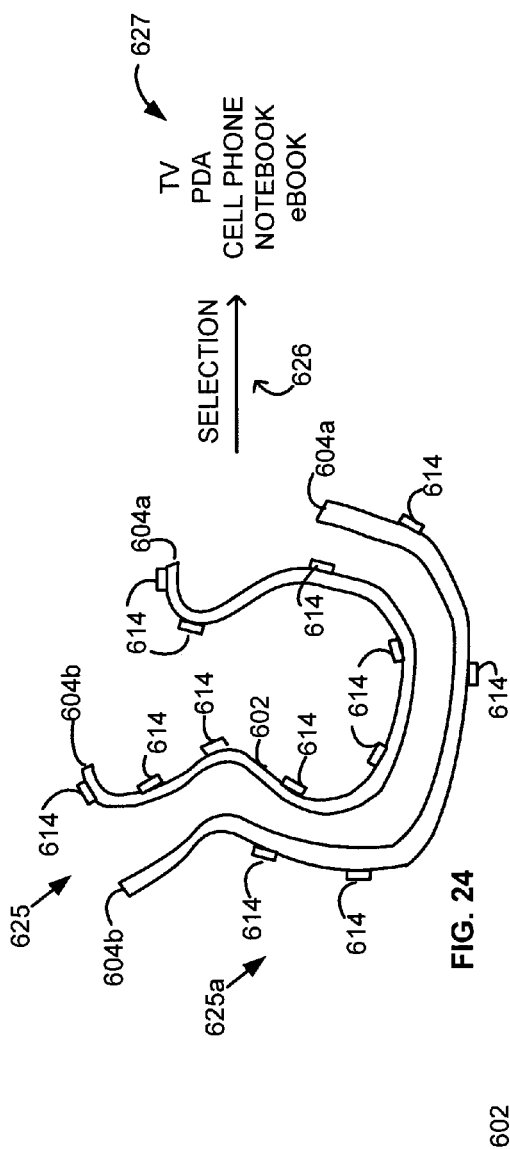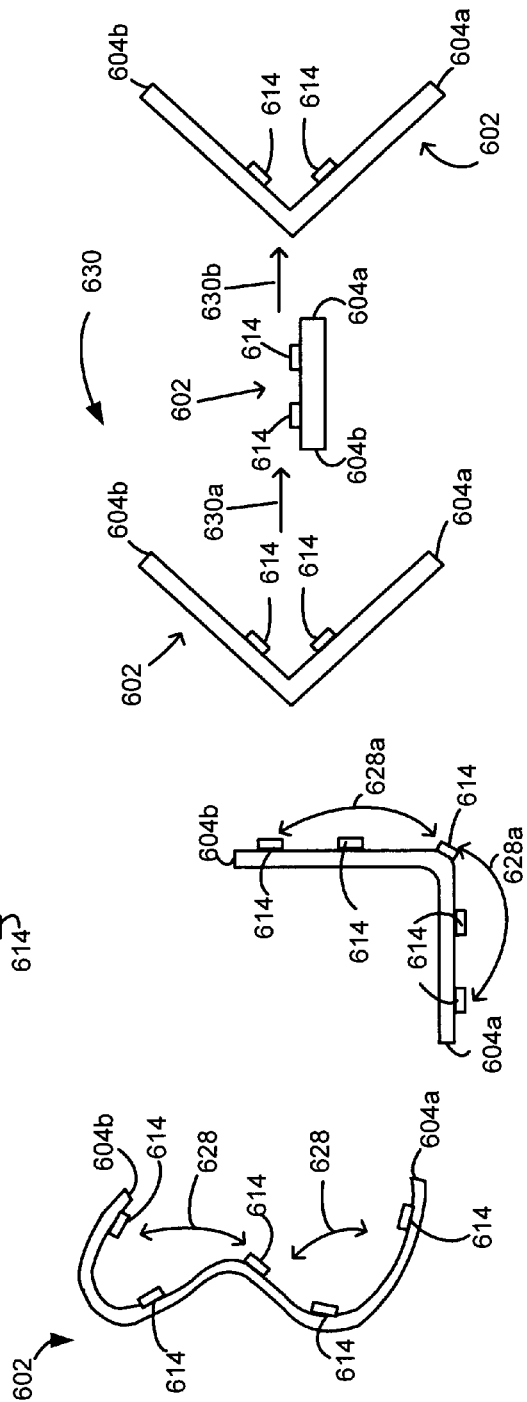

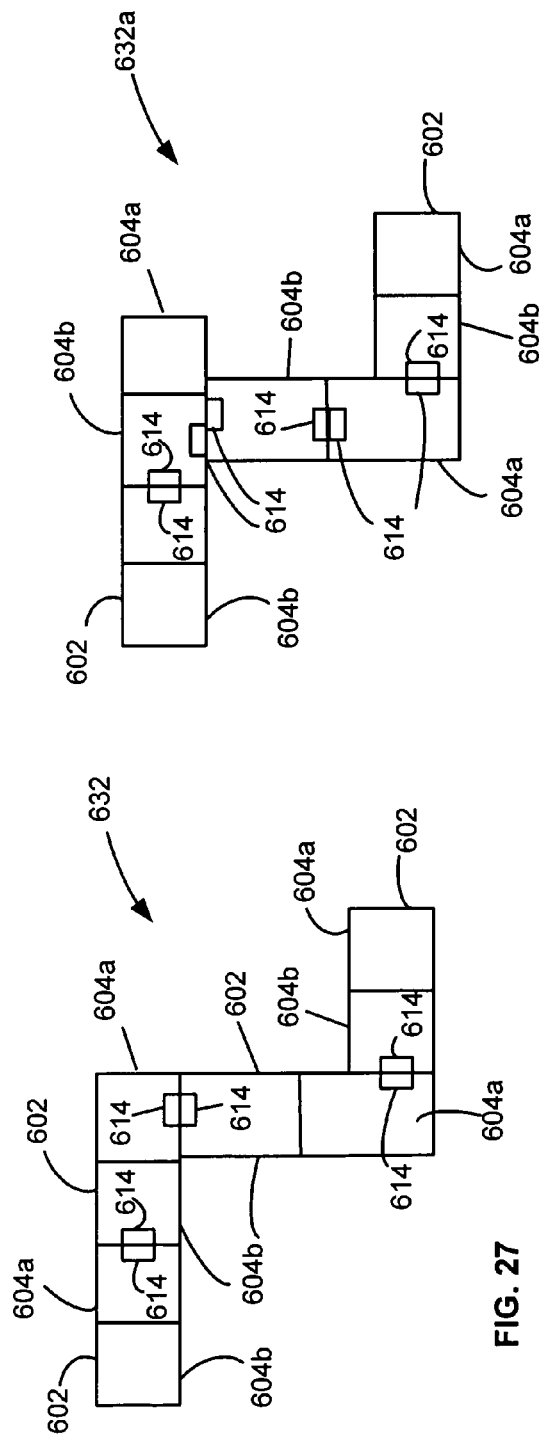
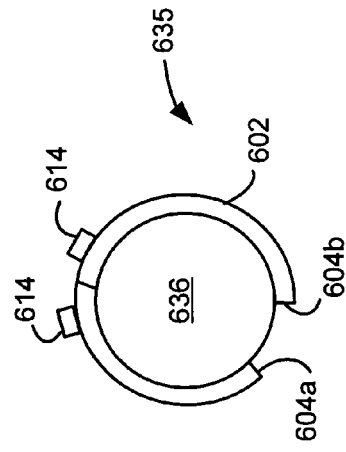
FIG. 29
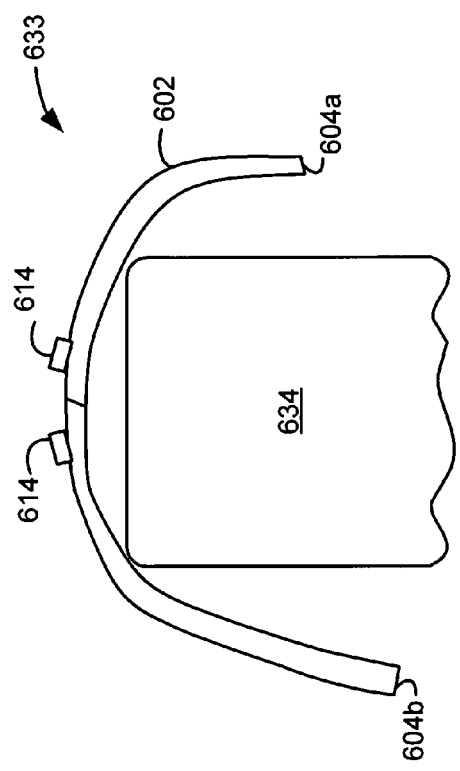
FIG. 28
FIG. 27

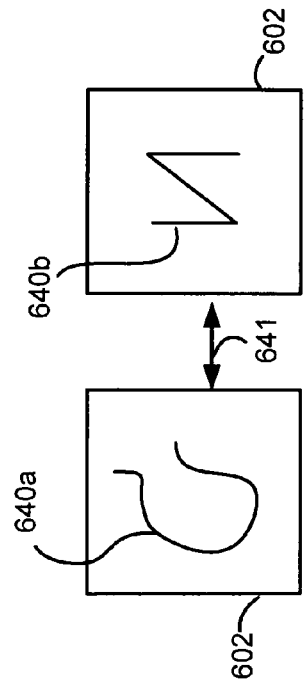
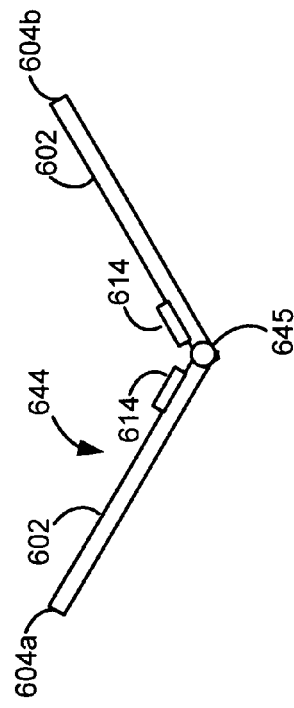
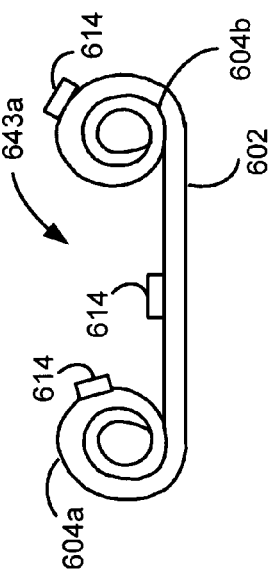
FIG. 30a
FIG. 32
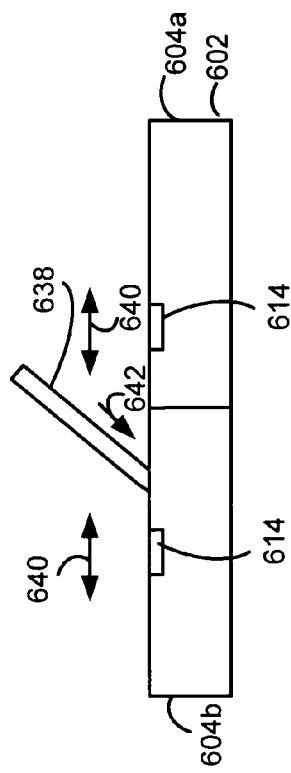
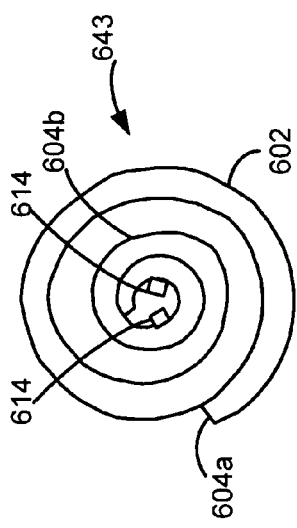
FIG. 30
FIG. 31

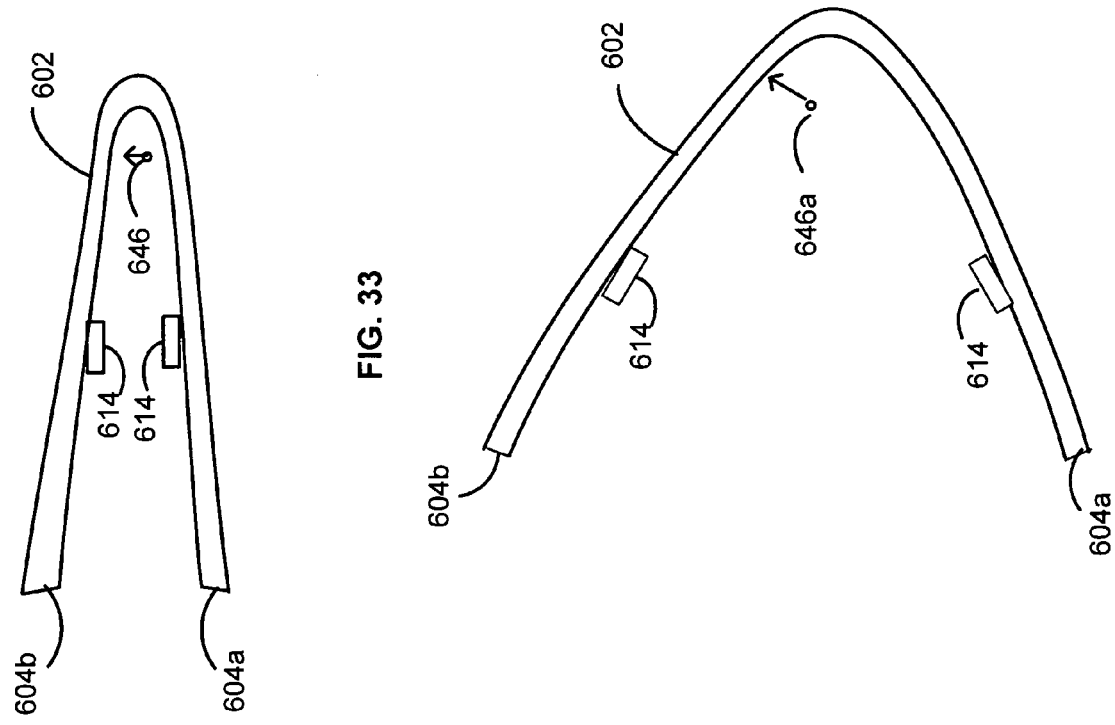

E-PAPER EXTERNAL CONTROL SYSTEM AND METHOD

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation of U.S. patent application Ser. No. 12/313,028, entitled E-PAPER EXTERNAL CONTROL SYSTEM AND METHOD, naming Alexander J. Cohen, Edward K.Y. Jung, Royce A. Levien, Robert W. Lord, Mark A. Malamud and John D. Rinaldo, Jr. as inventors, filed 14 Nov. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

For one or more portions of one or more regions of an electronic paper assembly having one or more display layers, a method includes, but is not limited to: obtaining first information regarding one or more positions of one or more portions of one or more regions of the electronic paper assembly and sending one or more application related information portions to the electronic paper assembly based upon the obtaining of the first information. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming may be virtually any combination of hardware, software, and/or firmware configured to effect the herein-referenced method aspects depending upon the design choices of the system designer.

For one or more portions of one or more regions of an electronic paper assembly having one or more display layers, a method includes, but is not limited to: circuitry for obtaining first information regarding one or more positions of one or more portions of one or more regions of the electronic paper assembly and circuitry for sending one or more application related information portions to the electronic paper assembly based upon the obtaining of the first information. In addition to the foregoing, other method aspects are described in the claims, drawings, and text forming a part of the present disclosure.

For one or more portions of one or more regions of an electronic paper assembly having one or more display layers, a method includes, but is not limited to: means for obtaining first information regarding one or more positions of one or more portions of one or more regions of the electronic paper assembly and means for sending one or more application related information portions to the electronic paper assembly based upon the obtaining of the first information. In addition to the foregoing, other method aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 19B is a block diagram showing detail of an exemplary implementation of a user interface unit of the exemplary implementation of the extra-e-paper assembly of FIG. 13.

FIG. 22 is a top plan view of an exemplary implementation of the intra-e-paper assembly of FIG. 1 is a partially folded state.

FIG. 23 is a side elevational view of the exemplary implementation of the intra-e-paper assembly of FIG. 22.

FIG. 24 is a side elevational view of an exemplary implementation of the intra-e-paper assembly of FIG. 1 showing selection capability.

FIG. 25 is a side elevational view of an exemplary implementation of the intra-e-paper assembly of FIG. 1 showing association between regions due to a depicted conformation.

FIG. 25a is a side elevational view of an exemplary implementation of the intra-e-paper assembly of FIG. 1 showing association between regions due to a depicted conformation.

FIG. 26 is a series of side elevational views of an exemplary implementation of the intra-e-paper assembly of FIG. 1 showing a sequence of depicted conformations.

FIG. 27 is a top plan view of exemplary implementations of the intra-e-paper assembly of FIG. 1 showing conformation based upon interconnection between the exemplary implementations.

FIG. 28 is a side elevational view of an exemplary implementation of the intra-e-paper assembly of FIG. 1 showing an exemplary draping type of conformation.

FIG. 29 is a side elevational view of an exemplary implementation of the intra-e-paper assembly of FIG. 1 showing an exemplary wrapped type of conformation.

FIG. 30 is a side elevational view of an exemplary implementation of the intra-e-paper assembly of FIG. 1 showing an exemplary type of transient conformation through an exemplary scraping action resultant in curvilinear input.

FIG. 30a is a side elevational view of an exemplary implementation of the intra-e-paper assembly of FIG. 1 showing an exemplary type of transient conformation through an exemplary scraping action resultant in curvilinear input.

FIG. 31 is a side elevational view of an exemplary implementation of the intra-e-paper assembly of FIG. 1 showing an exemplary rolled type of conformation.

FIG. 32 is a side elevational view of an exemplary implementation of the intra-e-paper assembly of FIG. 1 showing an exemplary hinge status of the exemplary implementation in an exemplary folded state.

FIG. 33 is a side elevational view of an exemplary implementation of the intra-e-paper assembly of FIG. 1 showing an exemplary bend radius status of the exemplary implementation in an exemplary folded state.

DETAILED DESCRIPTION

Figure 1:
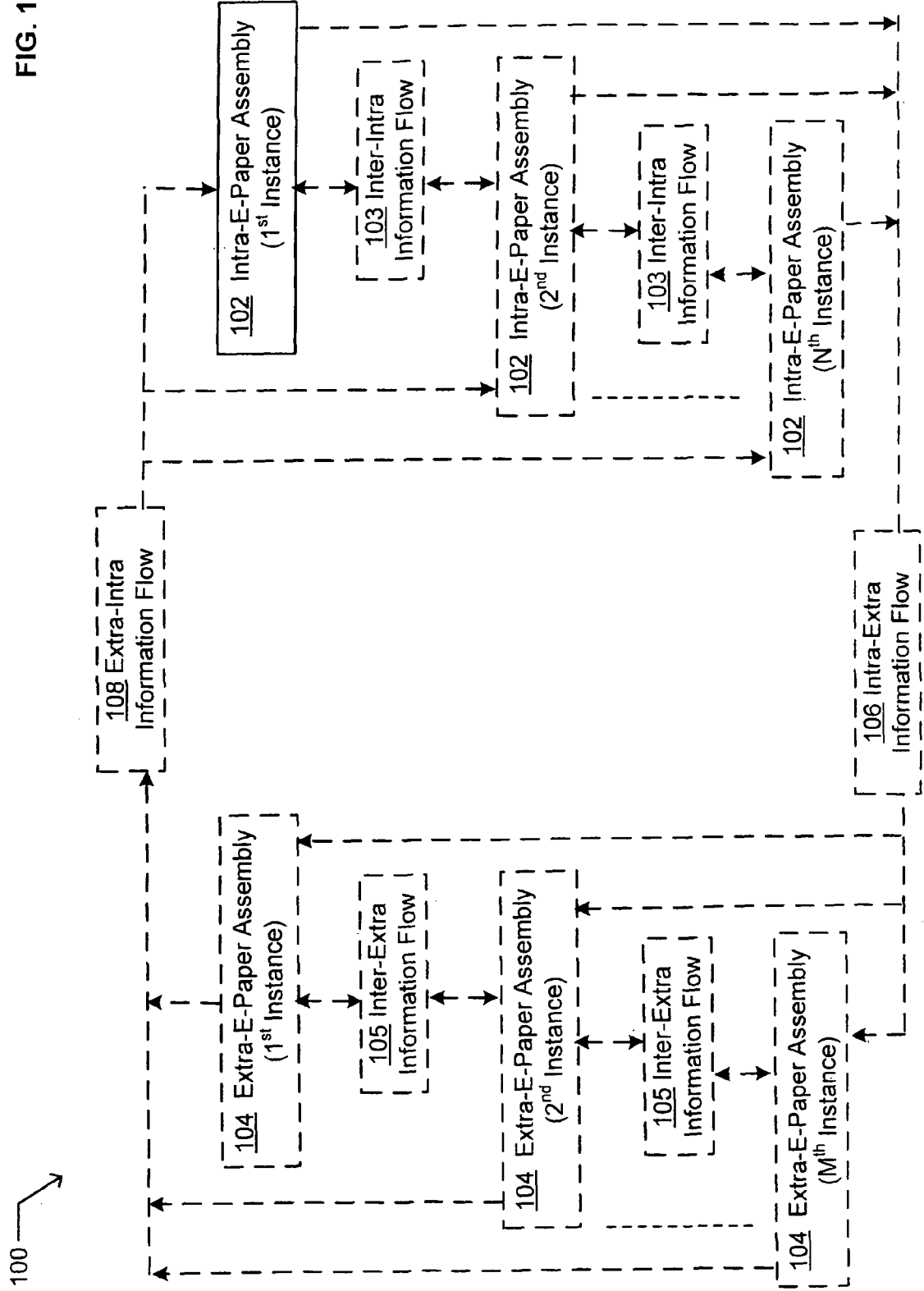
FIG. 1 is block diagram of an intra-e-paper assembly shown in an environment as optionally associated through information flows with other intra-e-paper assemblies and extra-e-paper assemblies.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

An exemplary environment is depicted in FIG. 1 in which one or more aspects of various embodiments may be implemented. In the illustrated environment, an exemplary system 100 may include at least an intra-e-paper assembly (herein "e-paper") 102 for display of information based upon conformation of the e-paper and classification of the information being considered for display.

Some exemplary implementations of the e-paper 102 may utilize various display aspects related to technology commonly referred to as "electronic paper," "e-paper," "electronic ink," and "e-ink" such as plate type electronics using liquid crystal electronics or organic electroluminescence electronics. Some exemplary implementations may use one or more thin and/or foldable electronic circuit boards to provide a more paper-like flexibility for the e-paper 102 without need for hinged connections between portions or regions of the e-paper. Other implementations of the e-paper may also have alone or in combination with the flexible portions more rigid type portions such as with the plate type electronics in which various portions or regions of the e-paper 102 are coupled together with mechanical connectors such as hinges or micro-hinges or other coupling mechanisms. Some exemplary implementations may have one or more batteries mounted thereon to furnish power for changing displayed content. Some exemplary implementations may require power for maintaining the displayed content. Other exemplary implementations may have display aspects with a memory function in lieu of such power requirements.

Some exemplary implementations of the e-paper 102 may utilize display aspects of microcapsule electrophoretic or twist ball type electronics. An exemplary microcapsule-electrophoretic display unit implementation may not require power for maintaining the displayed content.

In some exemplary implementations, black (or other colored particles) charged to negative polarity and white (or other colored particles) charged to positive polarity may be contained in transparent microcapsules that are positioned between films having a transparent electrode such as indium tin oxide (ITO). When a voltage is used to apply negative electric charge to a specific portions of microcapsules, the white (or other colored particles) move to a lower microcapsule portion and the black (or other colored) particles electrophoretically migrate toward an upper microcapsule portion. Consequently, an image of white (or one or more other colors) and black (or one or more other colors) may be displayed on the exemplary implementation of the e-paper 102.

When positive electric charge is applied to an entire surface display layer and/or an internal display layer beneath the surface display layer of the e-paper 102, the white particles may move to an upper portion of a part of the microcapsule. Consequently, the surface becomes white, which may be used to delete an image. Microcapsule-electrophoretic exemplary versions of the e-paper 102 may require power to move the white and black particles at the time of rewrite. However, because the white and black particles normally stay on the electrode due to electrostatic adsorption or intermolecular force, power may not be required to maintain displayed content akin to a memory function.

An exemplary twist-ball (Gyricon bead) implementation of the e-paper 102 may use balls having a spherical diameter of 10 micrometers to 100 micrometers, which may be painted, respectively, in two colors (for example, white and black) for each hemisphere, have charged states (plus and minus) corresponding to the respective colors, and may be buried in a transparent insulating sheet put between a pair of electrodes. Balls painted in two colors may be supported in an insulating liquid such as silicon oil in a cavity slightly larger than the ball diameter so that applied voltage rotates the charged ball to display one of the painted colors. Since the rotated ball may be positionally fixed by electrostatic adsorption, if the applied voltage is removed, displayed content may remain without continuing to apply power. Other aspects of approaches to e-paper displays may be used by other implementations of the e-paper 102. For instance, a bendable A4 sized display panel by LG Philips of South Korea reportedly measures 35.9-centimeters diagonally, is 0.3-millimeter thick, and may display up to 4,096 colors while maintaining the energy efficient qualities that inevitably come with using energy only when the image changes. Supporting e-paper display aspects may be further found in various technical documents such as International PCT Application Publication Nos. WO2007/111382; WO2006/040725; U.S. Published Patent Application Nos. 2007/0242033; 2007/0247422; 2008/0129647; and U.S. Pat. Nos. 6,577,496; 7,195,170.

Exemplary implementations of the system 100 may also include other instances of the e-paper 102, which may exchange information between each other through inter-intra information flows 103. The inter-intra information flows 103 may be supported through radio frequency communication, electrical surface contact, radio frequency identification (RFID), fiber optical, infrared, wireless network protocols, or other.

The system 100 may also include one or more instances of extra-e-paper assemblies (herein "external devices") 104, which may exchange information between each other through inter-extra information flows 105. One or more of the external devices 104 may receive information to one or more of the e-papers 102 through intra-extra information flow 106 and may send information to one or more of the e-papers through extra-intra information flow 108. The external devices 104, as also contemplated with related prior filed applications, may incorporated into services and facilities related to sports stadiums including but not limited to baseball, football, basketball, hockey, auto racing, horse racing, etc, (e.g. Qwest stadium, etc), convention centers (e.g. Seattle Convention Center), other stadium facilities, coffee houses such as Starbucks, Tully's etc. other meeting places, business centers, hotels, and other venues. The external devices 104 may also be incorporated into services and facilities associated with content providers such as e-book publishers (e.g. Kindle, etc), news services (e.g. Yahoo, Fox, Reuters, etc), cell carriers (e.g. Verizon, ATT wireless), etc.

Figure 2:
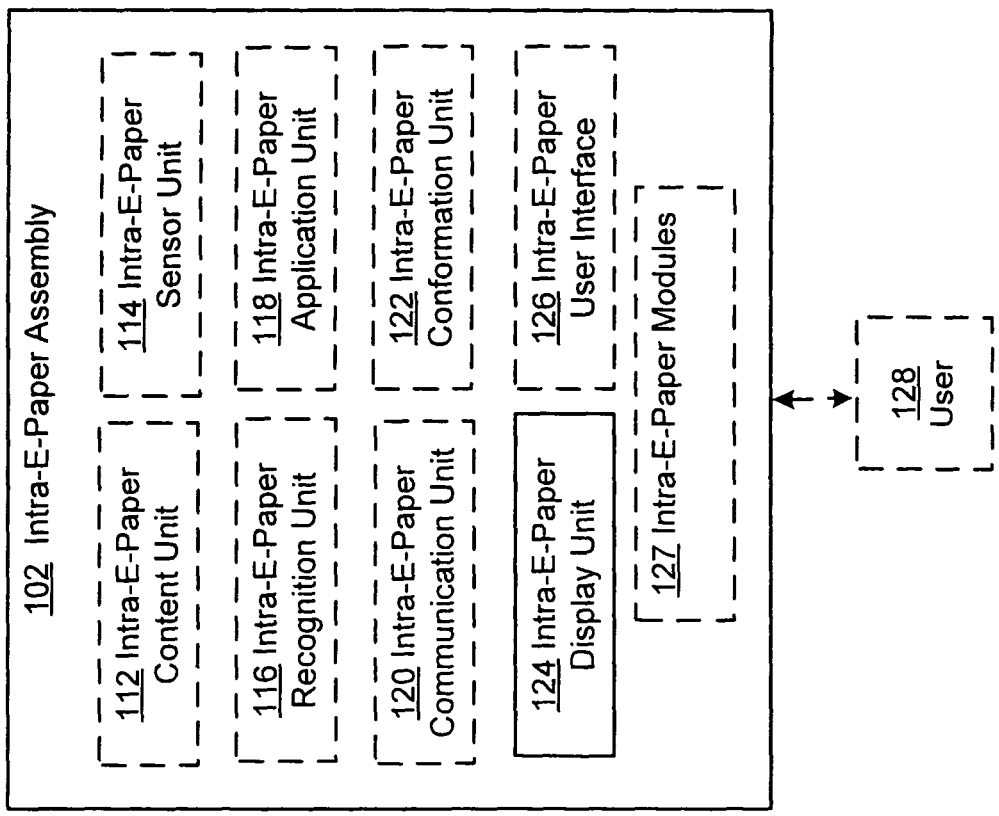
FIG. 2 is a block diagram of an exemplary implementation of the intra-e-paper assembly of FIG. 1 showing further detail.

An exemplary implementation of the e-paper 102 is shown in FIG. 2 as optionally having a content unit 112, a sensor unit 114, a recognition unit 116, an application unit 118, a communication unit 120, a conformation unit 122, a display unit 124, and a user interface 126. A user 128 is shown interacting with the e-paper 102 such as through visual information retrieval, physical manipulation of the e-paper, or other interaction.

Figure 3:
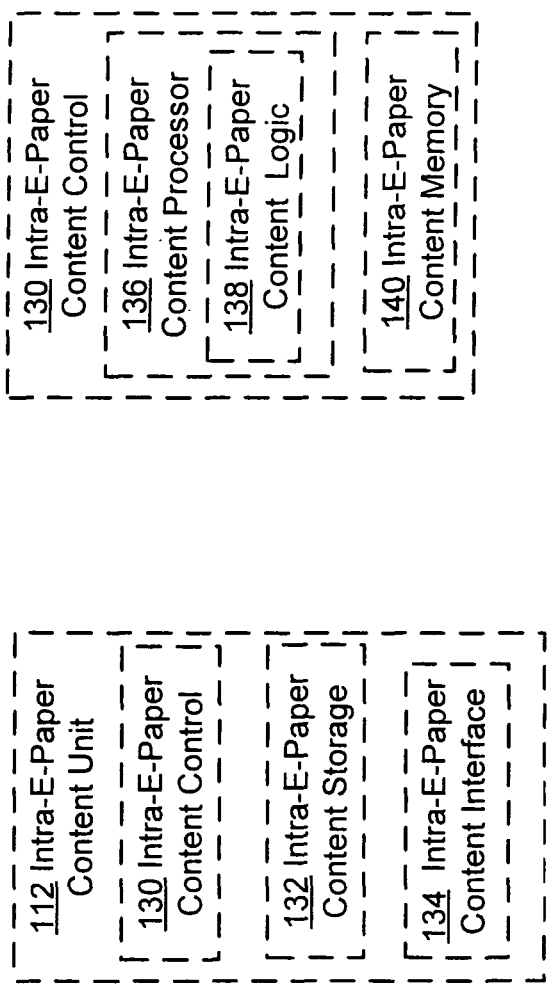
FIG. 3 is a block diagram showing detail of an exemplary implementation of a content unit of the exemplary implementation of the intra-e-paper assembly of FIG. 2.

An exemplary implementation of the content unit 112 is shown in FIG. 3 as optionally having a content control 130, a content storage 132, and a content interface 134. Further shown in FIG. 3, an exemplary implementation of the content control 130 optionally has a content processor 136 with a content logic 138, and a content memory 140.

Figure 4:
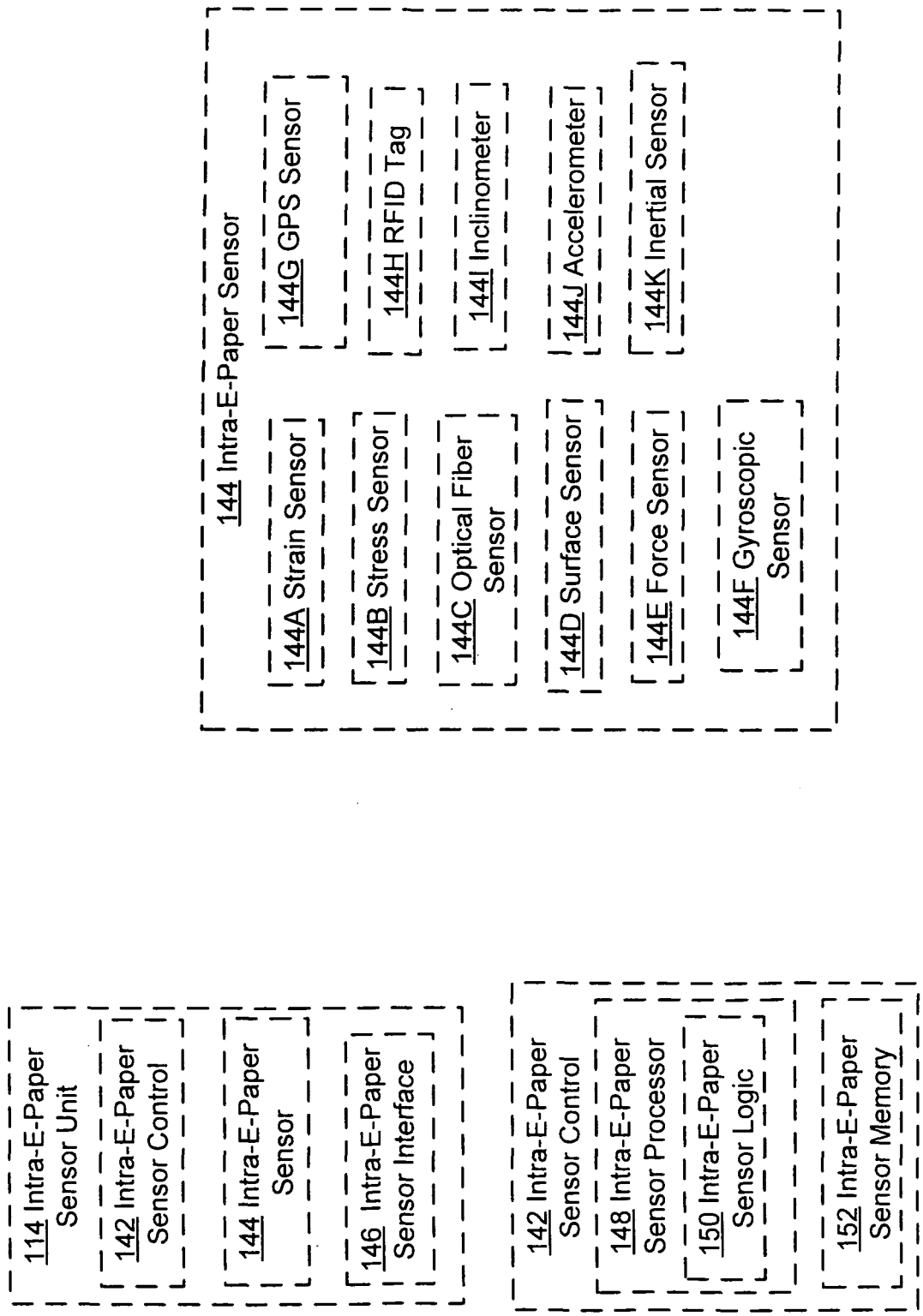
FIG. 4 is a block diagram showing detail of an exemplary implementation of a sensor unit of the exemplary implementation of the intra-e-paper assembly of FIG. 2.

An exemplary implementation of the sensor unit 114 is shown in FIG. 4 as optionally having a sensor control 142, a sensor 144, and a sensor interface 146. Further shown in FIG. 4, an exemplary implementation of the sensor control 142 optionally has a sensor processor 148 with a sensor logic 150, and a sensor memory 152. Further shown in FIG. 4 are exemplary implementations of the sensor 144 including a strain sensor 144a, a stress sensor 144b, an optical fiber sensor 144c, a surface sensor 144d, a force sensor 144e, a gyroscopic sensor 144f, and a global positioning system (GPS) sensor 144g.

Figure 5:
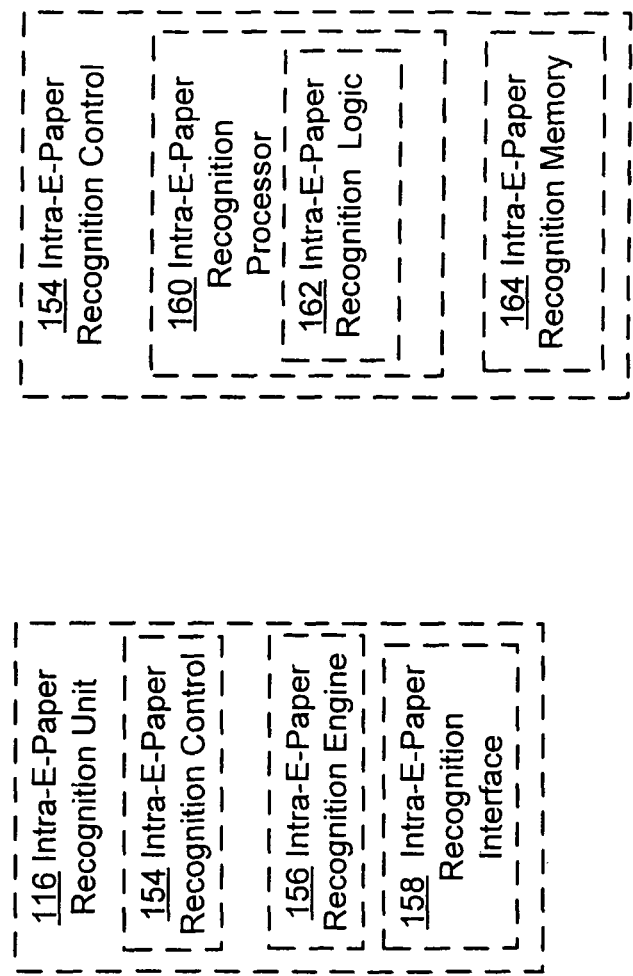
FIG. 5 is a block diagram showing detail of an exemplary implementation of a recognition unit of the exemplary implementation of the intra-e-paper assembly of FIG. 2.

An exemplary implementation of the recognition unit 116 is shown in FIG. 5 as optionally having a recognition control 154, a recognition engine 156, and a recognition interface 158. Further shown in FIG. 5, an exemplary implementation of the recognition control 154 optionally has a recognition processor 160 with a recognition logic 162, and a recognition memory 164.

Figure 6:
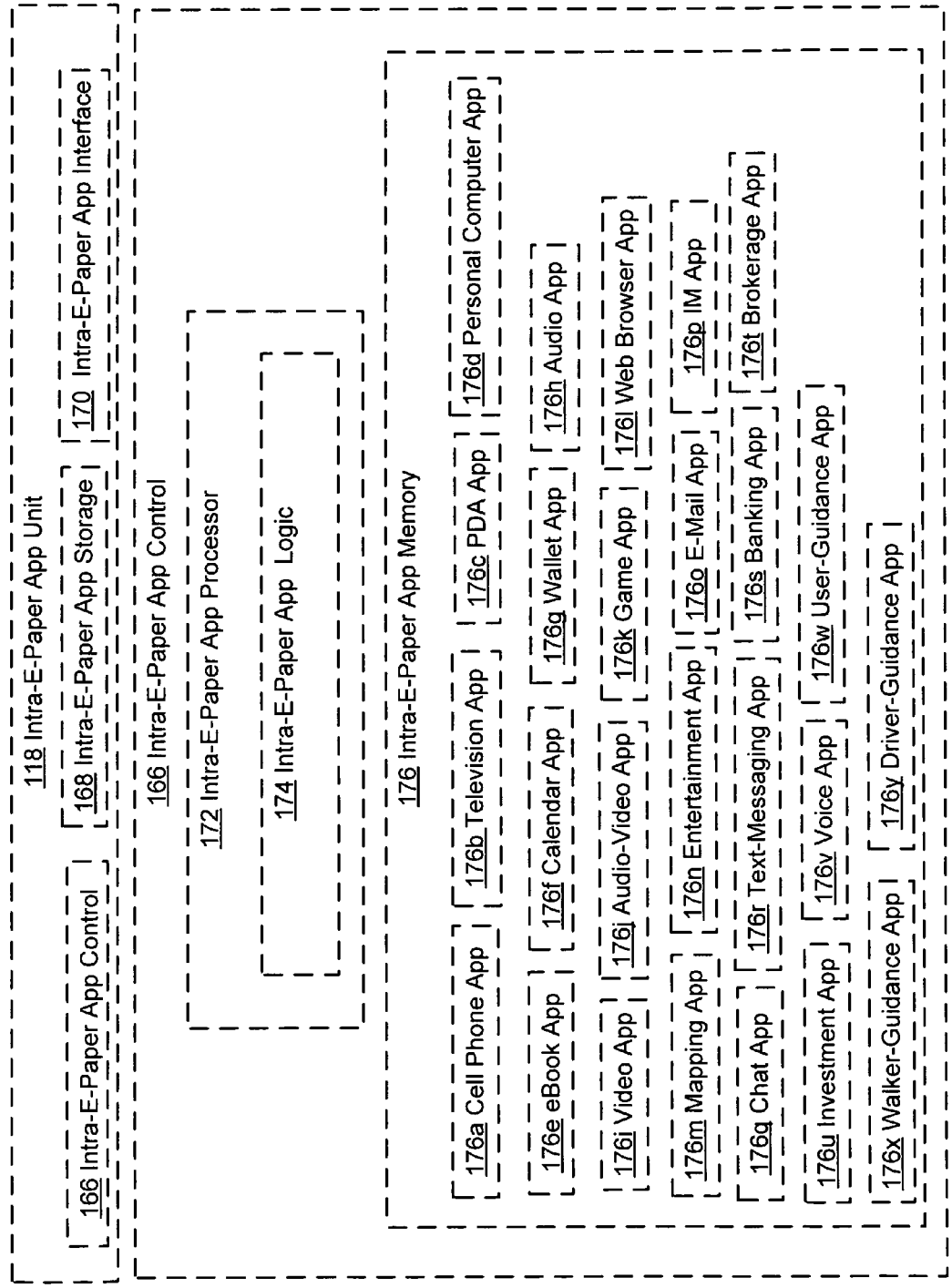
FIG. 6 is a block diagram showing detail of an exemplary implementation of an application unit of the exemplary implementation of the intra-e-paper assembly of FIG. 2.

An exemplary implementation of the application unit 118 is shown in FIG. 6 as optionally having an application control 166, an application storage 168, and an application interface 170. Further shown in FIG. 6, an exemplary implementation of the application control 166 optionally has an application processor 172 with an application logic 174, and an application memory 176. The application memory 176 is shown to optionally include a cell phone application 176a, a television application 176b, a PDA application 176c, a personal computer application 176d, an eBook application 176e, a calendar application 176f, a wallet application 176g, an audio application 176h, a video application 176i, an audio-video application 176j, a game applications 176k, a web browser application 176l, a mapping application 176m, an entertainment application 176n, an e-mail application 176o, an instant-messaging (IM) application 176p, a chat application 176q, a text-messaging application 176r, a banking application 176s, a brokerage application 176t, an investment application 176u, a voice application 176v, a user-guidance application 176w, a walker-guidance application 176x, and a driver-guidance application 176y.

The cell phone application 176a may be configured to communicate through the application interface 170 with the communication unit 116 to allow for reception and transmission involved with establishing and conducting wireless cellular based phone calls through wireless portions of the communication receiver 180 and wireless portions of the communication transmitter 182. The cell phone application 176a may be configured to communicate with the display unit 124 to display graphic portions of the cellular call and control features of the cell phone application via the display hardware 204 through the display interface 206. Audio portions of cellular phone calls may be output from a speaker portion of the user interface transmitter 218 and may be input to a microphone portion of the user interface receiver 216 of the user interface unit 126 by the cell phone application 176a communicating with the user interface unit through the user interface control 214. The cell phone application 176a may communicate with touch input portions of the user interface receiver 216 through the user interface control 214 when combined with the display hardware 204 to furnish touch screen capability, softkeys, a directional pad, numeric keypad, and/or a thumb keyboard, etc.

The television application 176b may be configured to communicate through the application interface 170 with the communication unit 116 to allow for selection and reception of television programming through the communication receiver 180 either by wireless or by wired approaches. The television application 176b may be configured to communicate with the display unit 124 to display video portions of the television programming and control features of the television application via the display hardware 204 through the display interface 206. Audio portions of the television programming may be output from a speaker portion of the user interface transmitter 218 of the user interface unit 126 by the television application 176b communicating with the user interface unit through the user interface control 214. The television application 176b may communicate with touch input portions of the user interface receiver 216 through the user interface control 214 when combined with the display hardware 204 to furnish touch screen capability, softkeys, a directional pad, numeric keypad, and/or a thumb keyboard, etc.

The personal data assistant (PDA) application 176c may be configured to communicate with the display unit 124 to display graphic output portions and control features of the PDA application via the display hardware 204 through the display interface 206. Audio portions of the PDA application 176c may be output from a speaker portion of the user interface transmitter 218 and may be input to a microphone portion of the user interface receiver 216 of the user interface unit 126 by the PDA application communicating with the user interface unit through the user interface control 214. The PDA application 176c may communicate with touch input portions of the user interface receiver 216 through the user interface control 214 when combined with the display hardware 204 to furnish touch screen capability, softkeys, a directional pad, numeric keypad, and/or a thumb keyboard, etc. The PDA application 176c may include such functions as appointment calendar, to-do list, address book, text entry program, e-mail, and/or web browser support, etc.

The personal computer application 176*d* may be configured to communicate with the display unit 124 to display graphic output portions and control features of the personal computer application via the display hardware 204 through the display interface 206. Audio portions of the personal computer application 176*d* may be output from a speaker portion of the user interface transmitter 218 and may be input to a microphone portion of the user interface receiver 216 of the user interface unit 126 by the personal computer application 176*d* communicating with the user interface unit through the user interface control 214. The personal computer application 176*d* may communicate with touch input portions of the user interface receiver 216 through the user interface control 214 when combined with the display hardware 204 to furnish touch screen capability, softkeys, a directional pad, numeric keypad, and/or a thumb keyboard, etc. The personal computer application 176*d* may serve as a general purpose computer with computer programs being stored in the content storage 132 and being executed by through the application logic 174 of the application processor 172 while being contained in the application memory 176. The personal computer application 176*d* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The eBook application 176*e* may be configured to communicate with the display unit 124 to display graphic output portions and control features of the eBook application via the display hardware 204 through the display interface 206. Audio portions of the eBook application 176*e* may be output from a speaker portion of the user interface transmitter 218 and may be input to a microphone portion of the user interface receiver 216 of the user interface unit 126 by the eBook application communicating with the user interface unit through the user interface control 214. The eBook application 176*e* may communicate with touch input portions of the user interface receiver 216 through the user interface control 214 when combined with the display hardware 204 to furnish touch screen capability, softkeys, a directional pad, numeric keypad, and/or a thumb keyboard, etc. The eBook application 176*e* may allow reader access through visual display by the display hardware 210 of textual and graphic content, such as books, periodicals, brochures, catalogs, etc., being stored in the content storage 132 of the content unit 112.

The calendar application 176*f* may be configured to communicate with the display unit 124 to display graphic output portions and control features of the calendar application via the display hardware 204 through the display interface 206. Audio portions of the calendar application 176*f* may be output from a speaker portion of the user interface transmitter 218 and may be input to a microphone portion of the user interface receiver 216 of the user interface unit 126 by the calendar application communicating with the user interface unit through the user interface control 214. The calendar application 176*f* may communicate with touch input portions of the user interface receiver 216 through the user interface control 214 when combined with the display hardware 204 to furnish touch screen capability, softkeys, a directional pad, numeric keypad, and/or a thumb keyboard, etc. The calendar application 176*f* may include such functions as appointment tracking, docketing functions, journal entries, etc.

The wallet application 176*g* may be configured to communicate with the display unit 124 to display graphic output portions and control features of the calendar application via the display hardware 204 through the display interface 206. Audio portions of the wallet application 176*g* may be output from a speaker portion of the user interface transmitter 218 and may be input to a microphone portion of the user interface receiver 216 of the user interface unit 126 by the wallet application communicating with the user interface unit through the user interface control 214. The wallet application 176*g* may communicate with touch input portions of the user interface receiver 216 through the user interface control 214 when combined with the display hardware 204 to furnish touch screen capability, softkeys, a directional pad, numeric keypad, and/or a thumb keyboard, etc. The wallet application 176*f* may include such functions as debit and credit card authorization control to replace or supplement physical debit and credit cards, financial transaction management of bank, savings, loan, and other financial accounts, payment management of various accounts, identification storage and management of personal and other identification including financial, medical, passport, and other identification, and photo storage and management of personal and other photos, etc.

The audio application 176*h* may be configured to communicate with the display unit 124 to display graphic output portions and control features of the audio application via the display hardware 204 through the display interface 206. Audio portions of the audio application 176*h* may be output from a speaker portion of the user interface transmitter 218 and may be input to a microphone portion of the user interface receiver 216 of the user interface unit 126 by the audio application communicating with the user interface unit through the user interface control 214. The audio application 176*h* may communicate with touch input portions of the user interface receiver 216 through the user interface control 214 when combined with the display hardware 204 to furnish touch screen capability, softkeys, a directional pad, numeric keypad, and/or a thumb keyboard, etc. The audio application 176*e* may allow listener access through the speaker portion of the user interface transmitter 218 of audio content being stored in the content storage 132 of the content unit 112.

The video application 176*i* may be configured to communicate with the display unit 124 to display graphic output portions and control features of the video application via the display hardware 204 through the display interface 206. The video application 176*i* may communicate with touch input portions of the user interface receiver 216 through the user interface control 214 when combined with the display hardware 204 to furnish touch screen capability, softkeys, a directional pad, numeric keypad, and/or a thumb keyboard, etc. The video application 176*i* may allow viewer access through the display hardware 204 via a video portion of the user interface transmitter 218 to video content being stored in the content storage 132 of the content unit 112.

The audio-video application 176*j* may be configured to communicate with the display unit 124 to display graphic and video output portions and control features of the audio-video application via the display hardware 204 through the display interface 206. Audio portions of the audio-video application 176*j* may be output from a speaker portion of the user interface transmitter 218 and may be input to a microphone portion of the user interface receiver 216 of the user interface unit 126 by the audio-video application communicating with the user interface unit through the user interface control 214. The audio-video application 176*j* may communicate with touch input portions of the user interface receiver 216 through the user interface control 214 when combined with the display hardware 204 to furnish touch screen capability, softkeys, a directional pad, numeric keypad, and/or a thumb keyboard, etc. The audio-video application 176*j* may allow user access through visual display by the display hardware 210 of textual and graphic content being stored in the content storage 132 of the content unit 112 and through audio output of the speaker portion of the user interface transmitter 218 of audio content being stored in the content storage.

The game application 176*k* may be configured to communicate with the display unit 124 to display graphic output portions and control features of the game application via the display hardware 204 through the display interface 206. Audio portions of the game application 176*k* may be output from a speaker portion of the user interface transmitter 218 and may be input to a microphone portion of the user interface receiver 216 of the user interface unit 126 by the game application communicating with the user interface unit through the user interface control 214. The game application 176*k* may communicate with touch input portions of the user interface receiver 216 through the user interface control 214 when combined with the display hardware 204 to furnish touch screen capability, softkeys, a directional pad, numeric keypad, and/or a thumb keyboard, etc. The game application 176*k* may allow gamer access through visual display by the display hardware 210 of textual and graphic content being stored in the content storage 132 of the content unit 112 and through audio output of the speaker portion of the user interface transmitter 218 of audio content being stored in the content storage. The game application 176*k* may include arcade, racing, strategy, educational, board, sports, and/or other sorts of game types.

The web browser application 176*l* may be configured to communicate with the display unit 124 to display graphic output portions and control features of the web browser via the display hardware 204 through the display interface 206. Audio portions of the web browser application 176*l* may be output from a speaker portion of the user interface transmitter 218 and may be input to a microphone portion of the user interface receiver 216 of the user interface unit 126 by the web browser application communicating with the user interface unit through the user interface control 214. The web browser application 176*l* may communicate with touch input portions of the user interface receiver 216 through the user interface control 214 when combined with the display hardware 204 to furnish touch screen capability, softkeys, a directional pad, numeric keypad, and/or a thumb keyboard, etc. The web browser application 176*l* may serve as a web browser to the Internet with one or more web browser programs being stored in the content storage 132 and being executed by through the application logic 174 of the application processor 172 while being contained in the application memory 176. The web browser application 176*l* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The mapping application 176*m* may be configured to communicate with the display unit 124 to display graphic output portions and control features of the mapping application via the display hardware 204 through the display interface 206. Audio portions of the mapping application 176*d* may be output from a speaker portion of the user interface transmitter 218 and may be input to a microphone portion of the user interface receiver 216 of the user interface unit 126 by the personal computer application 176*d* communicating with the user interface unit through the user interface control 214. The mapping application 176*m* may communicate with touch input portions of the user interface receiver 216 through the user interface control 214 when combined with the display hardware 204 to furnish touch screen capability, softkeys, a directional pad, numeric keypad, and/or a thumb keyboard, etc. The mapping application 176*m* may be in communication with the GPS sensor 144*g* of the sensor unit 114 to receive position data to be shown on a map displayed on the display hardware 210.

The entertainment application 176*n* may be configured to communicate with the display unit 124 to display graphic and video output portions and control features of the entertainment application 176*n* application via the display hardware 204 through the display interface 206. Audio portions of the entertainment application 176*n* may be output from a speaker portion of the user interface transmitter 218 and may be input to a microphone portion of the user interface receiver 216 of the user interface unit 126 by the entertainment application communicating with the user interface unit through the user interface control 214. The entertainment application 176*n* may communicate with touch input portions of the user interface receiver 216 through the user interface control 214 when combined with the display hardware 204 to furnish touch screen capability, softkeys, a directional pad, numeric keypad, and/or a thumb keyboard, etc. The entertainment application 176*n* may allow user access through visual display by the display hardware 210 of entertainment type textual, graphic, video, and/or other content being stored in the content storage 132 of the content unit 112 and through audio output of the speaker portion of the user interface transmitter 218 of audio content being stored in the content storage. Entertainment type content may utilize audio, video, and/or audio-video capabilities, for example, such as playing of shows, movies, documentaries, etc; serving as a user interface to an interactive computer program, an interactive communication interface, an interactive music device, an interactive training device, an interactive exercise device, an interactive pet device, an interactive tourism device, an interactive social networking device, an interactive safety device, an interactive monitoring device, an interactive reference device and/or other interactive device.

The e-mail application 176*o* may be configured to communicate with the display unit 124 to display graphic output portions and control e-mail features via the display hardware 204 through the display interface 206. Audio portions of the e-mail application 176*o* may be output from a speaker portion of the user interface transmitter 218 and may be input to a microphone portion of the user interface receiver 216 of the user interface unit 126 by the e-mail application 176*o* communicating with the user interface unit through the user interface control 214. The e-mail application 176*o* may communicate with touch input portions of the user interface receiver 216 through the user interface control 214 when combined with the display hardware 204 to furnish touch screen capability, softkeys, a directional pad, numeric keypad, and/or a thumb keyboard, etc. The e-mail application 176*o* may serve as an e-mail internet client with one or more e-mail communication programs being stored in the content storage 132 and being executed by through the application logic 174 of the application processor 172 while being contained in the application memory 176. The e-mail application 176*o* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The instant-messaging (IM) application 176*p* may be configured to communicate with the display unit 124 to display graphic output portions and control IM features via the display hardware 204 through the display interface 206. Audio portions of the IM application 176*p* may be output from a speaker portion of the user interface transmitter 218 and may be input to a microphone portion of the user interface receiver 216 of the user interface unit 126 by the IM application 176*p* communicating with the user interface unit through the user interface control 214. The IMI application 176*p* may communicate with touch input portions of the user interface receiver 216 through the user interface control 214 when combined with the display hardware 204 to furnish touch screen capability, softkeys, a directional pad, numeric keypad, and/or a thumb keyboard, etc. The IM application 176*p* may serve as an IM internet client with one or more IM communication programs being stored in the content storage 132 and being executed by through the application logic 174 of the application processor 172 while being contained in the application memory 176. The IM application 176*p* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The chat application 176*q*, may be configured to communicate with the display unit 124 to display graphic output portions and control chat features via the display hardware 204 through the display interface 206. Audio portions of the chat application 176*q* may be output from a speaker portion of the user interface transmitter 218 and may be input to a microphone portion of the user interface receiver 216 of the user interface unit 126 by the chat application 176*q* communicating with the user interface unit through the user interface control 214. The chat application 176*q* may communicate with touch input portions of the user interface receiver 216 through the user interface control 214 when combined with the display hardware 204 to furnish touch screen capability, softkeys, a directional pad, numeric keypad, and/or a thumb keyboard, etc. The chat application 176*q* may serve as a chat internet client with one or more chat communication programs being stored in the content storage 132 and being executed by through the application logic 174 of the application processor 172 while being contained in the application memory 176. The chat application 176*q* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The text-messaging application 176*r* may be configured to communicate with the display unit 124 to display graphic output portions and control text-messaging features via the display hardware 204 through the display interface 206. The text-messaging application 176*r* may communicate with touch input portions of the user interface receiver 216 through the user interface control 214 when combined with the display hardware 204 to furnish touch screen capability, softkeys, a directional pad, numeric keypad, and/or a thumb keyboard, etc. The text-messaging application 176*r* may serve as a text-messaging internet client with one or more text-messaging communication programs being stored in the content storage 132 and being executed by through the application logic 174 of the application processor 172 while being contained in the application memory 176. The text-messaging application 176*r* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The banking application 176*s* may be used to place banking transactions, to monitor existing banking accounts, or otherwise communicate with banking and other savings institutions. The banking application 176*s*, may be configured to communicate with the display unit 124 to display graphic output portions and control banking features via the display hardware 204 through the display interface 206. Audio portions of the banking application 176*s* may be output from a speaker portion of the user interface transmitter 218 and may be input to a microphone portion of the user interface receiver 216 of the user interface unit 126 by the banking application 176*s* communicating with the user interface unit through the user interface control 214. The banking application 176*s* may communicate with touch input portions of the user interface receiver 216 through the user interface control 214 when combined with the display hardware 204 to furnish touch screen capability, softkeys, a directional pad, numeric keypad, and/or a thumb keyboard, etc. The banking application 176*s* may serve as a banking internet client with one or more banking communication programs being stored in the content storage 132 and being executed by through the application logic 174 of the application processor 172 while being contained in the application memory 176. The banking application 176*s* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The brokerage application 176*t* may be used to place brokerage transactions, to monitor existing brokerage accounts, or otherwise communicate with brokerage institutions. The brokerage application 176*t*, may be configured to communicate with the display unit 124 to display graphic output portions and control brokerage features via the display hardware 204 through the display interface 206. Audio portions of the brokerage application 176*t* may be output from a speaker portion of the user interface transmitter 218 and may be input to a microphone portion of the user interface receiver 216 of the user interface unit 126 by the brokerage application 176*t* communicating with the user interface unit through the user interface control 214. The brokerage application 176*t* may communicate with touch input portions of the user interface receiver 216 through the user interface control 214 when combined with the display hardware 204 to furnish touch screen capability, softkeys, a directional pad, numeric keypad, and/or a thumb keyboard, etc. The brokerage application 176*t* may serve as a brokerage internet client with one or more brokerage communication programs being stored in the content storage 132 and being executed by through the application logic 174 of the application processor 172 while being contained in the application memory 176. The brokerage application 176*t* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The investment application 176*u* may be used to place investment transactions, to monitor existing investment accounts, or otherwise communicate with investment institutions. The investment application 176*u* may be configured to communicate with the display unit 124 to display graphic output portions and control investment features via the display hardware 204 through the display interface 206. Audio portions of the investment application 176*u* may be output from a speaker portion of the user interface transmitter 218 and may be input to a microphone portion of the user interface receiver 216 of the user interface unit 126 by the investment application 176*u* communicating with the user interface unit through the user interface control 214. The investment application 176*u* may communicate with touch input portions of the user interface receiver 216 through the user interface control 214 when combined with the display hardware 204 to furnish touch screen capability, softkeys, a directional pad, numeric keypad, and/or a thumb keyboard, etc. The investment application 176*u* as an investment internet client with one or more investment communication programs being stored in the content storage 132 and being executed by through the application logic 174 of the application processor 172 while being contained in the application memory 176. The investment application 176*u* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The voice application 176*v* may be configured to communicate with the display unit 124 to display graphic output portions and control voice features such as voice recording, voice recognition, voice output, voice translation, voice to text, text to voice, etc via the display hardware 204 through the display interface 206. Audio portions of the voice application 176*v* may be output from a speaker portion of the user interface transmitter 218 and may be input to a microphone portion of the user interface receiver 216 of the user interface unit 126 by the voice application 176*v* communicating with the user interface unit through the user interface control 214. The voice application 176*v* may communicate with touch input portions of the user interface receiver 216 through the user interface control 214 when combined with the display hardware 204 to furnish touch screen capability, softkeys, a directional pad, numeric keypad, and/or a thumb keyboard, etc. The voice application 176*v* as a voice internet client with one or more voice communication programs being stored in the content storage 132 and being executed by through the application logic 174 of the application processor 172 while being contained in the application memory 176. The voice application 176*v* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The user-guidance application 176*w* may be used to offer instruction, directions, reference materials, historical information, tips, hints, or other information to otherwise guide a user of the application regarding a goal, an interest, an objective, etc. The user-guidance application 176*w* may be configured to communicate with the display unit 124 to display graphic output portions and control user-guidance features via the display hardware 204 through the display interface 206. Audio portions of the user-guidance application 176*w* may be output from a speaker portion of the user interface transmitter 218 and may be input to a microphone portion of the user interface receiver 216 of the user interface unit 126 by the user-guidance application 176*w* communicating with the user interface unit through the user interface control 214. The user-guidance application 176*w* may communicate with touch input portions of the user interface receiver 216 through the user interface control 214 when combined with the display hardware 204 to furnish touch screen capability, softkeys, a directional pad, numeric keypad, and/or a thumb keyboard, etc. The user-guidance application 176*w* as a user-guidance internet client with one or more user-guidance communication programs being stored in the content storage 132 and being executed by through the application logic 174 of the application processor 172 while being contained in the application memory 176. The user-guidance application 176*u* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The walker-guidance application 176*x* may be used to offer instruction, directions, reference materials, historical information, tips, hints, or other information to otherwise guide a walker regarding a goal, an interest, an objective, etc. The walker-guidance application 176*x* may be configured to communicate with the display unit 124 to display graphic output portions and control walker-guidance features via the display hardware 204 through the display interface 206. Audio portions of the walker-guidance application 176*x* may be output from a speaker portion of the user interface transmitter 218 and may be input to a microphone portion of the user interface receiver 216 of the user interface unit 126 by the walker-guidance application 176*x* communicating with the user interface unit through the user interface control 214. The walker-guidance application 176*x* may communicate with touch input portions of the user interface receiver 216 through the user interface control 214 when combined with the display hardware 204 to furnish touch screen capability, softkeys, a directional pad, numeric keypad, and/or a thumb keyboard, etc. The walker-guidance application 176*x* as a walker-guidance internet client with one or more walker-guidance communication programs being stored in the content storage 132 and being executed by through the application logic 174 of the application processor 172 while being contained in the application memory 176. The walker-guidance application 176*x* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The driver-guidance application 176*y* may be used to offer instruction, directions, reference materials, historical information, tips, hints, or other information to otherwise guide a driver of a vehicle such as an automobile, truck, train, boat, plane, or other transportation craft regarding a goal, an interest, an objective, etc. The driver-guidance application 176*y* may be configured to communicate with the display unit 124 to display graphic output portions and control driver-guidance features via the display hardware 204 through the display interface 206. Audio portions of the driver-guidance application 176y may be output from a speaker portion of the user interface transmitter 218 and may be input to a microphone portion of the user interface receiver 216 of the user interface unit 126 by the driver-guidance application 176y communicating with the user interface unit through the user interface control 214. The driver-guidance application 176y may communicate with touch input portions of the user interface receiver 216 through the user interface control 214 when combined with the display hardware 204 to furnish touch screen capability, softkeys, a directional pad, numeric keypad, and/or a thumb keyboard, etc. The driver-guidance application 176y as an driver-guidance internet client with one or more driver-guidance communication programs being stored in the content storage 132 and being executed by through the application logic 174 of the application processor 172 while being contained in the application memory 176. The driver-guidance application 176y may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

Figure 7:
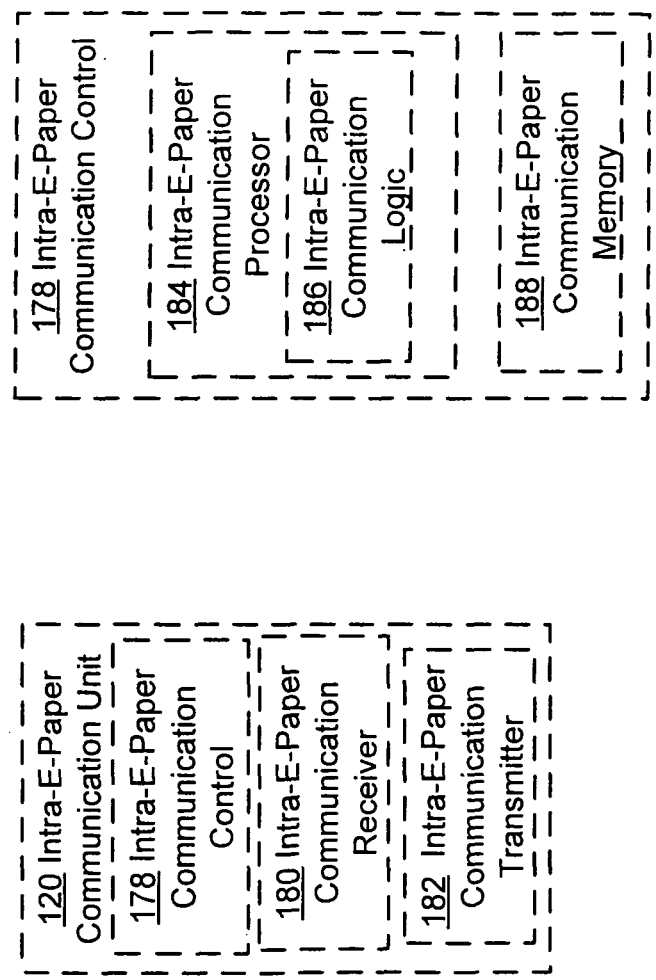
FIG. 7 is a block diagram showing detail of an exemplary implementation of a communication unit of the exemplary implementation of the intra-e-paper assembly of FIG. 2.

An exemplary implementation of the communication unit 120 is shown in FIG. 7 as optionally having a communication control 178, a communication receiver 180, and a communication transmitter 182. Further shown in FIG. 7, an exemplary implementation of the communication control 178 optionally has a communication processor 184 with a communication logic 186, and a communication memory 188.

Figure 8:
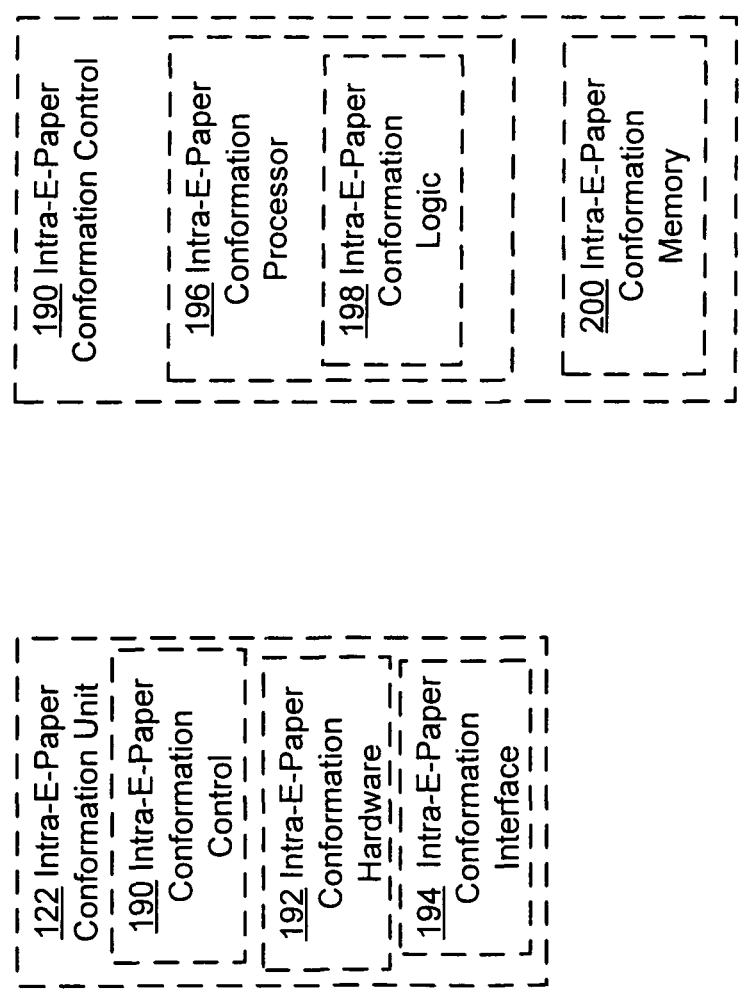
FIG. 8 is a block diagram showing detail of an exemplary implementation of a conformation unit of the exemplary implementation of the intra-e-paper assembly of FIG. 2.

An exemplary implementation of the conformation unit 122 is shown in FIG. 8 as optionally having a conformation control 190, conformation hardware 192, and a conformation interface 194. Further shown in FIG. 8, an exemplary implementation of the conformation control 190 optionally has a conformation processor 196 with a conformation logic 198, and a conformation memory 200.

Figure 9:
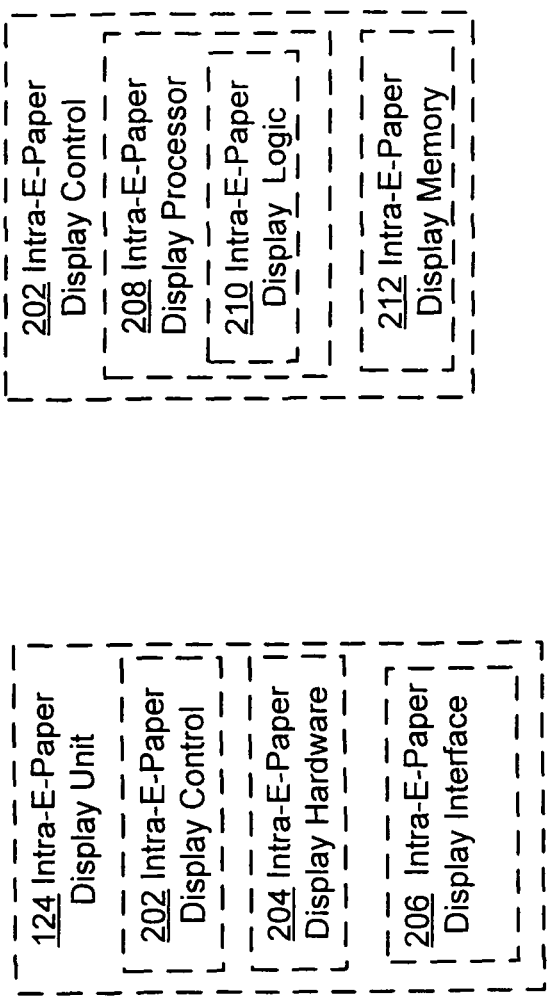
FIG. 9 is a block diagram showing detail of an exemplary implementation of a display unit of the exemplary implementation of the intra-e-paper assembly of FIG. 2.

An exemplary implementation of the display unit 124 is shown in FIG. 9 as optionally having a display control 202, display hardware 204, and a display interface 206. Further shown in FIG. 9, an exemplary implementation of the display control 202 optionally has a display processor 208 with a display logic 210, and a display memory 212.

Figure 10:
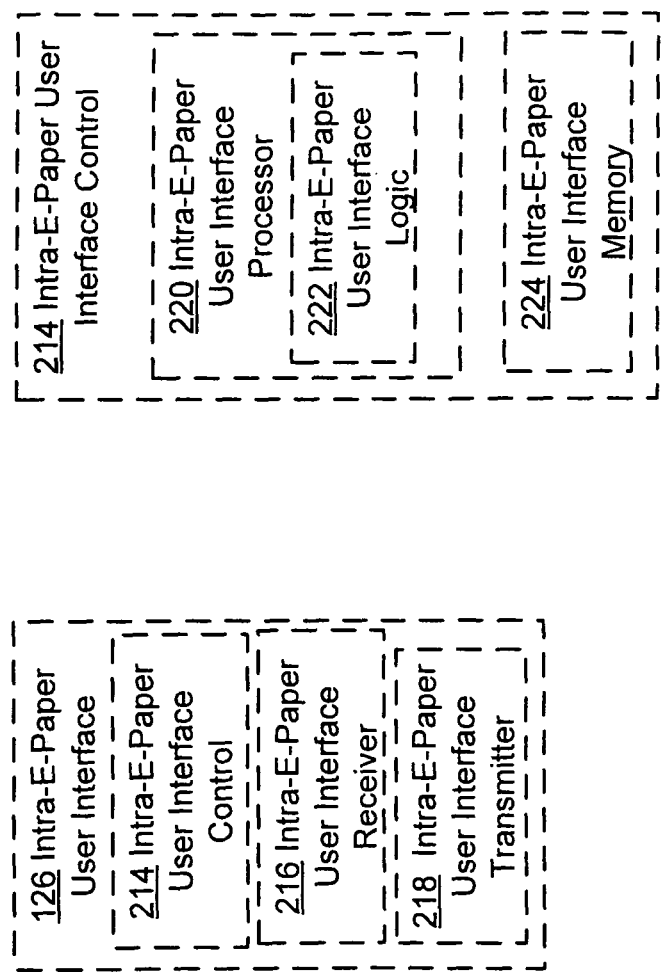
FIG. 10 is a block diagram showing detail of an exemplary implementation of a user interface unit of the exemplary implementation of the intra-e-paper assembly of FIG. 2

An exemplary implementation of the user interface unit 126 is shown in FIG. 10 as optionally having a user interface control 214, user interface receiver 216, and a user interface transmitter 218. Further shown in FIG. 10, an exemplary implementation of the user interface control 202 optionally has a user interface processor 220 with a user interface logic 222, and a user interface memory 224.

Figure 11:
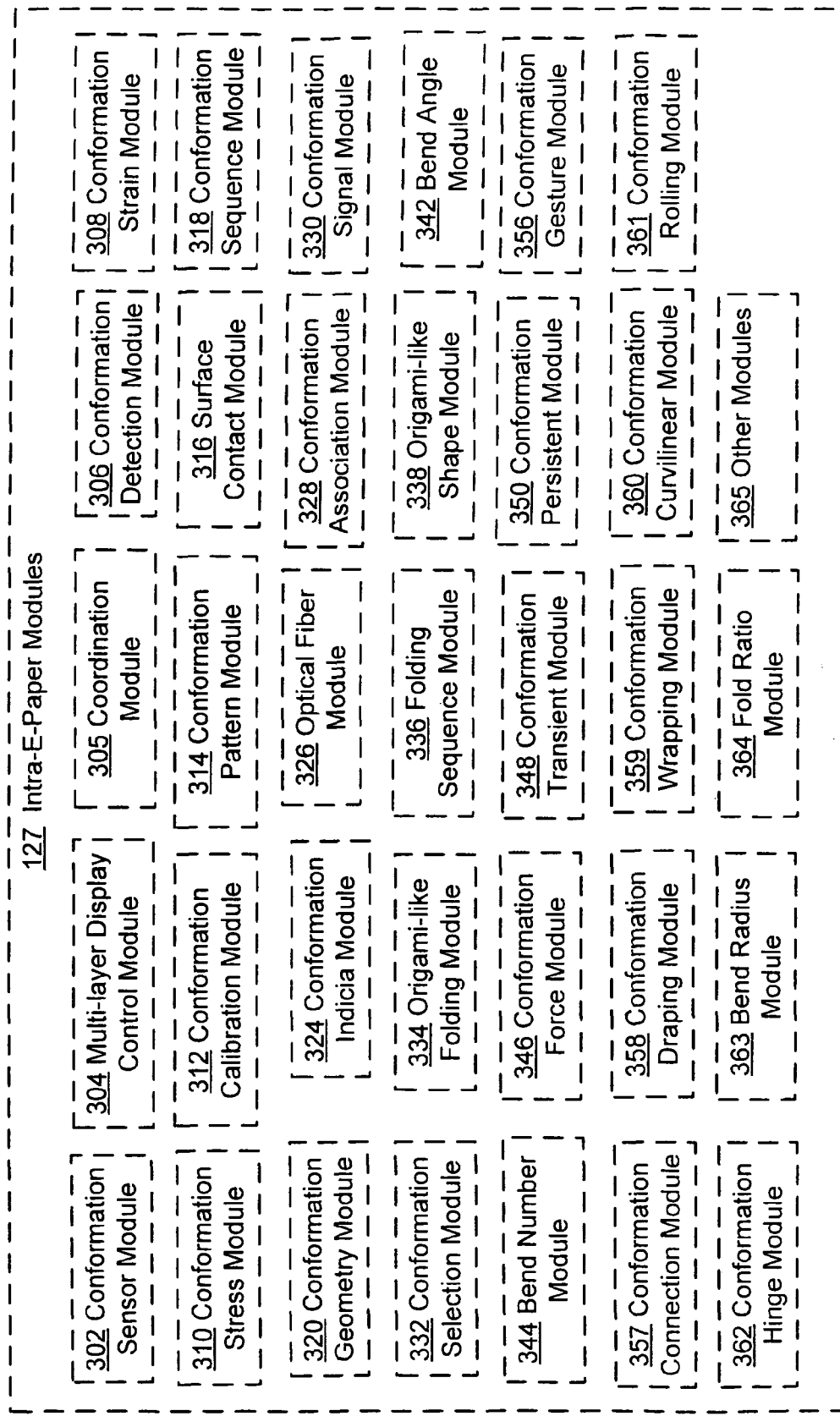
FIG. 11 is a block diagram showing detail of exemplary implementations of intra-e-paper modules of the exemplary implementation of the intra-e-paper assembly of FIG. 2.

Exemplary implementations of modules of the intra-e-paper modules 127 of the Intra-E-paper assembly 102 is shown in FIG. 11 as optionally having a conformation sensor module 302, a multi-layer display control module 304 coordination module 305, a conformation detection module 306, a conformation strain module 308, a conformation stress module 310, a conformation calibration module 312, a conformation pattern module 314, a surface contact module 316, a conformation sequence module 318, a conformation geometry module 320, a conformation indicia module 324, an optical fiber module 326, a conformation association module 328, a conformation signal module 330, a conformation selection module 332, an origami-like folding module 334, a folding sequence module 336, an origami-like shape module 338, a bend angle module 342, a bend number module 344, a conformation force module 346, a conformation transient module 348, a conformation persistent module 350, a conformation gesture module 356, a conformation connection module 357, a conformation draping module 358, a conformation wrapping module 359, a conformation curvilinear module 360, a conformation rolling module 361, a conformation hinge module 362, a bend radius module 363, a fold ratio module 364, and an other modules 365.

The conformation sensor module 302 is configured to direct acquisition of first information such as obtaining information associated with one or more changes in one or more sequences of two or more conformations of one or more portions of one or more regions of the electronic paper assembly such as the e-paper 102 of FIG. 2.

Figure 21:
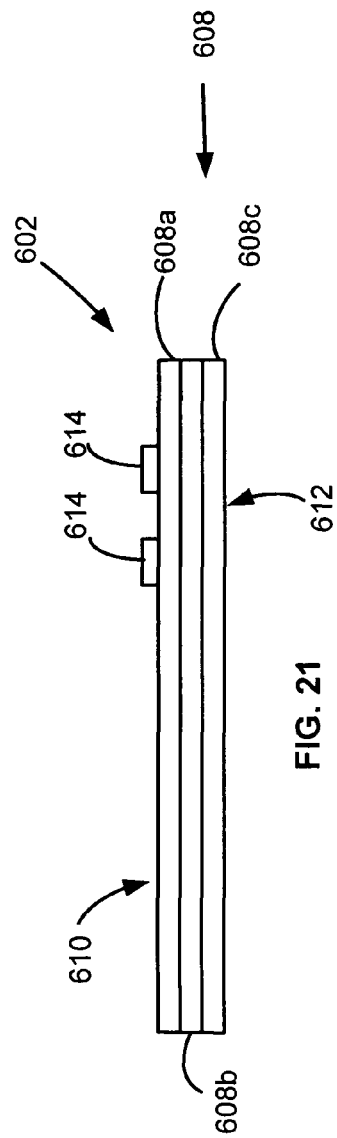
FIG. 21 is a side elevational sectional view of an exemplary implementation of the intra-e-paper assembly of FIG. 1.

The multi-layer display control module 304 of FIG. 11 is configured to direct control of display of one or more portions of one or more display layers, such as display layers 608 of FIG. 21, of an electronic paper assembly, such as the e-paper 102 of FIG. 2, regarding display of second information in response to the first information associated with the one or more conformations of the one or more portions of the one or more regions of the electronic paper assembly.

The coordination module 305 of FIG. 11 is configured to coordinate such as one or more coordination modules configured to direct coordinating the one or more sequences of two or more conformations of one or more portions of one or more regions of the electronic paper assembly with one or more commands such as the e-paper 102 of FIG. 2.

Figure 20:
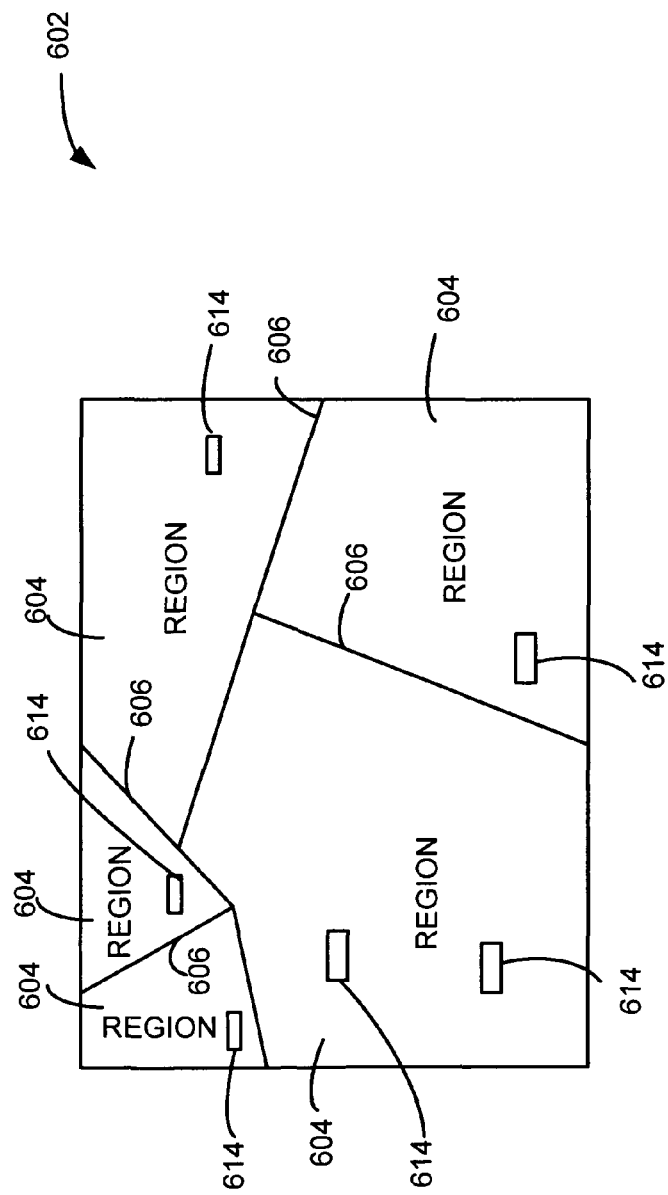
FIG. 20 is a schematic diagram depicting regions of an exemplary implementation of an intra-e-paper assembly.

The conformation detection module 306 is configured to direct acquisition of detection information such as detecting one or more changes in one or more sequences of two or more conformations of one or more portions of one or more regions of the electronic paper assembly such as the regions 604 of the exemplary implementation 602 of the e-paper 102 of FIG. 20.

The conformation strain module 308 is configured to direct acquisition of strain information such as obtaining strain information associated with one or more changes in one or more sequences of two or more conformations of one or more portions of one or more regions of the electronic paper assembly such as the regions 604 of the exemplary implementation 602 of the e-paper 102 of FIG. 20.

The conformation stress module 310 is configured to direct acquisition of stress information such as obtaining stress information associated with one or more changes in one or more sequences of two or more conformations of one or more portions of one or more regions of the electronic paper assembly such as the regions 604 of the exemplary implementation 602 of the e-paper 102 of FIG. 20.

The conformation calibration module 312 is configured to direct acquisition of calibration related information such as obtaining calibration related information associated with one or more changes in one or more sequences of two or more conformations of one or more portions of one or more regions of the electronic paper assembly such as the regions 604 of the exemplary implementation 602 of the e-paper 102 of FIG. 20.

The conformation pattern module 314 configured to direct acquisition of pattern information such as obtaining pattern information associated with one or more changes in one or more sequences of two or more conformations of one or more portions of one or more regions of the electronic paper assembly such as the regions 604 of the exemplary implementation 602 of the e-paper 102 of FIG. 20.

The surface contact module 316 is configured to direct acquisition of surface contact information such as obtaining surface contact information associated with one or more changes in one or more sequences of two or more conformations of one or more portions of one or more regions of the electronic paper assembly such as the regions 604 of the exemplary implementation 602 of the e-paper 102 of FIG. 20.

The conformation sequence module 318 is configured to direct acquisition of sequence information such as obtaining sequence information associated with one or more changes in two or more sequences of two or more conformations of one or more portions of one or more regions of the electronic paper assembly such as the regions 604 of the exemplary implementation 602 of the e-paper 102 of FIG. 20.

The conformation geometry module 320 is configured to direct acquisition of geometrical information such as obtaining geometrical information associated with one or more changes in one or more sequences of two or more conformations of one or more portions of one or more regions of the electronic paper assembly such as the regions 604 of the exemplary implementation 602 of the e-paper 102 of FIG. 20.

The conformation indicia module 324 is configured to direct acquisition of indicia information such as obtaining information related to predetermined indicia associated with one or more changes in one or more sequences of two or more conformations of one or more portions of one or more regions of the electronic paper assembly such as the regions 604 of the exemplary implementation 602 of the e-paper 102 of FIG. 20. Predetermined indicia could be stored in the sensor memory 152 of the sensor control 142 of the sensor 114 and may be related to one or more measurement results of one or more readings by one or more o the sensors 144. One or more measurement results by one or more of the sensors 144 could thus be characterized by the predetermined indicia. Predetermined indicia could be stored in the recognition memory 164 of the recognition control 154 of the recognition unit 116 and may be related to one or more recognition results of the recognition engine 156. One or more recognition results by the recognition engine 156 could thus be characterized by the predetermined indicia.

The optical fiber module 326 is configured to direct acquisition of optical fiber derived information such as obtaining optical fiber derived information associated with one or more changes in one or more sequences of two or more conformations of one or more portions of one or more regions of the electronic paper assembly such as the regions 604 of the exemplary implementation 602 of the e-paper 102 of FIG. 20.

The conformation association module 328 is configured to direct acquisition of association information such as obtaining information based on one or more changes in one or more sequences of one or more associations between two or more of the portions of the one or more regions of the electronic paper assembly associated with the two or more conformations of the one or more portions of the one or more regions of the electronic paper assembly such as the regions 604 of the exemplary implementation 602 of the e-paper 102 of FIG. 20.

The conformation signal module 330 is configured to direct acquisition of signals such as receiving signals from embedded sensors such as one or more of the sensors 144 of FIG. 4.

The conformation selection module 332 is configured to direct acquisition of selection information such as obtaining selection information associated with one or more changes in one or more sequences of two or more conformations of one or more portions of one or more regions of the electronic paper assembly associated with one or more conformations of one or more portions of one or more regions of the electronic paper assembly.

The origami-like folding module 334 is configured to direct acquisition of origami-like folding information (the term "origami-like" may include any sort of information related to one or more shaped object representations involving through geometric fold and/or crease patterns without gluing or cutting, such as origami, zhezhi, etc.) such as obtaining origami-like folding information associated with one or more changes in one or more sequences of two or more conformations of one or more portions of one or more regions of the electronic paper assembly such as the regions 604 of the exemplary implementation 602 of the e-paper 102 of FIG. 20.

The folding sequence module 336 is configured to direct acquisition of a folding sequence order such as obtaining one or more orders of folding sequences of one or more portions of one or more regions of the electronic paper assembly such as the regions 604 of the exemplary implementation 602 of the e-paper 102 of FIG. 20.

The origami-like shape module 338 is configured to direct acquisition of an origami-like resultant shape information such as obtaining one or more changes in one or more sequences of two or more origami-like shapes resultant from one or more folding sequences of one or more portions of one or more regions of the electronic paper assembly such as the regions 604 of the exemplary implementation 602 of the e-paper 102 of FIG. 20.

The bend angle module 342 is configured to direct acquisition of angle of bend information such as obtaining angle of bend information associated with one or more changes in one or more sequences of two or more conformations of one or more portions of one or more regions of the electronic paper assembly such as the regions 604 of the exemplary implementation 602 of the e-paper 102 of FIG. 20.

The bend number module 344 is configured to direct acquisition of bend number information such as obtaining bend number information associated with one or more changes in one or more sequences of two or more conformations of one or more portions of one or more regions of the electronic paper assembly such as the regions 604 of the exemplary implementation 602 of the e-paper 102 of FIG. 20. Bend number information may be related to the number of folds or bends that a particular conformation my have in general and/or may also relate to the number of various type of folds or bonds such as based upon the orientation and/or extent of each of the folds or bends.

The conformation force module 346 is configured to direct acquisition of force information such as obtaining force information associated with one or more changes in one or more sequences of two or more conformations of one or more portions of one or more regions of the electronic paper assembly such as the regions 604 of the exemplary implementation 602 of the e-paper 102 of FIG. 20.

The conformation transient module 348 is configured to direct acquisition of substantially transient information such as obtaining substantially transient information associated with one or more changes in one or more sequences of two or more conformations of one or more portions of one or more regions of the electronic paper assembly such as the regions 604 of the exemplary implementation 602 of the e-paper 102 of FIG. 20.

The conformation persistent module 350 is configured to direct acquisition of substantially persistent information such as obtaining substantially persistent information associated with one or more changes in one or more sequences of two or more conformations of one or more portions of one or more regions of the electronic paper assembly such as the regions 604 of the exemplary implementation 602 of the e-paper 102 of FIG. 20. Transient conformations and persistent conformations may be relative to one another depending upon the context or environment that the e-paper 102 is found in. In general, transient may mean lasting a short time whereas persistent may be defined as existing or remaining in the same shape for an indefinitely long time. For instance, in the context of reading the e-paper 102, a flick of the e-paper may cause a brief conformation during the flicking action as compared to a conformation in which the e-paper is being read. Relatively speaking, in the context of the reading, the flicking action may be viewed as transient whereas the conformation during reading of the e-paper 102 may be viewed as persistent. In another context, a transition from one conformation to another of the e-paper 102 may be viewed as a series of transient conformations whereas the before and after conformations subject to the change may be viewed as persistent. In some contexts transient could be in terms of seconds and persistent would be in terms of minutes. In other contexts transient could be in terms of minutes and persistent would be in terms of hours. In other contexts transient could be in terms of hours and persistent could be in terms of days. In other contexts transient could be in terms of fractions of seconds and persistent in terms of seconds. Other contexts may also be envisioned as being applicable. In some implementations duration parameters characterizing transient and persistent could be predetermined by the user 128 of the e-paper 102 and stored in the conformation memory 200.

The conformation gesture module 356 is configured to direct acquisition of gestured information such as obtaining gestured information associated with one or more changes in one or more sequences of two or more conformations of one or more portions of one or more regions of the electronic paper assembly such as the regions 604 of the exemplary implementation 602 of the e-paper 102 of FIG. 20.

The conformation connection module 357 is configured to direct acquisition of connection information such as obtaining connection sequence information of one or more changes in one or more sequences of two or more connections between two or more of the portions of the one or more regions of the electronic paper associated with one or more changes in one or more sequences of two or more conformations of one or more portions of one or more regions of the electronic paper assembly such as the regions 604 of the exemplary implementation 602 of the e-paper 102 of FIG. 20.

The conformation draping module 358 is configured to direct acquisition of draping information such as obtaining draping information associated with one or more changes in one or more sequences of two or more conformations of one or more portions of one or more regions of the electronic paper assembly such as the regions 604 of the exemplary implementation 602 of the e-paper 102 of FIG. 20.

The conformation wrapping module 359 is configured to direct acquisition of wrapping information such as obtaining wrapping information associated with one or more changes in one or more sequences of two or more conformations of one or more portions of one or more regions of the electronic paper assembly such as the regions 604 of the exemplary implementation 602 of the e-paper 102 of FIG. 20.

The conformation curvilinear module 360 is configured to direct acquisition of curvilinear information such as obtaining information derived through sensing one or more changes in one or more sequences of two or more curvilinear patterns of force imparted upon one or more portions of one or more regions of the electronic paper assembly such as the regions 604 of the exemplary implementation 602 of the e-paper 102 of FIG. 20.

The conformation rolling module 361 is configured to direct acquisition of rolling information such as obtaining rolling information associated with one or more changes in one or more sequences of two or more conformations of one or more portions of one or more regions of the electronic paper assembly such as the regions 604 of the exemplary implementation 602 of the e-paper 102 of FIG. 20.

The conformation hinge module 362 is configured to direct acquisition of hinge status information such as obtaining hinge status information associated with one or more changes in one or more sequences of two or more conformations of one or more portions of one or more regions of the electronic paper assembly such as the regions 604 of the exemplary implementation 602 of the e-paper 102 of FIG. 20.

The bend radius module 363 is configured to direct filtering of information based upon radius of bend such as filtering information based upon radius of bend associated with one or more changes in one or more sequences of two or more conformations of one or more portions of one or more regions of the electronic paper assembly such as the regions 604 of the exemplary implementation 602 of the e-paper 102 of FIG. 20.

The fold ratio module 364 is configured to direct acquisition of folded to unfolded ratio information such as obtaining folded to unfolded ratio information associated with one or more changes in one or more sequences of two or more conformations of one or more portions of one or more regions of the electronic paper assembly such as the regions 604 of the exemplary implementation 602 of the e-paper 102 of FIG. 20.

Figure 12:
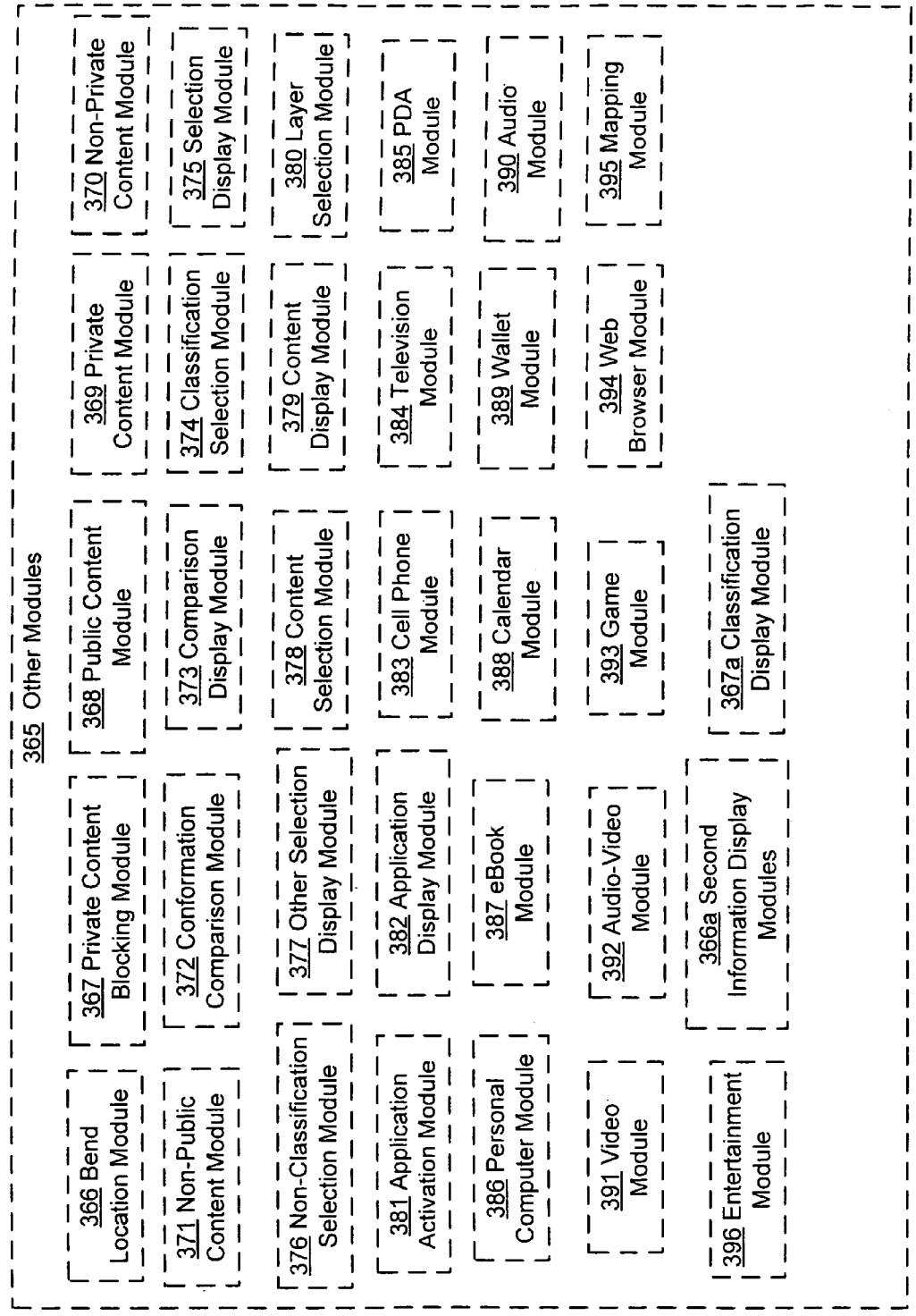
FIG. 12 is a block diagram showing detail of exemplary implementations of intra-e-paper modules of the exemplary implementation of the intra-e-paper assembly of FIG. 2.

An exemplary implementation of the other modules 365 is shown in FIG. 12 as optionally having a bend location module 366, a private content blocking module 367, a public content module 368, a private content module 369, a non-private content module 370, a non-public content module 371, a conformation comparison module 372, a comparison display module 373, a classification selection module 374, a selection display module 375, a non-classification selection module 376, an other selection display module 377, a content selection module 378, a content display module 379, a layer selection module 380, an application activation module 381, an application display module 382, a cell phone module 383, a television module 384, a PDA module 385, a personal computer module 386, an eBook module 387, a calendar module 388, a wallet module 389, an audio module 390, a video module 391, an audio-video module 392, a game module 393, a web browser module 394, a mapping module 395, an entertainment module 396, second information display modules 366a, and a classification display module 367a.

The bend location module 366 is configured to direct acquisition of bend location information such as obtaining bend location information associated with one or more changes in one or more sequences of two or more conformations of one or more portions of one or more regions of the electronic paper assembly such as the regions 604 of the exemplary implementation 602 of the e-paper 102 of FIG. 20.

The second information display module 366a is configured to direct display such as displaying the second information as having one or more classifications.

The private content module blocking module 367 is configured to direct display of public content, such as public content 622 of FIG. 23, on one or more portions of a surface display layer, such as surface display 608c of FIG. 21, viewable from a display surface, such as display surface 612 of FIG. 23, and to block an internal display layer, such as internal display layer 608c of FIG. 21, from displaying private content, such as private content 620 of FIG. 23, that would otherwise be viewed from the display surface, such as the display surface 612, from being viewed from the display surface.

The public content module 368 is configured to direct display of public content, such as public content 622 of FIG. 23, on one or more portions of the one or more display layers, such as surface display layer 608c of FIG. 21.

The private content module 369 is configured to direct display of private content, such as private content 620 of FIG.

23, on one or more portions of the one or more display layers, such as the surface display layer 608*a* of FIG. 21.

The non-private content module 370 is configured to direct display of other than private content, such as public content 622 of FIG. 23, on one or more portions of the one or more display layers, such as surface display layer 608*c* of FIG. 21.

The non-public content module 371 is configured to direct display of other than public content, such as private content 620 of FIG. 23, on one or more portions of the one or more display layers, such as surface display layer 608*a* of FIG. 21.

The conformation comparison module 372 is configured to direct comparing of stored data, such as data stored in the conformation logic 198 of FIG. 8, with the first information associated with one or more conformations of one or more portions of one or more regions of the electronic paper assembly such as the regions 604 of the exemplary implementation 602 of the e-paper 102 of FIG. 20.

The comparison display module 373 is configured to direct displaying on one or more portions of the one or more display layers, such as display layers 608, in response to the comparing of stored data with the one or more conformations of one or more portions of one or more regions of the electronic paper assembly, such as the regions 604 of the exemplary implementation 602 of the e-paper 102 of FIG. 20.

The classification selection module 374 is configured to direct selecting one or more of the classifications, such as private content 620 and/or public content 622 of FIG. 23 of the second information having one or more classifications.

The selection display module 375 is configured to direct displaying on one or more portions of the one or more display layers, such as display layers 608 of FIG. 23, in response to the one or more classification selection modules directing selecting one or more of the classifications, such as private content 620 and/or public content 622 of FIG. 23 of the second information having one or more classifications.

The non-classification selection module 376 is configured to direct selecting other than one or more of the classifications, such as other than private content 620 and/or public content 622 of FIG. 23 of the second information having one or more classifications.

The other selection display module 377 is configured to direct displaying on one or more portions of one or more display layers, such as display layers 608 of FIG. 21, in response to the selecting other than one or more of the classifications of the second information having one or more classifications.

The content selection module 378 is configured to direct selection such as selecting content to be displayed based upon the obtaining information associated with one or more changes in one or more sequences of two or more conformations of one or more portions of one or more regions of the electronic paper assembly such as public content 622 of FIG. 23, on one or more portions of a surface display layer, such as surface display 608*c* of FIG. 21.

The content display module 379 is configured to direct display of content such as displaying the content to be displayed on one or more portions of one or more display layers such as public content 622 of FIG. 23, on one or more portions of the one or more display layers, such as surface display layer 608*c* of FIG. 21.

The layer selection module 380 is configured to select one or more display layers for display of the selected content such as selecting one or more portions of one or more display layers to display one or more content based upon the obtaining information associated with one or more changes in one or more sequences of two or more conformations of one or more portions of one or more regions of the electronic paper assembly such as private content 620 of FIG. 23, on one or more portions of the one or more display layers, such as the surface display layer 608*a* of FIG. 21.

The application activation module 381 is configured to activate one or more applications such as activating one or more portions of one or more applications based upon the obtaining information associated with one or more changes in one or more sequences of two or more conformations of one or more portions of one or more regions of the electronic paper assembly contained in the application storage 168 through the application control 166 of the application unit 118 of FIG. 6.

The application display module 382 is configured to direct display of one or more activated applications such as for each of the one or more activated applications, displaying one or more output from the activated application on one or more display layers such as surface display layer 608*a* of FIG. 21.

The cell phone module 383 is configured to provide cell phone functionality in response to the application activation module 381 activating one or more portions of one or more cell phone applications.

The television module 384 is configured to provide television functionality in response to the application activation module 381 activating one or more portions of one or more television applications.

The personal digital assistant (PDA) module 385 is configured to provide PDA functionality in response to the application activation module 381 activating one or more portions of one or more personal digital assistant (PDA) applications.

The personal computer module 386 is configured to provide personal computer functionality in response to the application activation module 381 activating one or more portions of one or more personal computer applications.

The eBook module 387 is configured to provide eBook functionality in response to the application activation module 381 activating one or more portions of one or more eBook applications.

The calendar module 388 is configured to calendaring functionality in response to the application activation module 381 activating one or more portions of one or more calendar applications.

The wallet module 389 is configured to provide wallet-like functionality in response to the application activation module 381 activating one or more portions of one or more wallet applications.

The audio module 390 is configured to provide audio functionality in response to the application activation module 381 activating one or more portions of one or more audio applications.

The video module 391 is configured to provide video functionality in response to the application activation module 381 activating one or more portions of one or more video applications.

The audio-video module 392 is configured to provide audio-video functionality in response to the application activation module 381 activating one or more portions of one or more audio-video applications.

The game module 393 is configured to provide game functionality in response to the application activation module 381 activating one or more portions of one or more game applications.

The web browser module 394 is configured to provide web browser functionality in response to the application activation module 381 activating one or more portions of one or more web browser applications.

The mapping module 395 is configured to provide mapping functionality in response to the application activation module 381 activating one or more portions of one or more mapping applications.

The entertainment module 396 is configured to provide entertainment functionality in response to the application activation module 381 activating one or more portions of one or more entertainment applications.

Figure 13:
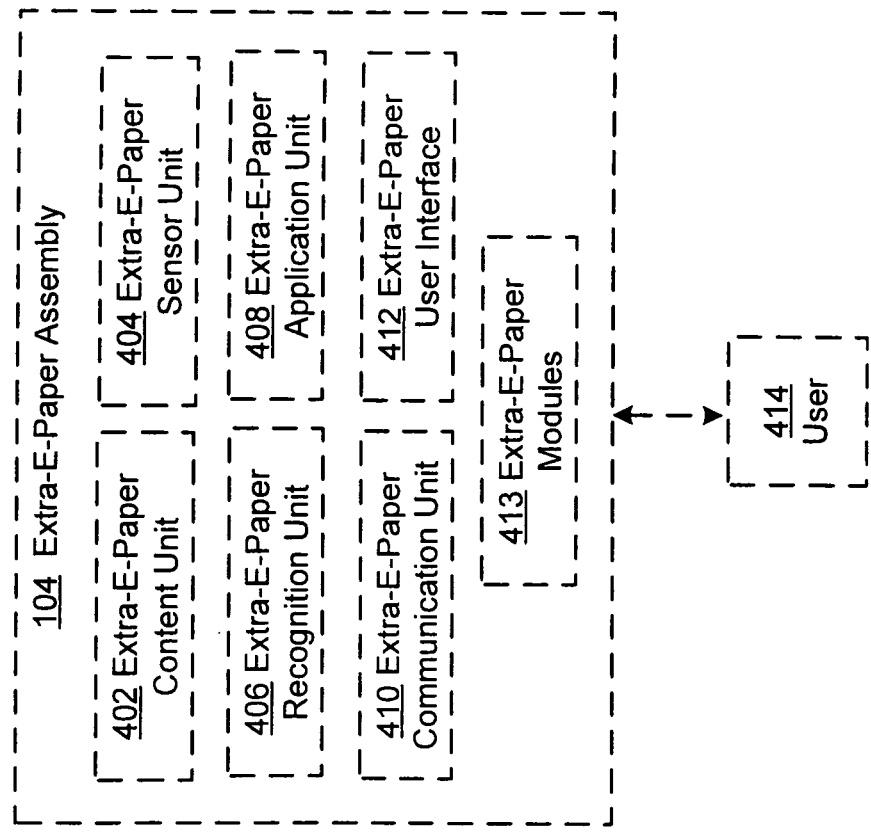
FIG. 13 is a block diagram of an exemplary implementation of one of the optional extra-e-paper assemblies of FIG. 1 showing further detail.

An exemplary implementation of the external device 104 is shown in FIG. 13 as optionally having a content unit 402, a sensor unit 404, a recognition unit 406, an application unit 408, a communication unit 410, and a user interface 412. A user 414 is shown interacting with the external device 104 such as through visual information retrieval, physical manipulation of the external device, or other interaction.

Figure 14:
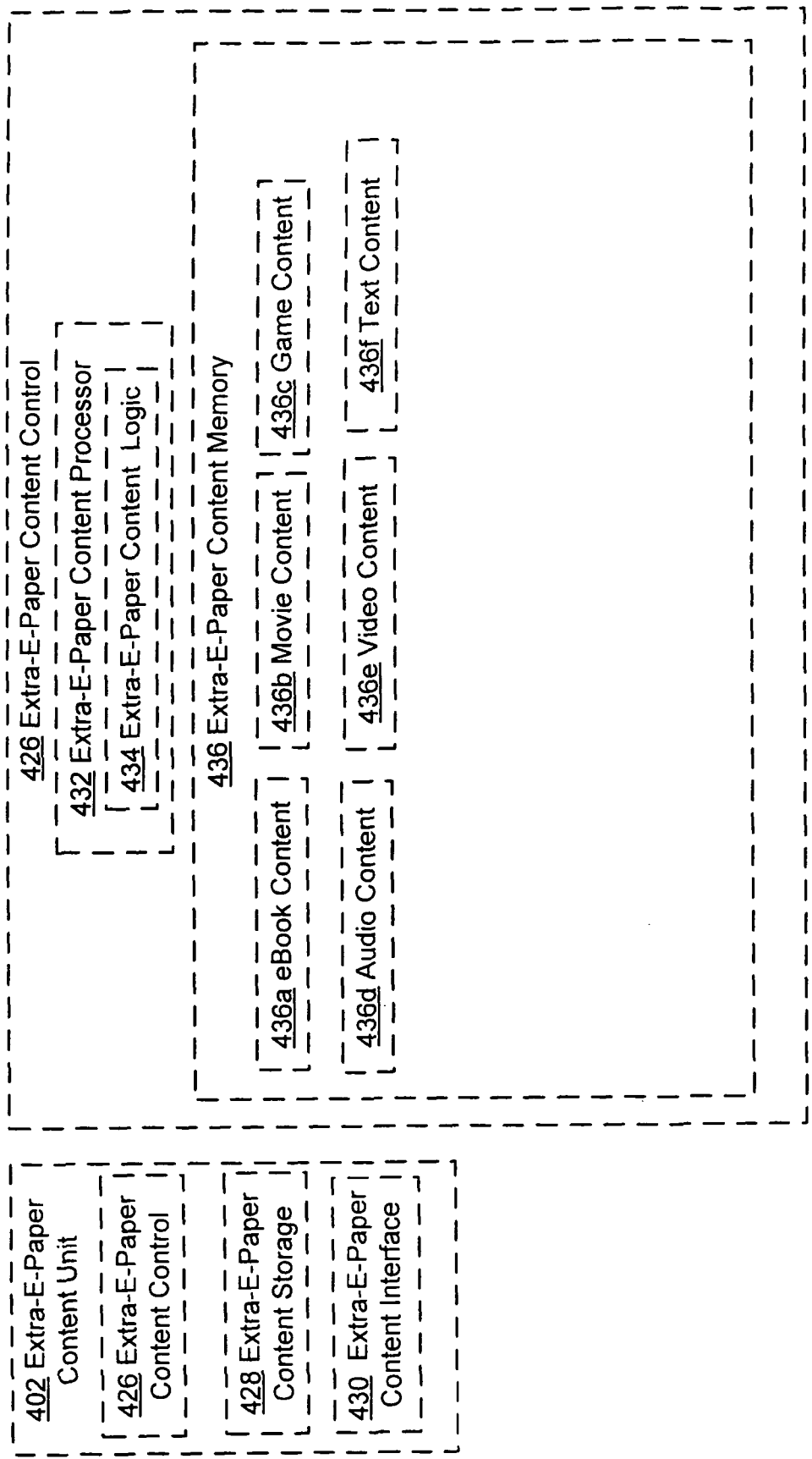
FIG. 14 is a block diagram showing detail of an exemplary implementation of a content unit of the exemplary implementation of the extra-e-paper assembly of FIG. 13.

An exemplary implementation of the content unit 402 is shown in FIG. 14 as optionally having a content control 426, a content storage 428, and a content interface 430. Further shown in FIG. 14, an exemplary implementation of the content control 426 optionally has a content processor 432 with a content logic 434, and a content memory 436. In some implementations, the content memory 436 can include one or more of eBook content 436a, movie content 436b, game content 436c, audio content 436d, video content 436e, and/or text content 436f.

Figure 15:
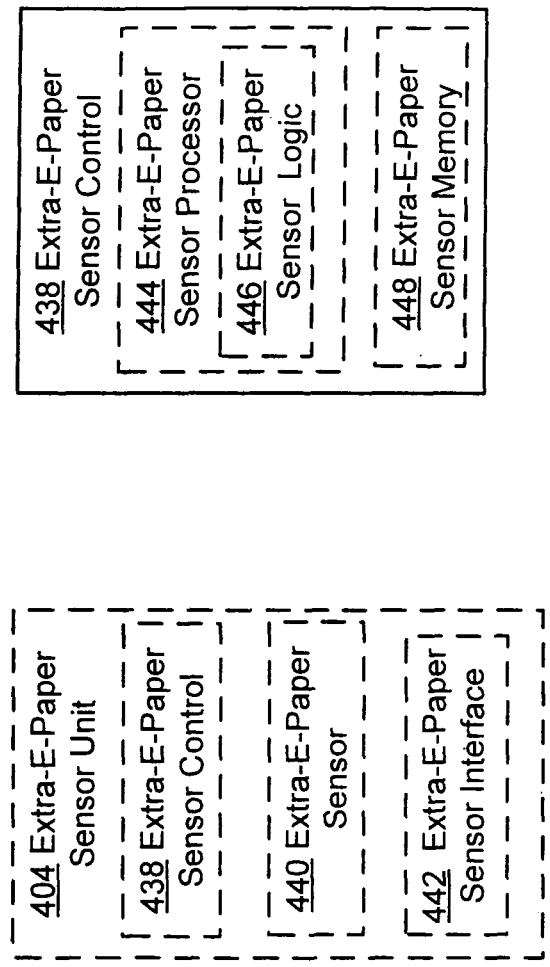
FIG. 15 is a block diagram showing detail of an exemplary implementation of a sensor unit of the exemplary implementation of the extra-e-paper assembly of FIG. 13.

An exemplary implementation of the sensor unit 404 is shown in FIG. 15 as optionally having a sensor control 438, a sensor 440, and a sensor interface 442. The sensor 440 can be one or more of various position and/or conformation sensors to detect or otherwise determine position of one or more instances of the e-paper 102 and/or portions thereof. The sensor 440 can include optical sensors, imaging sensors, radio frequency sensors such as RFID, acoustic sensors, vibrational sensors, table top reference sensors, boundary transducer sensors located in proximity to the e-paper 102, and/or edge detection sensors located in proximity to the e-paper. The sensor unit 404 can also include the sensor 440 as portion of a reference system that works in conjunction with one or more instances of the intra-e-paper sensor unit 114. In a reference system as such, the sensor 440, acting as a portion of the system, would transmit a type of reference signal, beacon, etc that one or more instances of the sensor unit 114 of one or more instances of the e-paper 102 would receive to use in determining position. The sensor 440 portion could send such signals as radio triangulation, global position satellite (GPS), acoustic, visible light, invisible light, electromagnetic, etc that one or more of the sensor units 114 could use to determine position of the one or more e-papers 102. Further shown in FIG. 15, an exemplary implementation of the sensor control 438 optionally has a sensor processor 444 with a sensor logic 446, and a sensor memory 448, which can among other things be used to determine position of the e-paper 102 or portions thereof when used in conjunction with the sensor units 114 as part of a reference system described above.

Figure 16:
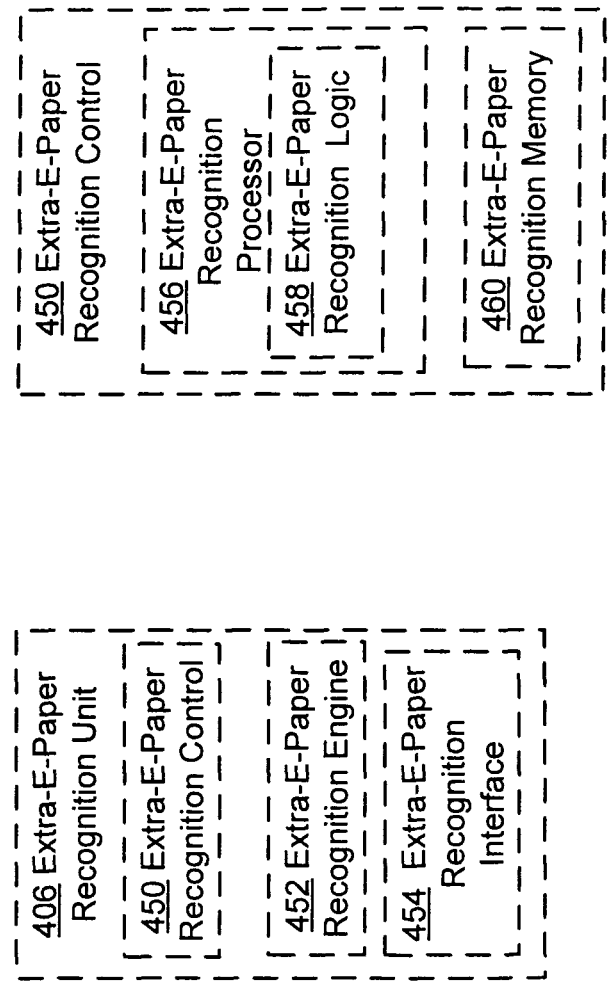
FIG. 16 is a block diagram showing detail of an exemplary implementation of a recognition unit of the exemplary implementation of the extra-e-paper assembly of FIG. 13.

An exemplary implementation of the recognition unit 406 is shown in FIG. 16 as optionally having a recognition control 450, a recognition engine 452, and a recognition interface 454. Further shown in FIG. 16, an exemplary implementation of the recognition control 450 optionally has a recognition processor 456 with a recognition logic 458, and a recognition memory 460.

Figure 17:
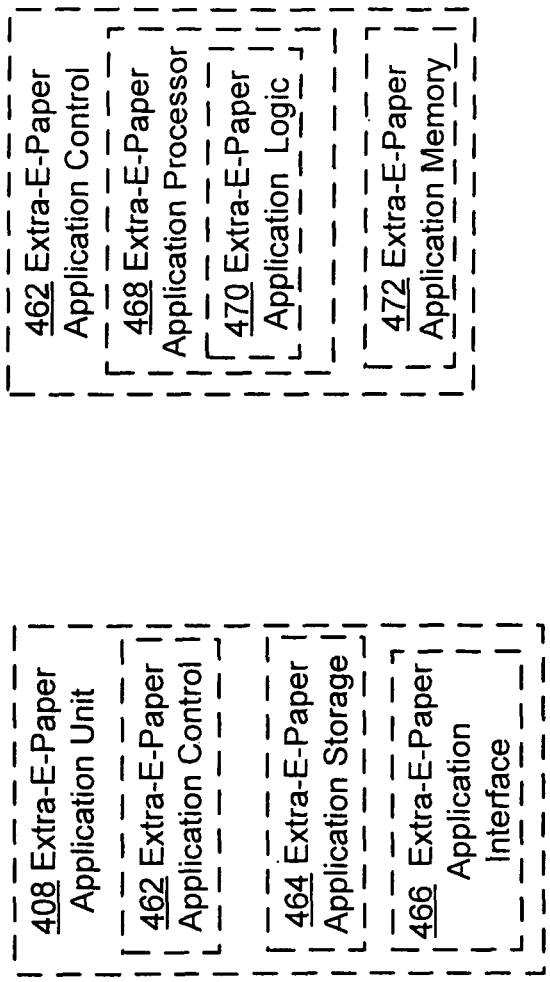
FIG. 17 is a block diagram showing detail of an exemplary implementation of an application unit of the exemplary implementation of the extra-e-paper assembly of FIG. 13.

An exemplary implementation of the application unit 408 is shown in FIG. 17 as optionally having an application control 462, an application storage 464, and an application interface 466. Further shown in FIG. 17, an exemplary implementation of the application control 462 optionally has an application processor 468 with an application logic 470, and an application memory 472.

Figure 18:
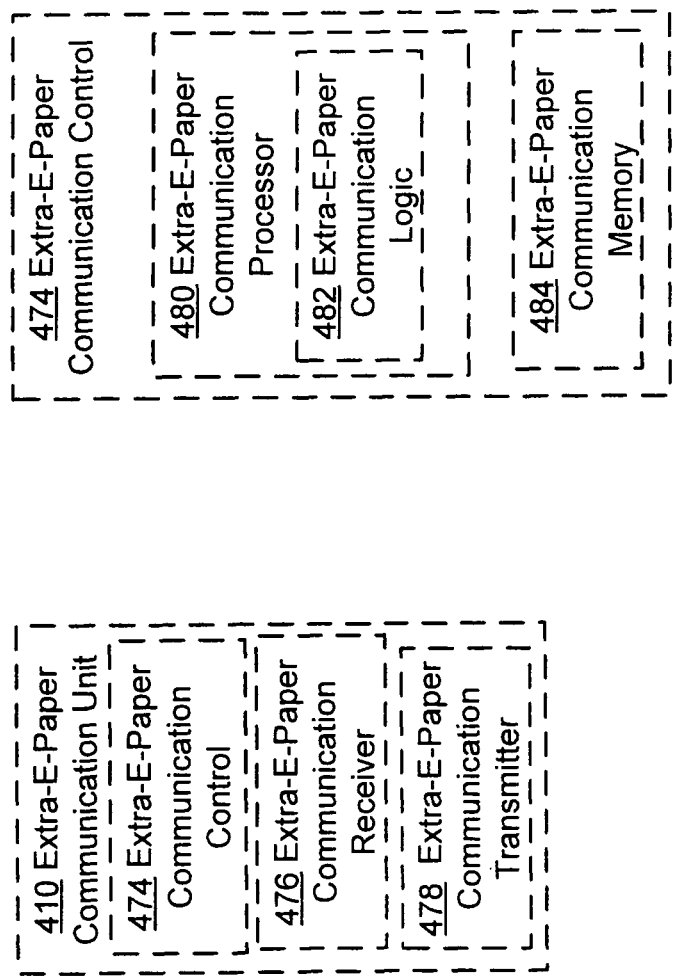
FIG. 18 is a block diagram showing detail of an exemplary implementation of a communication unit of the exemplary implementation of the extra-e-paper assembly of FIG. 13.

An exemplary implementation of the communication unit 410 is shown in FIG. 18 as optionally having a communication control 474, a communication receiver 476, and a communication transmitter 478. Further shown in FIG. 18, an exemplary implementation of the communication control 474 optionally has a communication processor 480 with a communication logic 482, and a communication memory 484.

Figure 19:
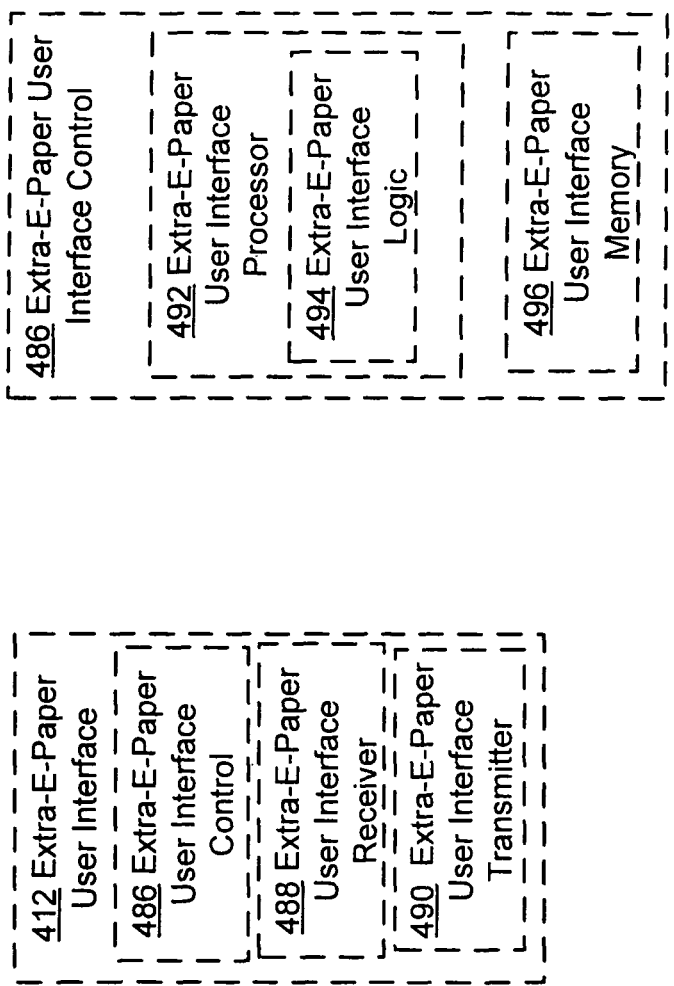
FIG. 19 is a block diagram showing detail of an exemplary implementation of a user interface unit of the exemplary implementation of the extra-e-paper assembly of FIG. 13.

An exemplary implementation of the user interface unit 412 is shown in FIG. 19 as optionally having a user interface control 486, user interface receiver 488, and a user interface transmitter 490. Further shown in FIG. 19, an exemplary implementation of the user interface control 486 optionally has a user interface processor 492 with a user interface logic 494, and a user interface memory 496.

Figure 19A:
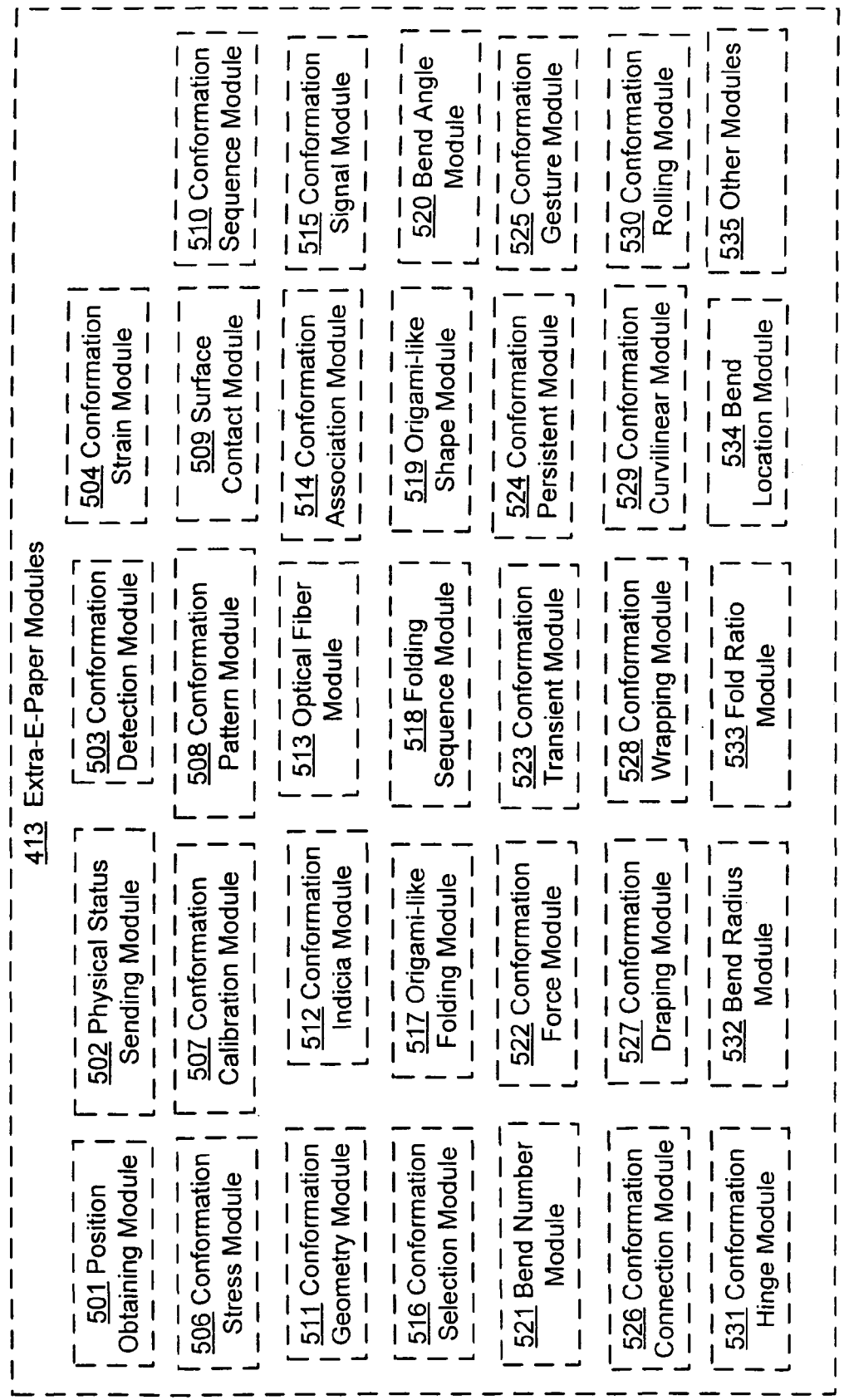
FIG. 19A is a block diagram showing detail of an exemplary implementation of a user interface unit of the exemplary implementation of the extra-e-paper assembly of FIG. 13.

Exemplary implementations of modules of the extra-e-paper modules 413 of the extra-e-paper assembly 104 is shown in FIG. 19A as optionally having a position obtaining module 501, a physical status sending module 502, a conformation detection module 503, a conformation strain module 504, a conformation stress module 506, a conformation calibration module 507, a conformation pattern module 508, a surface contact module 509, a conformation sequence module 510, a conformation geometry module 511, a conformation indicia module 512, an optical fiber module 513, a conformation association module 514, a conformation signal module 515, a conformation selection module 516, an origami-like folding module 517, a folding sequence module 518, an origami-like shape module 519, a bend angle module 520, a bend number module 521, a conformation force module 522, a conformation transient module 523, a conformation persistent module 524, a conformation gesture module 525, a conformation connection module 526, a conformation draping module 527, a conformation wrapping module 528, a conformation curvilinear module 529, a conformation rolling module 530, a conformation hinge module 531, a bend radius module 532, a fold ratio module 533, a bend location module 534, and an other modules 535.

The position obtaining module 501 is configured to direct acquisition of first information such as obtaining first information regarding one or more positions of one or more portions of one or more regions of the electronic paper assembly such as the e-paper 102 of FIG. 2.

The physical status sending module 502 is configured to send physical status such as sending one or more application related information portions to the electronic paper assembly based upon the obtaining of the first information such sending to the e-paper 102 of FIG. 2.

The conformation detection module 503 is configured to direct acquisition of detection information such as obtaining detection information associated with one or more positions of one or more portions of one or more regions of the electronic paper assembly such as the regions 604 of the exemplary implementation 602 of the e-paper 102 of FIG. 20. The conformation detection module 503 can direct acquisition of detection information by the conformation detection module 306 through communication between the intra-e-paper assembly 102 and the extra-e-paper assembly 104 through the intra-extra information flow 106 and the extra-intra information flow 108.

The conformation strain module 504 is configured to direct acquisition of strain information such as obtaining strain information associated with one or more positions of one or more portions of one or more regions of the electronic paper assembly such as the regions 604 of the exemplary implementation 602 of the e-paper 102 of FIG. 20. The conformation strain module 504 can direct acquisition of strain information by the conformation strain module 308 through communication between the intra-e-paper assembly 102 and the extra-e-paper assembly 104 through the intra-extra information flow 106 and the extra-intra information flow 108.

The conformation stress module 506 is configured to direct acquisition of stress information such as obtaining stress information associated with one or more positions of one or more portions of one or more regions of the electronic paper assembly such as the regions 604 of the exemplary implementation 602 of the e-paper 102 of FIG. 20. The conformation stress module 506 can direct acquisition of stress information by the conformation stress module 310 through communication between the intra-e-paper assembly 102 and the extra-e-paper assembly 104 through the intra-extra information flow 106 and the extra-intra information flow 108.

The conformation calibration module 507 is configured to direct acquisition of calibration related information such as obtaining calibration related information associated with one or more positions of one or more portions of one or more regions of the electronic paper assembly such as the regions 604 of the exemplary implementation 602 of the e-paper 102 of FIG. 20. The conformation calibration module 507 can direct acquisition of calibration information by the conformation calibration module 312 through communication between the intra-e-paper assembly 102 and the extra-e-paper assembly 104 through the intra-extra information flow 106 and the extra-intra information flow 108.

The conformation pattern module 508 is configured to direct acquisition of pattern information such as obtaining pattern information associated with one or more positions of one or more portions of one or more regions of the electronic paper assembly such as the regions 604 of the exemplary implementation 602 of the e-paper 102 of FIG. 20. The conformation pattern module 504 can direct acquisition of pattern information by the conformation pattern module 314 through communication between the intra-e-paper assembly 102 and the extra-e-paper assembly 104 through the intra-extra information flow 106 and the extra-intra information flow 108.

The surface contact module 509 is configured to direct acquisition of surface contact information such as obtaining surface contact information associated with one or more positions of one or more portions of one or more regions of the electronic paper assembly such as the regions 604 of the exemplary implementation 602 of the e-paper 102 of FIG. 20. The surface contact module 509 can direct acquisition of surface contact information by the surface contact module 316 through communication between the intra-e-paper assembly 102 and the extra-e-paper assembly 104 through the intra-extra information flow 106 and the extra-intra information flow 108.

The conformation sequence module 510 is configured to direct acquisition of sequence information such as obtaining sequence information associated with one or more positions of one or more portions of one or more regions of the electronic paper assembly such as the regions 604 of the exemplary implementation 602 of the e-paper 102 of FIG. 20. The conformation sequence module 510 can direct acquisition of sequence information by the conformation sequence module 318 through communication between the intra-e-paper assembly 102 and the extra-e-paper assembly 104 through the intra-extra information flow 106 and the extra-intra information flow 108.

The conformation geometry module 511 is configured to direct acquisition of geometrical information such as obtaining geometrical information associated with one or more positions of one or more portions of one or more regions of the electronic paper assembly such as the regions 604 of the exemplary implementation 602 of the e-paper 102 of FIG. 20. The conformation geometry module 511 can direct acquisition of geometry information by the conformation geometry module 320 through communication between the intra-e-paper assembly 102 and the extra-e-paper assembly 104 through the intra-extra information flow 106 and the extra-intra information flow 108.

The conformation indicia module 512 is configured to direct acquisition of indicia information such as obtaining information related to predetermined indicia associated with one or more positions of one or more portions of one or more regions of the electronic paper assembly such as the regions 604 of the exemplary implementation 602 of the e-paper 102 of FIG. 20. The conformation indicia module 512 can direct acquisition of indicia information by the conformation indicia module 324 through communication between the intra-e-paper assembly 102 and the extra-e-paper assembly 104 through the intra-extra information flow 106 and the extra-intra information flow 108. Predetermined indicia could be stored in the sensor memory 152 of the sensor control 142 of the sensor 114 and may be related to one or more measurement results of one or more readings by one or more o the sensors 144. One or more measurement results by one or more of the sensors 144 could thus be characterized by the predetermined indicia. Predetermined indicia could be stored in the recognition memory 164 of the recognition control 154 of the recognition unit 116 and may be related to one or more recognition results of the recognition engine 156. One or more recognition results by the recognition engine 156 could thus be characterized by the predetermined indicia.

The optical fiber module 513 is configured to direct acquisition of optical fiber derived information such as obtaining optical fiber derived information associated with one or more positions of one or more portions of one or more regions of the electronic paper assembly such as the regions 604 of the exemplary implementation 602 of the e-paper 102 of FIG. 20. The optical fiber module 513 can direct acquisition of optical fiber derived information by the optical fiber module 326 through communication between the intra-e-paper assembly 102 and the extra-e-paper assembly 104 through the intra-extra information flow 106 and the extra-intra information flow 108.

The conformation association module 514 is configured to direct acquisition of association information such as obtaining information based on one or more associations between two or more of the positions of one or more portions of one or more regions of the electronic paper assembly such as the regions 604 of the exemplary implementation 602 of the e-paper 102 of FIG. 20. The conformation association module 514 can direct acquisition of association information by the conformation association module 328 through communication between the intra-e-paper assembly 102 and the extra-e-paper assembly 104 through the intra-extra information flow 106 and the extra-intra information flow 108.

The conformation signal module 515 is configured to direct acquisition of signals such as receiving signals from embedded sensors such as one or more of the sensors 144 of FIG. 4. The conformation signal module 515 can direct acquisition of signal information by the conformation signal module 330 through communication between the intra-e-paper assembly 102 and the extra-e-paper assembly 104 through the intra-extra information flow 106 and the extra-intra information flow 108.

The conformation selection module 516 is configured to direct acquisition of selection information such as obtaining selection information associated with one or more positions of one or more portions of one or more regions of the electronic paper assembly associated with one or more conformations of one or more portions of one or more regions of the electronic paper assembly. The conformation selection module 516 can direct acquisition of selection information by the conformation selection module 332 through communication between the intra-e-paper assembly 102 and the extra-e-paper assembly 104 through the intra-extra information flow 106 and the extra-intra information flow 108.

The origami-like folding module 517 is configured to direct acquisition of origami-like folding information (the term "origami-like" may include any sort of information related to one or more shaped object representations involving through geometric fold and/or crease patterns without gluing or cutting, such as origami, zhezhi, etc.) such as obtaining origami-like folding information associated with one or more positions of one or more portions of one or more regions of the electronic paper assembly such as the regions 604 of the exemplary implementation 602 of the e-paper 102 of FIG. 20. The origami-like folding module 517 can direct acquisition of origami-like folding information by the origami-like folding module 334 through communication between the intra-e-paper assembly 102 and the extra-e-paper assembly 104 through the intra-extra information flow 106 and the extra-intra information flow 108.

The folding sequence module 518 is configured to direct acquisition of a folding sequence order such as obtaining information regarding one or more orders of folding sequences of one or more portions of one or more regions of the electronic paper assembly associated with one or more positions of one or more portions of one or more regions of the electronic paper assembly such as the regions 604 of the exemplary implementation 602 of the e-paper 102 of FIG. 20. The folding sequence module 518 can direct acquisition of folding sequence order by the folding sequence module 336 through communication between the intra-e-paper assembly 102 and the extra-e-paper assembly 104 through the intra-extra information flow 106 and the extra-intra information flow 108.

The origami-like shape module 519 is configured to direct acquisition of an origami-like resultant shape information such as obtaining information regarding two or more origami-like shapes resultant from one or more folding sequences of one or more portions of one or more regions of the electronic paper assembly associated with one or more positions of one or more portions of one or more regions of the electronic paper assembly such as the regions 604 of the exemplary implementation 602 of the e-paper 102 of FIG. 20. The origami-like shape module 519 can direct acquisition of origami-like resultant shape information by the origami-like shape module 338 through communication between the intra-e-paper assembly 102 and the extra-e-paper assembly 104 through the intra-extra information flow 106 and the extra-intra information flow 108.

The bend angle module 520 is configured to direct acquisition of angle of bend information such as obtaining angle of bend information associated with one or more positions of one or more portions of one or more regions of the electronic paper assembly such as the regions 604 of the exemplary implementation 602 of the e-paper 102 of FIG. 20. The bend angle module 520 can direct acquisition of bend angle information by the bend angle module 342 through communication between the intra-e-paper assembly 102 and the extra-e-paper assembly 104 through the intra-extra information flow 106 and the extra-intra information flow 108.

The bend number module 521 is configured to direct acquisition of bend number information such as obtaining bend number information associated with one or more positions of one or more portions of one or more regions of the electronic paper assembly such as the regions 604 of the exemplary implementation 602 of the e-paper 102 of FIG. 20. Bend number information may be related to the number of folds or bends that a particular conformation my have in general and/or may also relate to the number of various type of folds or bonds such as based upon the orientation and/or extent of each of the folds or bends. The bend number module 521 can direct acquisition of bend number information by the bend number module 344 through communication between the intra-e-paper assembly 102 and the extra-e-paper assembly 104 through the intra-extra information flow 106 and the extra-intra information flow 108.

The conformation force module 522 is configured to direct acquisition of force information such as obtaining force information associated with one or more positions of one or more portions of one or more regions of the electronic paper assembly such as the regions 604 of the exemplary implementation 602 of the e-paper 102 of FIG. 20. The conformation force module 522 can direct acquisition of force information by the conformation force module 346 through communication between the intra-e-paper assembly 102 and the extra-e-paper assembly 104 through the intra-extra information flow 106 and the extra-intra information flow 108.

The conformation transient module 523 is configured to direct acquisition of substantially transient information such as obtaining substantially transient information associated with one or more positions of one or more portions of one or more regions of the electronic paper assembly such as the regions 604 of the exemplary implementation 602 of the e-paper 102 of FIG. 20. The conformation transient module 523 can direct acquisition of substantially transient information by the conformation transient module 348 through communication between the intra-e-paper assembly 102 and the extra-e-paper assembly 104 through the intra-extra information flow 106 and the extra-intra information flow 108.

The conformation persistent module 524 is configured to direct acquisition of substantially persistent information such as obtaining substantially persistent information associated with one or more positions of one or more portions of one or more regions of the electronic paper assembly such as the regions 604 of the exemplary implementation 602 of the e-paper 102 of FIG. 20. Transient conformations and persistent conformations may be relative to one another depending upon the context or environment that the e-paper 102 is found in. In general, transient may mean lasting a short time whereas persistent may be defined as existing or remaining in the same shape for an indefinitely long time. For instance, in the context of reading the e-paper 102, a flick of the e-paper may cause a brief conformation during the flicking action as compared to a conformation in which the e-paper is being read. Relatively speaking, in the context of the reading, the flicking action may be viewed as transient whereas the conformation during reading of the e-paper 102 may be viewed as persistent. In another context, a transition from one conformation to another of the e-paper 102 may be viewed as a series of transient conformations whereas the before and after conformations subject to the change may be viewed as persistent. In some contexts transient could be in terms of seconds and persistent would be in terms of minutes. In other contexts transient could be in terms of minutes and persistent would be in terms of hours. In other contexts transient could be in terms of hours and persistent could be in terms of days. In other contexts transient could be in terms of fractions of seconds and persistent in terms of seconds. Other contexts may also be envisioned as being applicable. In some implementations duration parameters characterizing transient and persistent could be predetermined by the user 128 of the e-paper 102 and stored in the conformation memory 200. The conformation persistent module 524 can direct acquisition of substantially persistent information by the conformation persistent module 350 through communication between the intra-e-paper assembly 102 and the extra-e-paper assembly 104 through the intra-extra information flow 106 and the extra-intra information flow 108.

The conformation gesture module 525 is configured to direct acquisition of gestured information such as obtaining gestured information associated with one or more positions of one or more portions of one or more regions of the electronic paper assembly such as the regions 604 of the exemplary implementation 602 of the e-paper 102 of FIG. 20. The conformation gesture module 525 can direct acquisition of gestured information by the conformation gesture module 356 through communication between the intra-e-paper assembly 102 and the extra-e-paper assembly 104 through the intra-extra information flow 106 and the extra-intra information flow 108.

The conformation connection module 526 is configured to direct acquisition of connection information such as obtaining connection sequence information of two or more connections between two or more of the portions of the one or more regions of the electronic paper associated with one or more positions of one or more portions of one or more regions of the electronic paper assembly such as the regions 604 of the exemplary implementation 602 of the e-paper 102 of FIG. 20. The conformation connection module 526 can direct acquisition of connection information by the conformation connection module 357 through communication between the intra-e-paper assembly 102 and the extra-e-paper assembly 104 through the intra-extra information flow 106 and the extra-intra information flow 108.

The conformation draping module 527 is configured to direct acquisition of draping information such as obtaining draping information associated with one or more positions of one or more portions of one or more regions of the electronic paper assembly such as the regions 604 of the exemplary implementation 602 of the e-paper 102 of FIG. 20. The conformation draping module 527 can direct acquisition of draping information by the conformation draping module 358 through communication between the intra-e-paper assembly 102 and the extra-e-paper assembly 104 through the intra-extra information flow 106 and the extra-intra information flow 108.

The conformation wrapping module 528 is configured to direct acquisition of wrapping information such as obtaining wrapping information associated with one or more positions of one or more portions of one or more regions of the electronic paper assembly such as the regions 604 of the exemplary implementation 602 of the e-paper 102 of FIG. 20. The conformation wrapping module 528 can direct acquisition of wrapping information by the conformation wrapping module 359 through communication between the intra-e-paper assembly 102 and the extra-e-paper assembly 104 through the intra-extra information flow 106 and the extra-intra information flow 108.

The conformation curvilinear module 529 is configured to direct acquisition of curvilinear information such as obtaining information derived through sensing one or more curvilinear patterns of force imparted upon one or more portions of one or more regions of the electronic paper assembly associated with one or more positions of one or more portions of one or more regions of the electronic paper assembly such as the regions 604 of the exemplary implementation 602 of the e-paper 102 of FIG. 20. The conformation curvilinear module 529 can direct acquisition of curvilinear information by the conformation curvilinear module 380 through communication between the intra-e-paper assembly 102 and the extra-e-paper assembly 104 through the intra-extra information flow 106 and the extra-intra information flow 108.

The conformation rolling module 530 is configured to direct acquisition of rolling information such as obtaining rolling information associated with one or more positions of one or more portions of one or more regions of the electronic paper assembly such as the regions 604 of the exemplary implementation 602 of the e-paper 102 of FIG. 20. The conformation rolling module 530 can direct acquisition of rolling information by the conformation rolling module 361 through communication between the intra-e-paper assembly 102 and the extra-e-paper assembly 104 through the intra-extra information flow 106 and the extra-intra information flow 108.

The conformation hinge module 531 is configured to direct acquisition of hinge status information such as obtaining hinge status information associated with one or more positions of one or more portions of one or more regions of the electronic paper assembly such as the regions 604 of the exemplary implementation 602 of the e-paper 102 of FIG. 20. The conformation hinge module 531 can direct acquisition of hinge status information by the conformation hinge module 362 through communication between the intra-e-paper assembly 102 and the extra-e-paper assembly 104 through the intra-extra information flow 106 and the extra-intra information flow 108.

The bend radius module 532 is configured to direct filtering of information based upon radius of bend such as filtering information based upon radius of bend associated with one or more positions of one or more portions of one or more regions of the electronic paper assembly such as the regions 604 of the exemplary implementation 602 of the e-paper 102 of FIG. 20. The bend radius module 532 can direct acquisition of strain information by the bend radius module 363 through communication between the intra-e-paper assembly 102 and the extra-e-paper assembly 104 through the intra-extra information flow 106 and the extra-intra information flow 108.

The fold ratio module 533 is configured to direct acquisition of folded to unfolded ratio information such as obtaining folded to unfolded ratio information associated with one or more positions of one or more portions of one or more regions of the electronic paper assembly such as the regions 604 of the exemplary implementation 602 of the e-paper 102 of FIG. 20. The fold ratio module 533 can direct acquisition of fold ratio information by the fold ratio module 364 through communication between the intra-e-paper assembly 102 and the extra-e-paper assembly 104 through the intra-extra information flow 106 and the extra-intra information flow 108.

The bend location module 534 is configured to direct acquisition of bend location information such as obtaining bend location information associated with one or more positions of one or more portions of one or more regions of the electronic paper assembly such as the regions 604 of the exemplary implementation 602 of the e-paper 102 of FIG. 20. The bend location module 534 can direct acquisition of bend location information by the bend location module 366 through communication between the intra-e-paper assembly 102 and the extra-e-paper assembly 104 through the intra-extra information flow 106 and the extra-intra information flow 108.

Exemplary implementations of modules of the other modules 535 of the extra-e-paper assembly 104 is shown in FIG. 19B as optionally having a position detection module 536, a relative position obtaining module 537, an RFID obtaining module 538, an edge obtaining module 539, an inclinometer obtaining module 540, an accelerometer obtaining module 541, a gyroscopic obtaining module 542, an inertial obtaining module 543, a geographical obtaining module 544, a reference obtaining module 545, a GPS obtaining module 546, a table obtaining module 547, a position obtaining-module 548, an edge detection module 549, a beacon obtaining module 550, a light obtaining module 551, a triangulation obtaining module 552, an audio obtaining module 553, a map location obtaining module 554, a location obtaining module 555, a first information sending module 556, a conformation sending module 557, a conformation change module 558, a sequence sending module 559, a sequence change module 560, an orientation sending module 561, an orientation change module 562, a sequence sending module 563, a sequence change module 564, an orientation sending module 565, an orientation change module 566, a sequence sending module 567, a sequence change module 568, a location sending module 569, and other modules 570.

Figure 19C:
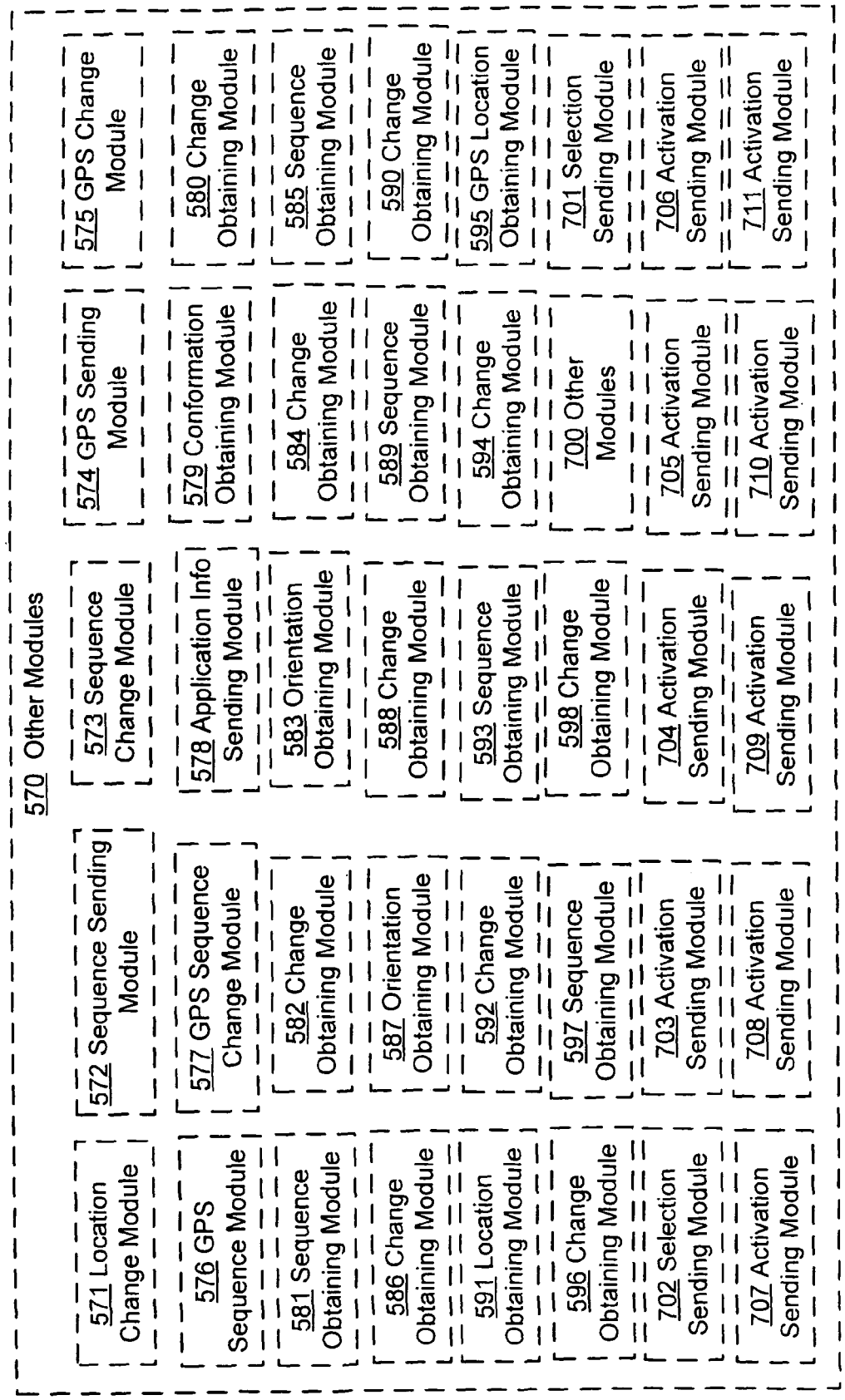
FIG. 19C is a block diagram showing detail of an exemplary implementation of a user interface unit of the exemplary implementation of the extra-e-paper assembly of FIG. 13.

As shown in FIG. 19C, the other modules 570 includes a location change module 571, a sequence sending module 572, a sequence change module 573, a GPS sending module 574, a GPS change module 575, a GPS sequence module 576, a GPS sequence change module 577, an application information sending module 578, a conformation obtaining module 579, a change obtaining module 580, a sequence obtaining module 581, a change obtaining module 582, an orientation obtaining module 583, a change obtaining module 584, a sequence obtaining module 585, a change obtaining module 586, an orientation obtaining module 587, a change obtaining module 588, a sequence obtaining module 589, a change obtaining module 590, a location obtaining module 591, a change obtaining module 592, a sequence obtaining module 593, a change obtaining module 594, a GPS location obtaining module 595, a change obtaining module 596, a sequence obtaining module 597, a change obtaining module 598, other modules module 700, a selection sending module 701, a selection sending module 702, an activation sending module 703, an activation sending module 704, an activation sending module 705, an activation sending module 706, an activation sending module 707, an activation sending module 708, an activation sending module 709, an activation sending module 710, and an activation sending module 711.

The position detection module 536 is configured to direct detecting of position information such as detecting information associated with one or more positions of one or more portions of one or more regions of the electronic paper assembly such as the regions 604 of the exemplary implementation 602 of the e-paper 102 of FIG. 20.

The relative position obtaining module 537 is configured to direct acquisition of position information such as obtaining position information of the electronic paper assembly relative to another electronic paper assembly such as relative to two instances of the e-paper 102 shown in FIG. 1.

The RFID obtaining module 538 is configured to direct acquisition of RFID information such as obtaining radio frequency identification (RFID) information associated with one or more positions of one or more portions of one or more regions of the electronic paper assembly such as the regions 604 of the exemplary implementation 602 of the e-paper 102 of FIG. 20.

The edge obtaining module 539 is configured to direct acquisition of edge related information such as obtaining information from one or more boundary transducers located approximate an edge of the electronic paper assembly associated with one or more positions of the one or more portions of the one or more regions of the electronic paper assembly such as the regions 604 of the exemplary implementation 602 of the e-paper 102 of FIG. 20.

The inclinometer obtaining module 540 is configured to direct acquisition of inclinometer related information such as obtaining inclinometer information associated with one or more positions of the one or more portions of the one or more regions of the electronic paper assembly such as the regions 604 of the exemplary implementation 602 of the e-paper 102 of FIG. 20.

The accelerometer obtaining module 541 is configured to direct acquisition of accelerometer related information such as obtaining accelerometer information associated with one or more positions of the one or more portions of the one or more regions of the electronic paper assembly such as the regions 604 of the exemplary implementation 602 of the e-paper 102 of FIG. 20.

The gyroscopic obtaining module 542 is configured to direct acquisition of gyroscopic related information such as obtaining gyroscopic information associated with one or more positions of the one or more portions of the one or more regions of the electronic paper assembly such as the regions 604 of the exemplary implementation 602 of the e-paper 102 of FIG. 20.

The inertial obtaining module 543 is configured to direct acquisition of inertial related information such as obtaining inertial information associated with one or more positions of the one or more portions of the one or more regions of the electronic paper assembly such as the regions 604 of the exemplary implementation 602 of the e-paper 102 of FIG. 20.

The geographical obtaining module 544 is configured to direct acquisition of geographical related information such as obtaining geographical position information associated with one or more positions of the one or more portions of the one or more regions of the electronic paper assembly such as the regions 604 of the exemplary implementation 602 of the e-paper 102 of FIG. 20.

The reference obtaining module 545 is configured to direct acquisition of position information such as obtaining position information relative to a reference associated with one or more positions of the one or more portions of the one or more regions of the electronic paper assembly such as the regions 604 of the exemplary implementation 602 of the e-paper 102 of FIG. 20.

The GPS obtaining module 546 is configured to direct acquisition of GPS related information such as obtaining position information relative to a global positioning satellite reference associated with one or more positions of the one or more portions of the one or more regions of the electronic paper assembly such as the regions 604 of the exemplary implementation 602 of the e-paper 102 of FIG. 20.

The table obtaining module 547 is configured to direct acquisition of table top reference related information such as obtaining position information relative to a table top reference grid associated with one or more positions of the one or more portions of the one or more regions of the electronic paper assembly such as the regions 604 of the exemplary implementation 602 of the e-paper 102 of FIG. 20.

The position obtaining module 548 is configured to direct acquisition of position related information such as obtaining position information relative to other portions of the electronic paper assembly associated with one or more positions of the one or more portions of the one or more regions of the electronic paper assembly such as the regions 604 of the exemplary implementation 602 of the e-paper 102 of FIG. 20.

The edge detection module 549 is configured to direct acquisition of edge detection information such as obtaining edge detection information relative to one or more edges of the electronic paper assembly associated with one or more positions of the one or more portions of the one or more regions of the electronic paper assembly such as the regions 604 of the exemplary implementation 602 of the e-paper 102 of FIG. 20.

The beacon obtaining module 550 is configured to direct acquisition of reference beacon related information such as obtaining position information relative to a reference beacon associated with one or more positions of the one or more portions of the one or more regions of the electronic paper assembly such as the regions 604 of the exemplary implementation 602 of the e-paper 102 of FIG. 20.

The light obtaining module 551 is configured to direct acquisition of light source related information such as obtaining position information relative to a light source associated with one or more positions of the one or more portions of the one or more regions of the electronic paper assembly such as the regions 604 of the exemplary implementation 602 of the e-paper 102 of FIG. 20.

The triangulation obtaining module 552 is configured to direct acquisition of triangulation related information such as obtaining position information relative to radio frequency triangulation associated with one or more positions of the one or more portions of the one or more regions of the electronic paper assembly such as the regions 604 of the exemplary implementation 602 of the e-paper 102 of FIG. 20.

The audio obtaining module 553 is configured to direct acquisition of audio related information such as obtaining position information relative to an audio source associated with one or more positions of the one or more portions of the one or more regions of the electronic paper assembly such as the regions 604 of the exemplary implementation 602 of the e-paper 102 of FIG. 20.

The map location obtaining module 554 is configured to direct acquisition of map location related information such as obtaining map location information associated with one or more positions of the one or more portions of the one or more regions of the electronic paper assembly such as the regions 604 of the exemplary implementation 602 of the e-paper 102 of FIG. 20.

The location obtaining module 555 is configured to direct acquisition of location related information such as obtaining location information associated with one or more positions of the one or more portions of the one or more regions of the electronic paper assembly such as the regions 604 of the exemplary implementation 602 of the e-paper 102 of FIG. 20.

The first information sending module 556 is configured to direct transmission of first information such as sending the first information regarding one or more positions of one or more portions of one or more regions of the electronic paper such as the regions 604 of the exemplary implementation 602 of the e-paper 102 of FIG. 20.

The conformation sending module 557 is configured to direct transmission of conformation related information such as sending information associated with one or more conformations of one or more portions of one or more regions of the electronic paper assembly such as the regions 604 of the exemplary implementation 602 of the e-paper 102 of FIG. 20.

The conformation change module 558 is configured to direct transmission of conformation change related information such as sending information associated with one or more changes in one or more conformations of one or more portions of one or more regions of the electronic paper assembly such as the regions 604 of the exemplary implementation 602 of the e-paper 102 of FIG. 20.

The sequence sending module 559 is configured to direct transmission of sequence related information such as sending information associated with one or more sequences of two or more conformations of one or more portions of one or more regions of the electronic paper assembly such as the regions 604 of the exemplary implementation 602 of the e-paper 102 of FIG. 20.

The sequence change module 560 is configured to direct transmission of sequence change related information such as sending information associated with one or more changes in one or more sequences of two or more conformations of one or more portions of one or more regions of the electronic paper assembly such as the regions 604 of the exemplary implementation 602 of the e-paper 102 of FIG. 20.

The orientation sending module 561 is configured to direct transmission of orientation related information such as sending information associated with one or more orientations of one or more portions of one or more regions of the electronic paper assembly such as the regions 604 of the exemplary implementation 602 of the e-paper 102 of FIG. 20.

The orientation change module 562 is configured to direct transmission of orientation change related information such as sending information associated with one or more changes in one or more orientations of one or more portions of one or more regions of the electronic paper assembly such as the regions 604 of the exemplary implementation 602 of the e-paper 102 of FIG. 20.

The sequence sending module 563 is configured to direct transmission of sequence related information such as sending information associated with one or more sequences of two or more orientations of one or more portions of one or more regions of the electronic paper assembly such as the regions 604 of the exemplary implementation 602 of the e-paper 102 of FIG. 20.

The sequence change module 564 is configured to direct transmission of sequence change related information such as sending information associated with one or more changes in one or more sequences of two or more orientations of one or more portions of one or more regions of the electronic paper assembly such as the regions 604 of the exemplary implementation 602 of the e-paper 102 of FIG. 20.

The orientation sending module 565 is configured to direct transmission of orientation related information such as sending information associated with one or more orientations of one or more portions of one or more regions of the electronic paper assembly with respect to another object such as the regions 604 of the exemplary implementation 602 of the e-paper 102 of FIG. 20.

The orientation change module 566 is configured to direct transmission of orientation related information such as sending information associated with one or more changes in one or more orientations of one or more portions of one or more regions of the electronic paper assembly with respect to another object such as the regions 604 of the exemplary implementation 602 of the e-paper 102 of FIG. 20.

The sequence sending module 567 is configured to direct transmission of sequence related information such as sending information associated with one or more sequences of two or more orientations of one or more portions of one or more regions of the electronic paper assembly with respect to another object such as the regions 604 of the exemplary implementation 602 of the e-paper 102 of FIG. 20.

The sequence change module 568 is configured to direct transmission of sequence change related information such as sending information associated with one or more changes in one or more sequences of two or more orientations with respect to another object of one or more portions of one or more regions of the electronic paper assembly with respect to another object such as the regions 604 of the exemplary implementation 602 of the e-paper 102 of FIG. 20.

The location sending module 569 is configured to direct transmission of location related information such as sending information associated with one or more locations of one or more portions of one or more regions of the electronic paper assembly with respect to another object such as the regions 604 of the exemplary implementation 602 of the e-paper 102 of FIG. 20.

The location change module 571 is configured to direct transmission of location change related information such as sending information associated with one or more changes in one or more locations of one or more portions of one or more regions of the electronic paper assembly with respect to another object such as the regions 604 of the exemplary implementation 602 of the e-paper 102 of FIG. 20.

The sequence sending module 572 is configured to direct transmission of sequence related information such as sending information associated with one or more sequences of two or more locations of one or more portions of one or more regions of the electronic paper assembly with respect to another object such as the regions 604 of the exemplary implementation 602 of the e-paper 102 of FIG. 20.

The sequence change module 573 is configured to direct transmission of sequence change related information such as sending information associated with one or more changes in one or more sequences of two or more locations with respect to another object of one or more portions of one or more regions of the electronic paper assembly with respect to another object such as the regions 604 of the exemplary implementation 602 of the e-paper 102 of FIG. 20.

The GPS sending module 574 is configured to direct transmission of GPS related information such as sending information associated with one or more GPS locations of one or more portions of one or more regions of the electronic paper assembly with respect to another object such as the regions 604 of the exemplary implementation 602 of the e-paper 102 of FIG. 20.

The GPS change module 575 is configured to direct transmission of GPS change related information such as sending information associated with one or more changes in one or more GPS locations of one or more portions of one or more regions of the electronic paper assembly with respect to another object such as the regions 604 of the exemplary implementation 602 of the e-paper 102 of FIG. 20.

The GPS sequence module 576 is configured to direct transmission of GPS sequence related information such as sending information associated with one or more sequences of two or more GPS locations of one or more portions of one or more regions of the electronic paper assembly with respect to another object such as the regions 604 of the exemplary implementation 602 of the e-paper 102 of FIG. 20.

The GPS sequence change module 577 is configured to direct transmission of GPS sequence change related information such as sending information associated with one or more changes in one or more sequences of two or more GPS locations with respect to another object of one or more portions of one or more regions of the electronic paper assembly with respect to another object such as the regions 604 of the exemplary implementation 602 of the e-paper 102 of FIG. 20.

The application information sending module 578 is configured to direct transmission of one or more application related information portions (e.g. regarding the cell phone application 176*a* found in the intra-e-paper application memory 176) such as sending one or more application related information portions to the electronic paper assembly based upon the obtaining of the first information such as sending from the extra-e-paper application unit 408 of FIG. 17 via the extra-intra information flow 108 of FIG. 1 an activation of the video application 176*i* found in the application memory 176 of FIG. 6 of the e-paper 102 of FIG. 20.

The conformation obtaining module 579 is configured to direct acquisition of conformation related information such as obtaining information associated with one or more conformations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The change obtaining module 580 is configured to direct acquisition of change related information such as obtaining information associated with one or more changes in one or more conformations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The sequence obtaining module 581 is configured to direct acquisition of sequence related information such as obtaining information associated with one or more sequences of two or more conformations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The change obtaining module 582 is configured to direct acquisition of change related information such as obtaining information associated with one or more changes in one or more sequences of two or more conformations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The orientation obtaining module 583 is configured to direct acquisition of orientation related information such as obtaining information associated with one or more orientations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The change obtaining module 584 is configured to direct acquisition of change related information such as obtaining information associated with one or more changes in one or more orientations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The sequence obtaining module 585 is configured to direct acquisition of sequence related information such as obtaining information associated with one or more sequences of two or more orientations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The change obtaining module 586 is configured to direct acquisition of change related information such as obtaining information associated with one or more changes in one or more sequences of two or more orientations of one or more portions of one or more regions of the electronic paper assembly such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20.

The orientation obtaining module 587 is configured to direct acquisition of orientation related information such as obtaining information associated with one or more orientations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The change obtaining module 588 is configured to direct acquisition of change related information such as obtaining information associated with one or more changes in one or more orientations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The sequence obtaining module 589 is configured to direct acquisition of sequence related information such as obtaining information associated with one or more sequences of two or more orientations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The change obtaining module 590 is configured to direct acquisition of change related information such as obtaining information associated with one or more changes in one or more sequences of two or more orientations with respect to another object of one or more portions of one or more regions of the electronic paper assembly with respect to the object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The location obtaining module 591 is configured to direct acquisition of location related information such as obtaining information associated with one or more locations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The change obtaining module 592 is configured to direct acquisition of change related information such as obtaining information associated with one or more changes in one or more locations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The sequence obtaining module 593 is configured to direct acquisition of sequence related information such as obtaining information associated with one or more sequences of two or more locations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The change obtaining module 594 is configured to direct acquisition of change related information such as obtaining information associated with one or more changes in one or more sequences of two or more locations with respect to another object of one or more portions of one or more regions of the electronic paper assembly with respect to the object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The GPS location obtaining module 595 is configured to direct acquisition of GPS location related information such as obtaining information associated with one or more GPS locations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The change obtaining module 596 is configured to direct acquisition of change related information such as obtaining information associated with one or more changes in one or more GPS locations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The sequence obtaining module 597 is configured to direct acquisition of sequence related information such as obtaining information associated with one or more sequences of two or more GPS locations of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The change obtaining module 598 is configured to direct acquisition of change related information such as obtaining information associated with one or more changes in one or more sequences of two or more GPS locations with respect to another object of one or more portions of one or more regions of the electronic paper assembly with respect to another object such as obtaining such information through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28.

The selection sending module 701 is configured to direct transmission of selection related information such as sending a content selection to be displayed by the electronic paper assembly based upon the obtaining first information such as sending from the extra-e-paper communication unit 410 of FIG. 18 via the extra-intra information flow 108 of FIG. 1 a selection to the be displayed in one or more of the regions 604 of the exemplary implementation 602 of the e-paper 102 of FIG. 20 on the display layers 608 of FIG. 19.

The selection sending module 702 is configured to direct transmission of selection related information such as sending a selection of one or more portions of one or more display layers to display one or more content based upon the obtaining first information such as sending from the extra-e-paper communication unit 410 of FIG. 18 via the extra-intra information flow 108 of FIG. 1 a selection to the be displayed in one or more of the regions 604 of the exemplary implementation 602 of the e-paper 102 of FIG. 20 on the display layers 608 of FIG. 19.

The activation sending module 703 is configured to direct transmission of activation information such as sending one or more activations for one or more portions of one or more applications based upon the obtaining first information such as sending from the extra-e-paper application unit 408 of FIG. 17 via the extra-intra information flow 108 of FIG. 1 an activation of the cell phone application 176a found in the application memory 176 of FIG. 6 of the e-paper 102 of FIG. 20.

The activation sending module 704 is configured to direct transmission of activation information such as sending one or more activations for one or more portions of one or more cell phone applications such as sending from the extra-e-paper application unit 408 of FIG. 17 via the extra-intra information flow 108 of FIG. 1 an activation of the cell phone application 176a found in the application memory 176 of FIG. 6 of the e-paper 102 of FIG. 20.

The activation sending module 705 is configured to direct transmission of activation related information such as sending one or more activations for one or more portions of one or more television applications such as sending from the extra-e-paper application unit 408 of FIG. 17 via the extra-intra information flow 108 of FIG. 1 an activation of the television application 176b found in the application memory 176 of FIG. 6 of the e-paper 102 of FIG. 20.

The activation sending module 706 is configured to direct transmission of activation related information such as sending one or more activations for one or more portions of one or more personal digital assistant (PDA) applications such as sending from the extra-e-paper application unit 408 of FIG. 17 via the extra-intra information flow 108 of FIG. 1 an activation of the PDA application 176c found in the application memory 176 of FIG. 6 of the e-paper 102 of FIG. 20.

The activation sending module 707 is configured to direct transmission of activation related information such as sending one or more activations for one or more portions of one or more personal computer applications such as sending from the extra-e-paper application unit 408 of FIG. 17 via the extra-intra information flow 108 of FIG. 1 an activation of the personal computer application 176d found in the application memory 176 of FIG. 6 of the e-paper 102 of FIG. 20.

The activation sending module 708 is configured to direct transmission of activation related information such as sending one or more activations for one or more portions of one or more eBook applications such as sending from the extra-e-paper application unit 408 of FIG. 17 via the extra-intra information flow 108 of FIG. 1 an activation of the eBook application 176e found in the application memory 176 of FIG. 6 of the e-paper 102 of FIG. 20.

The activation sending module 709 is configured to direct transmission of activation related information such as sending one or more activations for one or more portions of one or more calendar applications such as sending from the extra-e-paper application unit 408 of FIG. 17 via the extra-intra information flow 108 of FIG. 1 an activation of the calendar application 176f found in the application memory 176 of FIG. 6 of the e-paper 102 of FIG. 20.

The activation sending module 710 is configured to direct transmission of activation related information such as sending one or more activations for one or more portions of one or more wallet applications such as sending from the extra-e-paper application unit 408 of FIG. 17 via the extra-intra information flow 108 of FIG. 1 an activation of the wallet application 176g found in the application memory 176 of FIG. 6 of the e-paper 102 of FIG. 20.

The activation sending module 711 is configured to direct transmission of activation related information such as sending one or more activations for one or more portions of one or more audio applications such as sending from the extra-e-paper application unit 408 of FIG. 17 via the extra-intra information flow 108 of FIG. 1 an activation of the audio application 176h found in the application memory 176 of FIG. 6 of the e-paper 102 of FIG. 20.

Figure 19D:
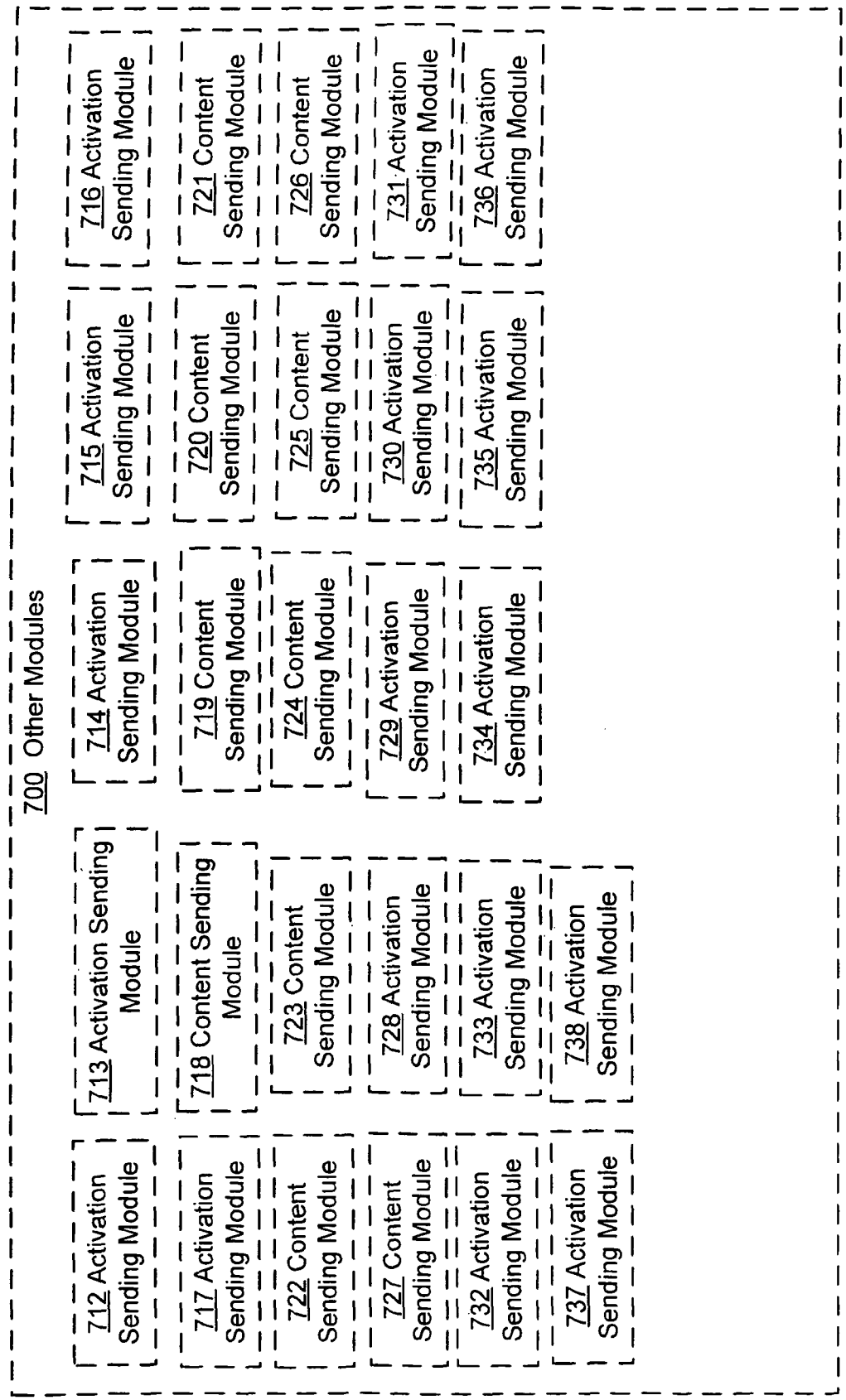
FIG. 19D is a block diagram showing detail of an exemplary implementation of a user interface unit of the exemplary implementation of the extra-e-paper assembly of FIG. 13.

As shown in FIG. 19D, the other modules 700 includes an activation sending module 712, an activation sending module 713, an activation sending module 714, an activation sending module 715, an activation sending module 716, an activation sending module 717, a content sending module 718, a content sending module 719, a content sending module 720, a content sending module 721, a content sending module 722, a content sending module 723, a content sending module 724, a content sending module 725, a content sending module 726, a content sending module 727, an activation sending module 728, an activation sending module 729, an activation sending module 730, an activation sending module 731, an activation sending module 732, an activation sending module 733, an activation sending module 734, an activation sending module 735, an activation sending module 736, an activation sending module 737, and an activation sending module 738.

The activation sending module 712 is configured to direct transmission of activation related information such as sending one or more activations for one or more portions of one or more video applications such as sending from the extra-e-paper application unit 408 of FIG. 17 via the extra-intra information flow 108 of FIG. 1 an activation of the video application 176i found in the application memory 176 of FIG. 6 of the e-paper 102 of FIG. 20.

The activation sending module 713 is configured to direct transmission of activation related information such as sending one or more activations for one or more portions of one or more audio-video applications such as sending from the extra-e-paper application unit 408 of FIG. 17 via the extra-intra information flow 108 of FIG. 1 an activation of the audio-video application 176j found in the application memory 176 of FIG. 6 of the e-paper 102 of FIG. 20.

The activation sending module 714 is configured to direct transmission of activation related information such as sending one or more activations for one or more portions of one or more game applications such as sending from the extra-e-paper application unit 408 of FIG. 17 via the extra-intra information flow 108 of FIG. 1 an activation of the game application 176k found in the application memory 176 of FIG. 6 of the e-paper 102 of FIG. 20.

The activation sending module 715 is configured to direct transmission of activation related information such as sending one or more activations for one or more portions of one or more web browser applications such as sending from the extra-e-paper application unit 408 of FIG. 17 via the extra-intra information flow 108 of FIG. 1 an activation of the web browser application 176l found in the application memory 176 of FIG. 6 of the e-paper 102 of FIG. 20.

The activation sending module 716 is configured to direct transmission of activation related information such as sending one or more activations for one or more portions of one or more mapping applications such as sending from the extra-e-paper application unit 408 of FIG. 17 via the extra-intra information flow 108 of FIG. 1 an activation of the mapping application 176m found in the application memory 176 of FIG. 6 of the e-paper 102 of FIG. 20.

The activation sending module 717 is configured to direct transmission of activation related information such as sending one or more activations for one or more portions of one or more entertainment applications such as sending from the extra-e-paper application unit 408 of FIG. 17 via the extra-intra information flow 108 of FIG. 1 an activation of the entertainment application 176n found in the application memory 176 of FIG. 6 of the e-paper 102 of FIG. 20.

The content sending module 718 is configured to direct transmission of content related information such as sending content having one or more classifications to be displayed by the electronic paper assembly such as sending content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

The content sending module 719 is configured to direct transmission of content related information such as sending public content to be displayed by the electronic paper assembly on one or more portions of a surface display layer of the electronic paper assembly viewable from a display surface of the electronic paper assembly and to block an internal display layer of the electronic paper assembly from displaying private content that would otherwise be viewed from the display surface from being viewed from the display surface such as sending public content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

The content sending module 720 is configured to direct transmission of content related information such as sending public content to be displayed on one or more portions of one or more display layers of the electronic paper assembly such as sending public content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

The content sending module 721 is configured to direct transmission of content related information such as sending private content to be displayed on one or more portions of one or more display layers of the electronic paper assembly such as sending private content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

The content sending module 722 is configured to direct transmission of content related information such as sending eBook related content to the electronic paper assembly such as sending the eBook related content 436a of the content memory 436 of the extra-e-paper content unit 402 of FIG. 14 to the e-paper 102 of FIG. 20 via the extra-intra information flow 108 of FIG. 1.

The content sending module 723 is configured to direct transmission of content related information such as sending movie related content to the electronic paper assembly such as sending the movie related content 436b of the content memory 436 of the extra-e-paper content unit 402 of FIG. 14 to the e-paper 102 of FIG. 20 via the extra-intra information flow 108 of FIG. 1.

The content sending module 724 is configured to direct transmission of content related information such as sending game related content to the electronic paper assembly such as sending the game related content 436c of the content memory 436 of the extra-e-paper content unit 402 of FIG. 14 to the e-paper 102 of FIG. 20 via the extra-intra information flow 108 of FIG. 1.

The content sending module 725 is configured to direct transmission of content related information such as sending audio related content to the electronic paper assembly such as sending the audio related content 436d of the content memory 436 of the extra-e-paper content unit 402 of FIG. 14 to the e-paper 102 of FIG. 20 via the extra-intra information flow 108 of FIG. 1.

The content sending module 726 is configured to direct transmission of content related information such as sending video related content to the electronic paper assembly such as sending the video related content 436e of the content memory 436 of the extra-e-paper content unit 402 of FIG. 14 to the e-paper 102 of FIG. 20 via the extra-intra information flow 108 of FIG. 1.

The content sending module 727 is configured to direct transmission of content related information such as sending text related content to the electronic paper assembly such as sending the text related content 436f of the content memory 436 of the extra-e-paper content unit 402 of FIG. 14 to the e-paper 102 of FIG. 20 via the extra-intra information flow 108 of FIG. 1.

The activation sending module 728 is configured to direct transmission of activation related information such as sending one or more activations for one or more portions of one or more e-mail applications such as sending from the extra-e-paper application unit 408 of FIG. 17 via the extra-intra information flow 108 of FIG. 1 an activation of the e-mail application 176o found in the application memory 176 of FIG. 6 of the e-paper 102 of FIG. 20.

The activation sending module 729 is configured to direct transmission of activation related information such as sending one or more activations for one or more portions of one or more instant messaging applications such as sending from the extra-e-paper application unit 408 of FIG. 17 via the extra-intra information flow 108 of FIG. 1 an activation of the instant messaging (IM) application 176p found in the application memory 176 of FIG. 6 of the e-paper 102 of FIG. 20.

The activation sending module 730 is configured to direct transmission of activation related information such as sending one or more activations for one or more portions of one or more chat applications such as sending from the extra-e-paper application unit 408 of FIG. 17 via the extra-intra information flow 108 of FIG. 1 an activation of the chat application 176q found in the application memory 176 of FIG. 6 of the e-paper 102 of FIG. 20.

The activation sending module 731 is configured to direct transmission of activation related information such as sending one or more activations for one or more portions of one or more text-messaging applications such as sending from the extra-e-paper application unit 408 of FIG. 17 via the extra-intra information flow 108 of FIG. 1 an activation of the text-messaging application 176r found in the application memory 176 of FIG. 6 of the e-paper 102 of FIG. 20.

The activation sending module 732 is configured to direct transmission of activation related information such as sending one or more activations for one or more portions of one or more banking applications such as sending from the extra-e-paper application unit 408 of FIG. 17 via the extra-intra information flow 108 of FIG. 1 an activation of the banking application 176s found in the application memory 176 of FIG. 6 of the e-paper 102 of FIG. 20.

The activation sending module 733 is configured to direct transmission of activation related information such as sending one or more activations for one or more portions of one or more brokerage applications such as sending from the extra-e-paper application unit 408 of FIG. 17 via the extra-intra information flow 108 of FIG. 1 an activation of the brokerage application 176t found in the application memory 176 of FIG. 6 of the e-paper 102 of FIG. 20.

The activation sending module 734 is configured to direct transmission of activation related information such as sending one or more activations for one or more portions of one or more investment related applications such as sending from the extra-e-paper application unit 408 of FIG. 17 via the extra-intra information flow 108 of FIG. 1 an activation of the investment related application 176u found in the application memory 176 of FIG. 6 of the e-paper 102 of FIG. 20.

The activation sending module 735 is configured to direct transmission of activation related information such as sending one or more activations for one or more portions of one or more voice applications such as sending from the extra-e-paper application unit 408 of FIG. 17 via the extra-intra information flow 108 of FIG. 1 an activation of the voice application 176v found in the application memory 176 of FIG. 6 of the e-paper 102 of FIG. 20.

The activation sending module 736 is configured to direct transmission of activation related information such as sending one or more activations for one or more portions of one or more user-guidance applications configured to emit user directions to be received by a user such as sending from the extra-e-paper application unit 408 of FIG. 17 via the extra-intra information flow 108 of FIG. 1 an activation of the user-guidance application 176w found in the application memory 176 of FIG. 6 of the e-paper 102 of FIG. 20.

The activation sending module 737 is configured to direct transmission of activation related information such as sending one or more activations for one or more portions of one or more walker-guidance applications configured to emit walking directions to be received by a walker such as sending from the extra-e-paper application unit 408 of FIG. 17 via the extra-intra information flow 108 of FIG. 1 an activation of the walker-guidance application 176x found in the application memory 176 of FIG. 6 of the e-paper 102 of FIG. 20.

The activation sending module 738 is configured to direct transmission of activation related information such as sending one or more activations for one or more portions of one or more driver-guidance applications configured to emit driving directions to be received by a driver such as sending from the extra-e-paper application unit 408 of FIG. 17 via the extra-intra information flow 108 of FIG. 1 an activation of the driver-guidance application 176y found in the application memory 176 of FIG. 6 of the e-paper 102 of FIG. 20.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

A top plan view of an exemplary implementation 602 of the e-paper 102 is shown in FIG. 20 as having a plurality of regions 604 separated by borders 606. The number of the regions and the shape of each of the regions may vary depending upon particular implementations of the e-paper. Consequently, the number and shapes of the borders 606 may also vary based on specifics of a particular implementation of the e-paper 102.

The regions 604 and the borders 606 may be either virtual or physical. Virtual implementations may be based upon a user display selection to display on a plurality of different areas of the e-paper 602 various files or other items having different content. There may be a one to one correlation between these areas and the regions 604 but in other cases other sorts of correlations are possible. Another example of virtual implementations of the regions 604 and the borders 606 may include displaying different user interfaces to different computer programs on different areas of a display. At least some times the virtual implementations of the regions 604 and the borders 606 may be readily modified or replaced outright. Numerous other examples exist for virtual implementations of the regions 604 and the borders 606.

Physical implementations may include a portion of the borders 606 being physically demarcating either structural or otherwise. For instance, at least a portion of the regions 604 of the e-paper 602 may be separate e-paper portions separated by the borders 606 with the borders being hinges or micro-hinges or other physical connections.

With both the virtual and the physical implementations of the regions 604 and the borders 606 of the e-paper 602, conformations such as bends, folds, or other may exist along the borders but may also exist within one or more of the regions themselves. Conformations may refer to particular localized physical aspects such as bends, folds, twists, etc occurring in one or more of the regions 604 or along one or more of the borders 606. In other implementations, one or more conformations may refer to general shapes of the e-paper 602 as resultant from one or more other localized conformations of the e-paper.

The exemplary implementation 602 of the e-paper 102 is shown in FIG. 21 to include a collection of display layers 608: a surface layer 608a, an internal layer 608b, and a surface layer 608c. In some implementations each of the display layers 608 are able to display information under independent control. For instance, the surface layer 608a may be used to either block or allow viewing from a display surface 610 of information being displayed by the internal layer 608*b* or the surface layer 608*a* and the internal layer 608*b* may be used in conjunction to display information together from the display surface 610. Meanwhile, the surface layer 608*c* could be displaying information from a display surface 612. Sensors 614, implementations of the sensor 144, are shown coupled with the display layers 608 of the e-paper 602. In other implementations, one or more of the sensors 144 may be located in other configurations relative to the display layers 608 such as alternating with the display layers in juxtaposition or otherwise internally located along with one or more of the display layers.

As shown in FIG. 22, the exemplary implementation 602 of the e-paper 102 may include a border 604*b* between a region 604*a* coupled with one of the sensors 614 and a region 604*b* coupled to another one of the sensors 614. As shown in FIG. 23, the exemplary implementation 602 may be partially folded along the border 604*b*. The exemplary implementation 602 may also include another implementation of the sensor 144 in the form of a sensor 616 (such as for stress, strain, force, acceleration, etc) and a sensor 618 (such as optical fiber based). These alternative sensor implementations including the sensor 616 and the sensor 618 may be generally represented by the sensors 614 as well as the sensor 144. The exemplary implementation 602 may include capabilities to display information based upon a classification of the information and an e-paper conformation such as shown in FIG. 23 in which a display of information 620 having a classification of "private" occurs from the display surface 610 (being the inside surface of the illustrated folded conformation) and in which a display of information 622 having a classification of "public" classification occurs from the display surface 612 (being the outside surface of the illustrated folded conformation). An exemplary angle of bend 624 and an angle of bend 624*a* are also noted in FIG. 23 since they may be included with other indicators such as a change of conformation between the bend 624 and the bend 624*a* to be used to describe a particular e-paper conformation.

Conformation of the exemplary implementation 602 may be used to assist with indicating a selection by the user 128 along with controlling display of information having various classifications. For instance, as shown in FIG. 24, a geometry 625 of an exemplary e-paper conformation of the exemplary implementation 602 and a geometry 625*a* and/or a change therebetween as sensed by the sensors 614 may be used to indicate a selection 626 of e-paper function between a plurality of applications 627 such as a television function, a personal digital assistant function, a cell phone function, a notebook function, and an eBook function.

Relative association between two or more portions of the exemplary implementation 602 may be used to assist with selection of e-paper function, and/or controlling display such as including controlling display of information having various classifications. For instance, as shown in FIG. 25, an exemplary relative association 628 may be sensed between two or more of the sensors 614 based upon factors such as separation distance or other geometrical factors. As shown in FIG. 25*a*, an exemplary relative association 628*a* may be sensed between the sensors 614 and/or a change in the relative association 628 and the relative association 628*a* may be sensed as well.

A time ordered sequence of conformations of the exemplary implementation 602 may be used to assist with selection of e-paper function, such as various applications to perform, and/or controlling display such as including controlling display of information having various classifications. For instance, as shown in FIG. 26, an exemplary sequence 630 sensed by the sensors 614 of partial folding of the exemplary implementation 602 to being unfolded to being again partially folded may be used to indicate a selection or otherwise control display such as of display of information having a desired classification. The exemplary sequence 630 may be indicated in an absolute sense by a series of the conformations associated with the sequence or may be indicated in a relative sense by a series of a first change 630*a* and a second change 630*b* that exist between the conformations associated with the sequence.

A coupling type of conformation between two or more instances of the exemplary implementation 602 may be used to assist with selection of e-paper function, and/or controlling display such as including controlling display of information having various classifications. For instance, as shown in FIG. 27, an exemplary coupling conformation 632 between exemplary implementations 604*a* and 604*b* of the e-paper 102 as sensed by the sensors 614 may be used to indicate a selection or otherwise control display such as of display of information having a desired classification. Change of a coupling conformation, such as between the exemplary coupling conformation 632 and an exemplary coupling conformation 632*a* of FIG. 25 may also be used.

Figure 28A:
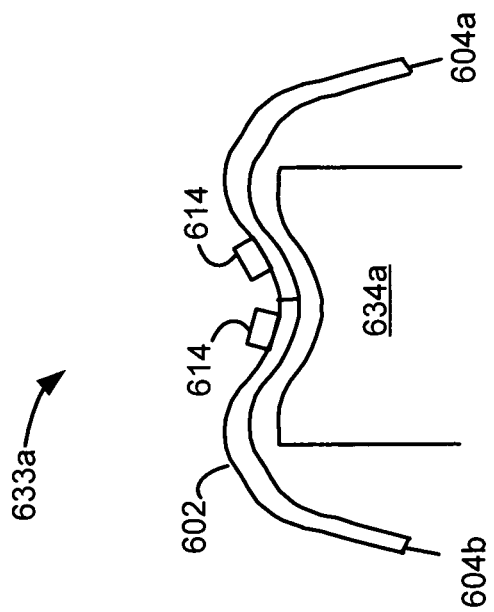
FIG. 28a is a side elevational view of an exemplary implementation of the intra-e-paper assembly of FIG. 1 showing an exemplary draping type of conformation.

A draping type of conformation of the exemplary implementation 602 may be used to assist with selection of e-paper function, and/or controlling display such as including controlling display of information having various classifications. For instance, as shown in FIG. 28, an exemplary draping conformation 633 as sensed by the sensors 614 of the exemplary implementation 602 over an exemplary object 634 may be used to indicate a selection or otherwise control display such as of display of information having a desired classification. Change of a draping type conformation, such as between the exemplary draping conformation 633 of FIG. 28 and an exemplary draping conformation 633*a* over an exemplary object 634*a* of FIG. 28*a* may also be used.

Figure 29A:
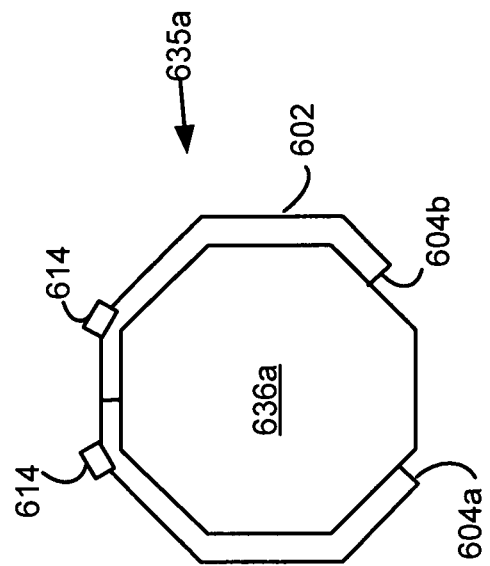
FIG. 29a is a side elevational view of an exemplary implementation of the intra-e-paper assembly of FIG. 1 showing an exemplary wrapped type of conformation.

A wrapped type of conformation of the exemplary implementation 602 may be used to assist with selection of e-paper function, and/or controlling display such as including controlling display of information having various classifications. For instance, as shown in FIG. 29, an exemplary wrapped conformation 635 around an exemplary object 636 as sensed by the sensors 614 may be used to indicate a selection or otherwise control display such as of display of information having a desired classification. Change of a wrapped type conformation, such as between the exemplary wrapped conformation 635 of FIG. 29 and an exemplary wrapped conformation 635*a* around an exemplary object 636*a* of FIG. 29*a* may also be used.

A transient type of conformation of the exemplary implementation 602 such as a scraping action resultant in curvilinear input may be used to assist with selection of e-paper function, and/or controlling display such as including controlling display of information having various classifications. For instance, as shown in FIG. 30, an exemplary instrument 638 moved in along exemplary path 640 imparting an exemplary transient conformation 642 having an exemplary scraping conformation action resultant in a curvilinear conformation input as sensed by the sensors 614 may be used to indicate a selection or otherwise control display such as of display of information having a desired classification. Change of a transient conformation 641, such as between an exemplary path 640*a* and an exemplary path 640*b* of FIG. 30*a* may also be used.

A rolled type of conformation of the exemplary implementation 602 may be used to assist with selection of e-paper function, and/or controlling display such as including controlling display of information having various classifications. For instance, as shown in FIG. 31, an exemplary rolled conformation 643 as sensed by the sensors 614 of the exemplary implementation 602 may be used to indicate a selection or otherwise control display such as of display of information having a desired classification. Change of a rolled type conformation, such as between the exemplary rolled conformation 643 and an exemplary rolled conformation 643a of FIG. 31 may also be used.

A hinge status type of conformation of coupling between two or more instances of the exemplary implementation 602 may be used to assist with selection of e-paper function, and/or controlling display such as including controlling display of information having various classifications. For instance, as shown in FIG. 32, a hinge status conformation 644 sensed by the sensors 614 of a hinge 645 of the exemplary implementation 602 may be used to indicate a selection or otherwise control display such as of display of information having a desired classification. Change of a hinge status type conformation, such as between the exemplary hinge status conformation 644 and an exemplary hinge status conformation 644a of FIG. 32 may also be used.

Bend radius status type of conformation of the exemplary implementation 602 may be used to assist with selection of e-paper function, and/or controlling display such as including controlling display of information having various classifications. For instance, as shown in FIG. 33, an exemplary bend radius status conformation 646 as sensed by the sensors 614 may be used to indicate a selection or otherwise control display such as of display of information having a desired classification. Change of a bend radius status type of conformation, such as between the exemplary bend radius status conformation 646 and an exemplary bend radius status conformation 646a of FIG. 33 may also be used.

The various components of the e-paper 102 (e.g., the content unit 112, the sensor unit 114, the recognition unit 116, the application unit 118, the communication unit 120, the conformation unit 122, the display unit 124, and the user interface 126) and their sub-components and of the external device 104 (e.g., the content unit 402, the sensor unit 404, the recognition unit 406, the application unit 408, the communication unit 410, and the user interface 412) and their sub-components and the other exemplary entities depicted may be embodied by hardware, software and/or firmware. For example, in some implementations the content unit 112, the recognition unit 116, and the application unit 118, and their sub-components, may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

Figure 34:
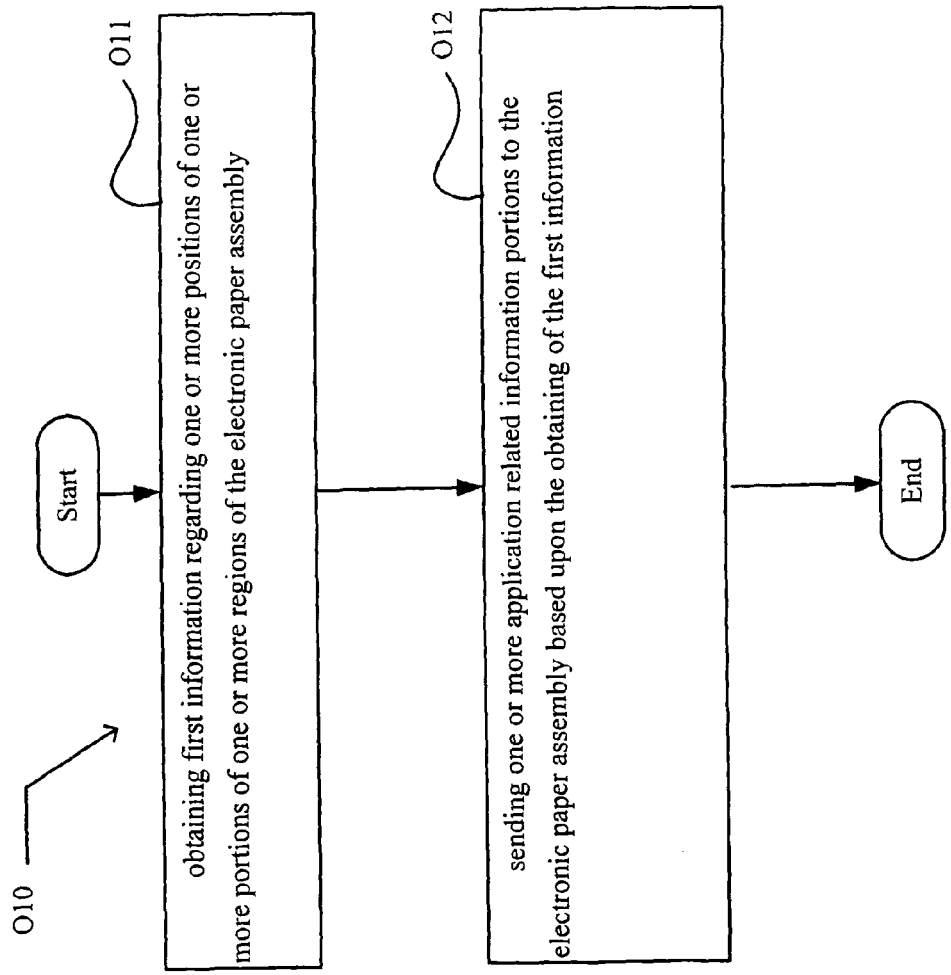
FIG. 34 is a high-level flowchart illustrating an operational flow O10 representing exemplary operations related to obtaining first information regarding one or more positions of one or more portions of one or more regions of the electronic paper assembly and sending one or more application related information portions to the electronic paper assembly based upon the obtaining of the first information at least associated with exemplary implementations of the intra-e-paper assembly of FIG. 1.

An operational flow O10 as shown in FIG. 34 represents example operations related to obtaining first information regarding one or more positions of one or more portions of one or more regions of the electronic paper assembly and sending one or more application related information portions to the electronic paper assembly based upon the obtaining of the first information. FIG. 34 and those figures that follow may have various examples of operational flows, and explanation may be provided with respect to the above-described examples of FIGS. 1-33 and/or with respect to other examples and contexts. Nonetheless, it should be understood that the operational flows may be executed in a number of other environments and contexts, and/or in modified versions of FIGS. 1-33. Furthermore, although the various operational flows are presented in the sequence(s) illustrated, it should be understood that the various operations may be performed in other orders than those which are illustrated, or may be performed concurrently.

FIG. 34

An operational flow O10 as shown in FIG. 34 represents example operations related to sending one or more electronic paper assembly physical status related information portions to the electronic paper assembly based upon the obtaining of the first information regarding one or more positions of one or more portions of one or more regions of the electronic paper. FIG. 34 and those figures that follow may have various examples of operational flows, and explanation may be provided with respect to the above-described examples of FIGS. 1-33 and/or with respect to other examples and contexts. Nonetheless, it should be understood that the operational flows may be executed in a number of other environments and contexts, and/or in modified versions of FIGS. 1-33. Furthermore, although the various operational flows are presented in the sequence(s) illustrated, it should be understood that the various operations may be performed in other orders than those which are illustrated, or may be performed concurrently.

In FIG. 34 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

After a start operation, the operational flow O10 may move to an operation O11, where obtaining first information regarding one or more positions of one or more portions of one or more regions of the electronic paper assembly may be, executed by, for example, the extra-e-paper assembly 104 obtaining first information through the intra-extra information flow 106 and the extra-intra information flow 108 from the sensor unit 114 of the e-paper 102 of FIG. 2 and/or acquisition of the first information may be directed by one or more position obtaining modules 501 of FIG. 19A. An exemplary implementation may include obtaining (e.g. obtaining may be performed through one or more of the sensors 614 (see FIG. 23) as exemplary implementations of the sensor 144 (see FIG. 4)) information regarding one or more positions of one or more portions of one or more regions of the e-paper 102 (e.g. a position may involve the angle of bend 624 (see FIG. 23) of the exemplary implementation 602 of the e-paper 102 in which the one or more positions may be relative or another reference or an absolute position. The one or more of the sensors 614 as exemplary implementations of the sensor 144 may relay the information about the first information through the sensor interface 146 (see FIG. 4) to be communicated from the e-paper 102 through the intra-extra information flow 106 to the communication unit 410 of FIG. 18 of the to the extra-e-paper assembly 104 of FIG. 1.

The operational flow O10 may then move to operation O12, where sending one or more application related information portions to the electronic paper assembly based upon the obtaining of the first information may be executed by the application information sending module 578 and/or, for example, the communication unit of FIG. 410 of FIG. 18 of the extra-e-paper application unit 408 of FIG. 17 sending from the communication memory 484 of FIG. 18 via the extra-intra information flow 108 of FIG. 1 an activation of one or more portions of the video application 176*i* found in the application memory 176 of FIG. 6 of the e-paper 102 of FIG. 20.

FIG. 35

Figure 35:
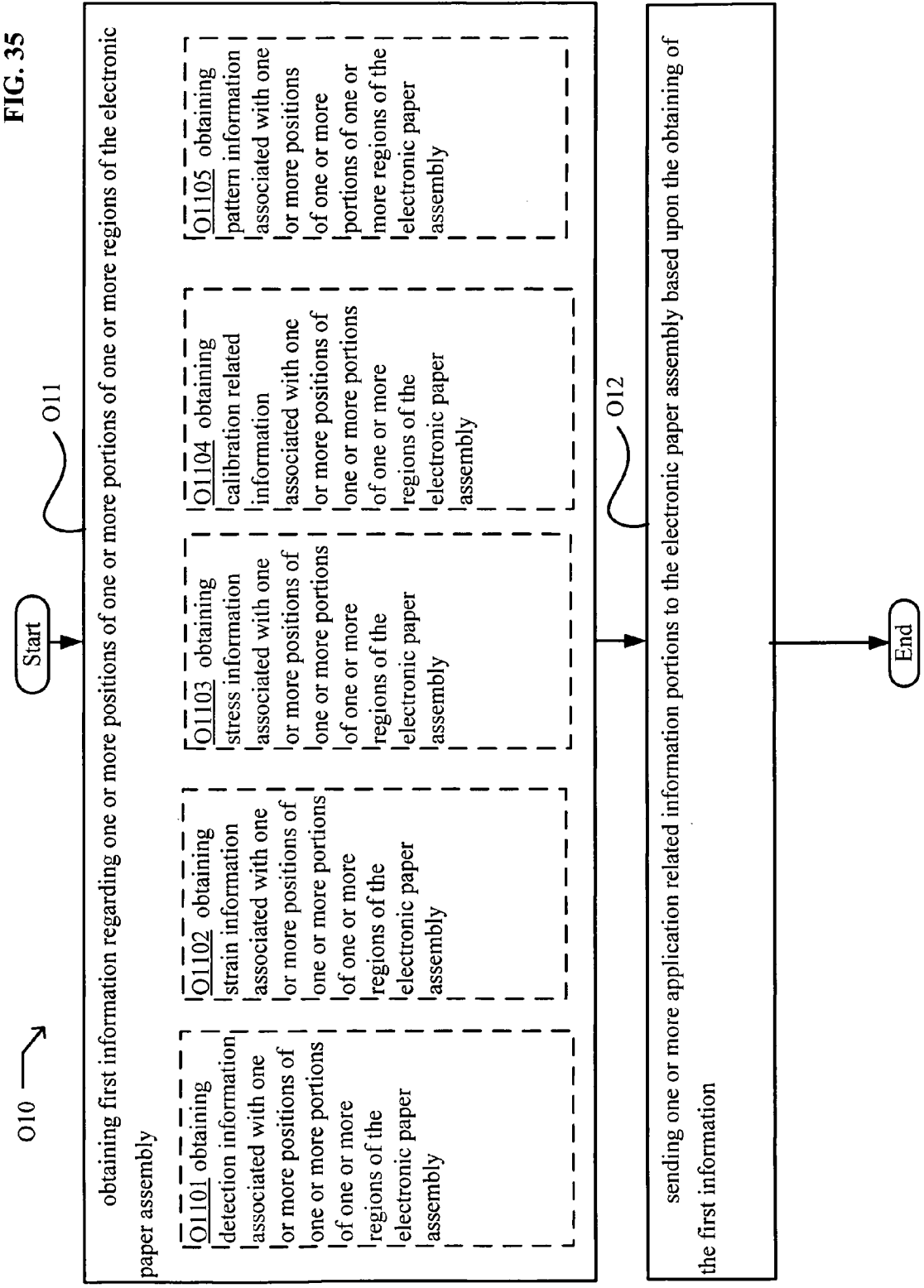
FIG. 35 is a high-level flowchart including exemplary implementations of operation O11 of FIG. 34.

FIG. 35 illustrates various implementations of the exemplary operation O11 of FIG. 34. In particular, FIG. 35 illustrates example implementations where the operation O11 includes one or more additional operations including, for example, operations O1101, O1102, O1103, O1104, and/or O1105.

For instance, in some implementations, the exemplary operation O11 may include the operation of O1101 for obtaining detection information associated with one or more positions of one or more portions of one or more regions of the electronic paper assembly. An exemplary implementation may include one or more of the conformation detection modules 503 of FIG. 19A directing through the extra-intra information flow 108 (see FIG. 1) acquisition of detection such as detecting one or more conformations (e.g. detecting may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching conformation detail contained in the recognition memory 164 with the sensing data such as found in a conformation such as involving the partially folded conformation of the exemplary implementation 602 of the e-paper 102 having the angle of bend 624 shown in FIG. 23) of one or more positions of one or more portions of one or more regions (e.g. the positions of the region 604*a* and the region 604*b*) of the electronic paper assembly (e.g. the exemplary implementation 602 of the e-paper 102 of FIG. 23). Information regarding this conformation can be transferred from the communication unit 120 of the e-paper assembly 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1102 for obtaining strain information associated with one or more positions of one or more portions of one or more regions of the electronic paper assembly. An exemplary implementation may include one or more of the conformation strain modules 504 of FIG. 19A directing the acquisition through the extra-intra information flow 108 (see FIG. 1) of strain information such as obtaining strain information (e.g. one or more of the sensors 614 (see FIG. 23) as exemplary implementations of the strain sensor 144*a* (see FIG. 4) of the sensor 144 may obtain strain information) associated with one or more positions of one or more portions of one or more regions of the electronic paper assembly. The strain information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1103 for obtaining stress information associated with one or more positions of one or more portions of one or more regions of the electronic paper assembly. An exemplary implementation may include one or more of the stress modules 506 of FIG. 19A directing the acquisition through the extra-intra information flow 108 (see FIG. 1) of stress information such as obtaining stress information (e.g. one or more of the sensors 614 (see FIG. 23) as exemplary implementations of the stress sensor 144*b* (see FIG. 4) of the sensor 144 may obtain stress information) associated with one or more positions of one or more portions of one or more regions of the electronic paper assembly (e.g. the positions of the region 604*a* and the region 604*b* of the exemplary implementation 602 of the e-paper 102). The stress information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1104 for obtaining calibration related information associated with one or more positions of one or more portions of one or more regions of the electronic paper assembly. An exemplary implementation may include one or more of the conformation calibration modules 507 of FIG. 19A directing through the extra-intra information flow 108 (see FIG. 1) the acquisition of calibration related information such as obtaining calibration related information (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously as calibrated with respect to predetermined conformations that the e-paper 102 may assume) associated with one or more positions of one or more portions of one or more regions of the electronic paper assembly (e.g. the positions of the region 604*a* and the region 604*b* of the exemplary implementation 602 of the e-paper 102). The calibration related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1105 for obtaining pattern information associated with one or more positions of one or more portions of one or more regions of the electronic paper assembly. An exemplary implementation may include one or more of the conformation pattern modules 508 of FIG. 19A directing the acquisition through the extra-intra information flow 108 (see FIG. 1) of pattern information such as obtaining pattern information (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously with respect to one or more predetermined patterns formed by conformations that the e-paper 102 may assume) associated with one or more positions of one or more portions of one or more regions of the electronic paper assembly (e.g. the positions of the region 604*a* and the region 604*b* of the exemplary implementation 602 of the e-paper 102 having the angle of bend 624 and the partially folded conformation having the angle of bend 624*a*). The pattern information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 36

Figure 36:
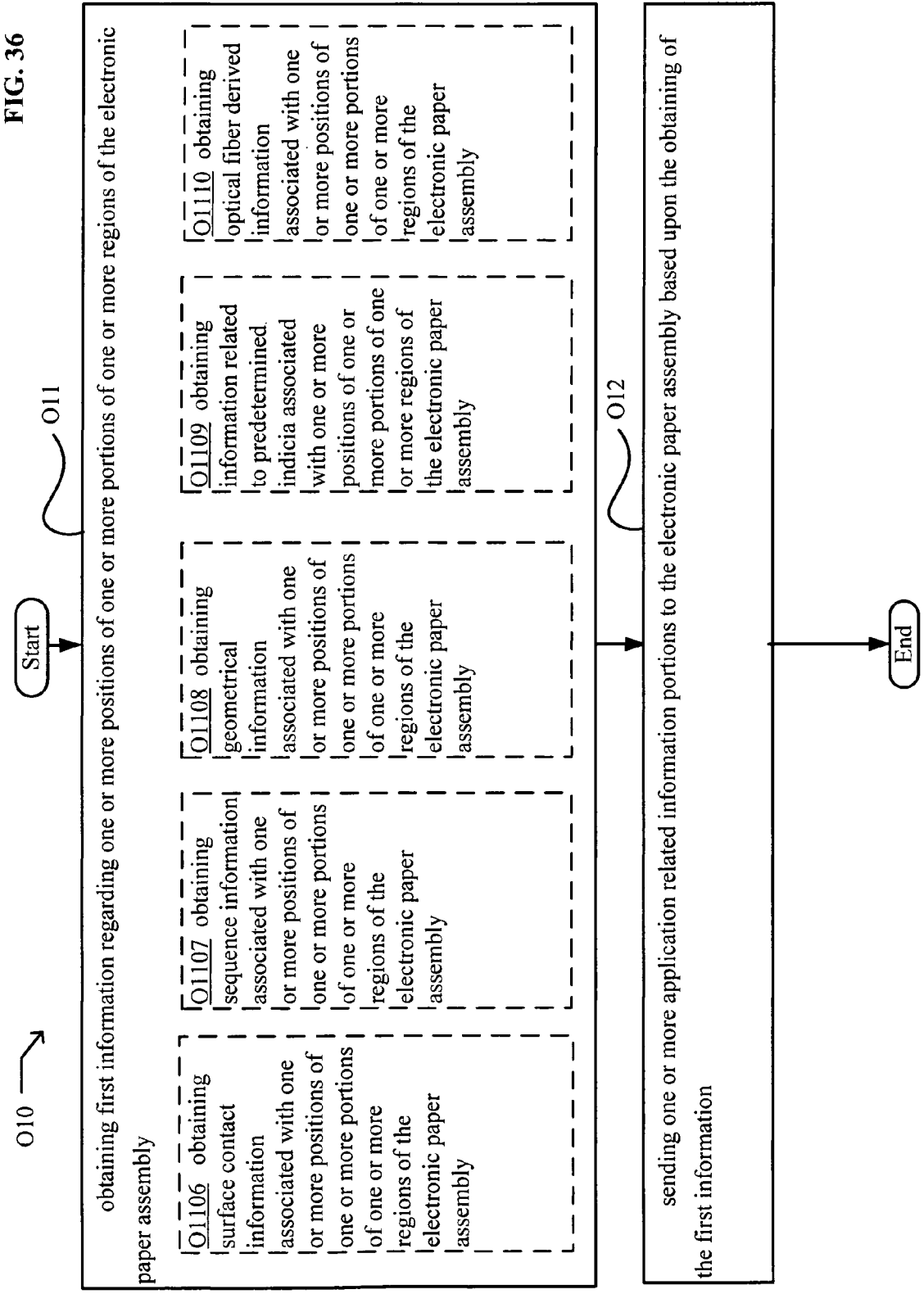
FIG. 36 is a high-level flowchart including exemplary implementations of operation O11 of FIG. 34.

FIG. 36 illustrates various implementations of the exemplary operation O11 of FIG. 34. In particular, FIG. 36 illustrates example implementations where the operation O11 includes one or more additional operations including, for example, operations O1106, O1107, O1108, O1109, and/or O1110.

For instance, in some implementations, the exemplary operation O11 may include the operation of O1106 for obtaining surface contact information associated with one or more positions of one or more portions of one or more regions of the electronic paper assembly. An exemplary implementation may include one or more surface contact modules 509 of FIG. 19A directing the acquisition through the extra-intra information flow 108 (see FIG. 1) of surface contact information such as obtaining surface contact information (e.g. one or more of the sensors 614 (see FIG. 23) as exemplary implementations of the surface sensor 144*d* (see FIG. 4) of the sensor 144 may obtain surface contact information) associated with one or more positions of one or more portions of one or more regions of the electronic paper assembly (e.g. the positions of the region 604*a* and the region 604*b* of the exemplary implementation 602 of the e-paper 102 having the angle of bend 624 and the partially folded conformation having the angle of bend 624*a*). The surface contact information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1107 for obtaining sequence information associated with one or more positions of one or more portions of one or more regions of the electronic paper assembly. An exemplary implementation may include one or more conformation sequence modules 510 of FIG. 19A directing the acquisition through the extra-intra information flow 108 (see FIG. 1) of sequence information such as obtaining sequence information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined sequences of two or more conformations that the e-paper 102 may assume) associated with one or more positions of one or more regions of the electronic paper assembly (e.g. the conformation unit 122 (see FIG. 8) may maintain in the conformation memory 200 one or more associations between the sensor information previously obtained with respect to one or more sequences such as involving one or more predetermined sequences formed by conformations that the e-paper 102 may assume such as a first sequence involving the first change 630*a* and a second sequence involving the second change 630*b* associated with the exemplary sequence 630 (comprised of the first sequence and the second sequence) of conformations of the region 604*a* and the region 604*b* of the exemplary implementation 602 of the e-paper 102 occurring in a time ordered sequence as illustrated in FIG. 26). The sequence information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1108 for obtaining geometrical information associated with one or more positions of one or more portions of one or more regions of the electronic paper assembly. An exemplary implementation may include one or more conformation geometry modules 511 of FIG. 19A directing the acquisition through the extra-intra information flow 108 (see FIG. 1) of geometrical information such as obtaining geometrical information (e.g. one or more of the sensors 614 (see FIG. 24) as exemplary implementations of the sensor 144 (see FIG. 4) may obtain sensor information regarding the geometry 625 (see FIG. 24) to be compared by the recognition engine 156 (see FIG. 5) with sensor information obtained previously with respect to one or more predetermined geometries formed by conformations that the e-paper 102 may assume) associated with one or more positions of one or more regions of the electronic paper assembly (e.g. the conformation unit 122 (see FIG. 8) may maintain in the conformation memory 200 one or more associations between the sensor information previously obtained with respect to the one or more positions involving one or more geometries formed by conformations that the e-paper 102 may assume such as for example involving positions of the geometry 625 and the geometry 625*a* (see FIG. 24) including the region 604*a* and the region 604*b* of the exemplary implementation 602 of the e-paper 102). The geometrical information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1109 for obtaining information related to predetermined indicia associated with one or more positions of one or more portions of one or more regions of the electronic paper assembly. An exemplary implementation may include one or more of the conformation indicia modules 512 of FIG. 19A directing the acquisition through the extra-intra information flow 108 (see FIG. 1) of information related to predetermined indicia such as obtaining information related to predetermined indicia (e.g. one or more of the sensors 614 (see FIG. 23) as exemplary implementations of the sensor 144 (see FIG. 4) may obtain sensor information to be compared by the recognition engine 156 (see FIG. 5) with predetermined indicia of conformations that the e-paper 102 may assume) associated with one or more one or more positions of one or more portions of one or more regions of the electronic paper assembly (e.g. the conformation unit 122 (see FIG. 8) may maintain in the conformation memory 200 one or more associations between the previously obtained sensor information calibrated with respect to one or more positions involving one or more conformations that the e-paper 102 may assume such as for example a change in a sequence involving the partially folded conformation of the region 604*a* and the region 604*b* of the exemplary implementation 602 of the e-paper 102 having the angle of bend 624 and the partially folded conformation having the angle of bend 624*a*). The information related to predetermined indicia can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1110 for obtaining optical fiber derived information associated with one or more positions of one or more portions of one or more regions of the electronic paper assembly. An exemplary implementation may include one or more optical fiber modules 513 of FIG. 19A directing the acquisition through the extra-intra information flow 108 (see FIG. 1) of optical fiber derived information such as obtaining optical fiber derived information (e.g. one or more of the sensors 614 (see FIG. 23) as exemplary implementations of the optical fiber sensor 144*c* (see FIG. 4) of the sensor 144 may obtain optical fiber derived information) associated with one or more positions of one or more portions of one or more regions of the electronic paper assembly (e.g. the conformation unit 122 (see FIG. 8) may maintain in the conformation memory 200 one or more associations between the optical fiber derived information to be obtained by the sensors 614 and one or more positions of one or more conformations such involving the partially folded conformation of the region 604a and the region 604b of the exemplary implementation 602 of the e-paper 102 having the angle of bend 624 and the partially folded conformation having the angle of bend 624a). The optical fiber derived information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 37

Figure 37:
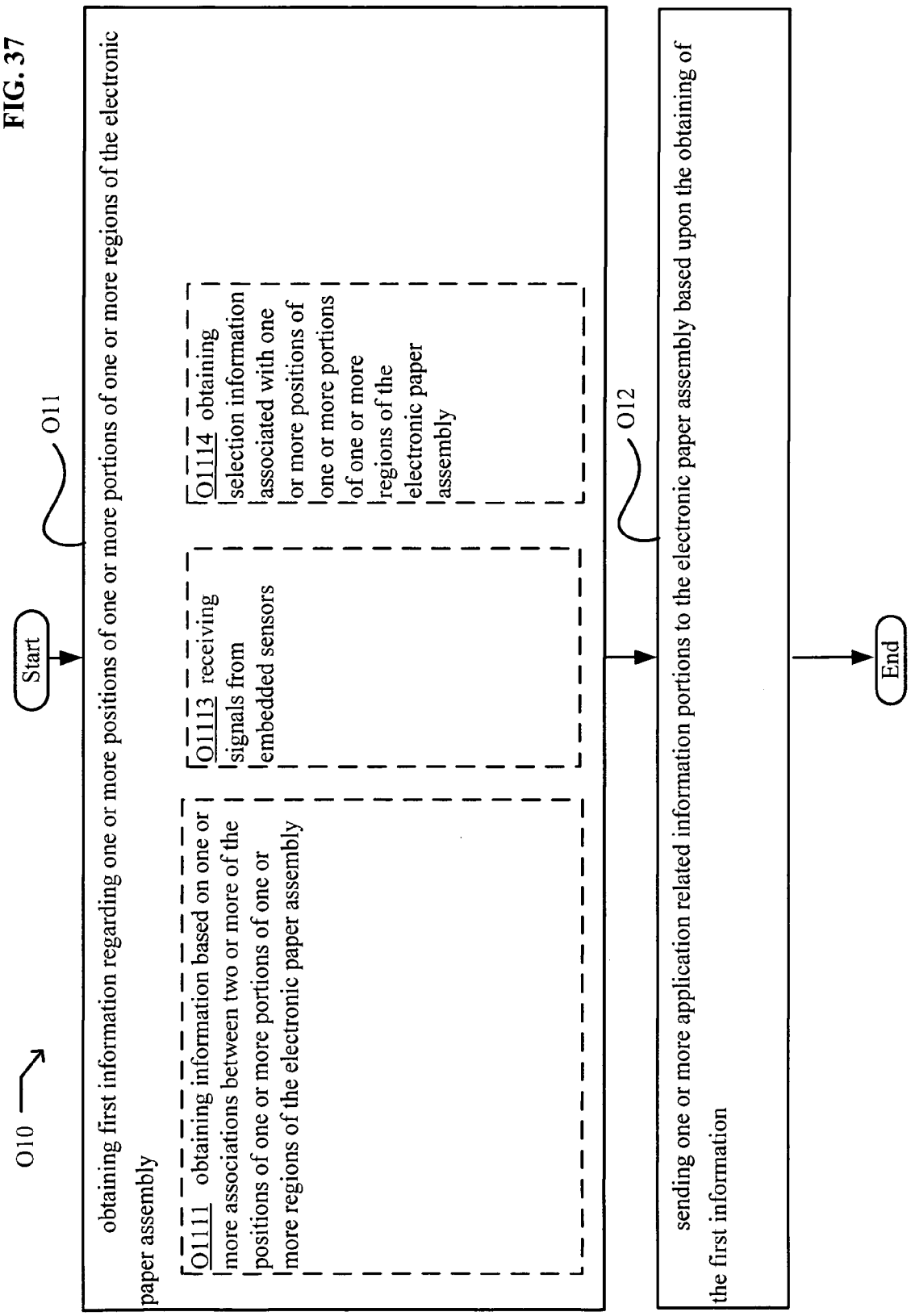
FIG. 37 is a high-level flowchart including exemplary implementations of operation O11 of FIG. 34.

FIG. 37 illustrates various implementations of the exemplary operation O11 of FIG. 34. In particular, FIG. 37 illustrates example implementations where the operation O11 includes one or more additional operations including, for example, operations O1111, O1113, and/or O1114.

For instance, in some implementations, the exemplary operation O11 may include the operation of O1111 for obtaining information based on one or more associations between two or more of the positions of one or more portions of one or more regions of the electronic paper assembly. An exemplary implementation may include one or more conformation association modules 514 of FIG. 19A directing the acquisition through the extra-intra information flow 108 (see FIG. 1) of information based on one or more associations such as obtaining information based on one or more associations between two or more of the positions of the one or more portions of the one or more regions of the electronic paper assembly (e.g. two or more of the sensors 614 (see FIG. 23) as exemplary implementations of the sensor 144 (see FIG. 4) may obtain information based on one or more of the associations between the sensors positioned at various portions of various regions wherein the associations may be related to factors such as distance, relative strain, or relative stress between the sensors) associated with two or more conformations of one or more portions of one or more regions of the electronic paper assembly (e.g. the conformation unit 122 (see FIG. 8) may maintain in the conformation memory 200 one or more of correlations between the sensor information regarding one or more of the associations 628 (see FIG. 25) and one or more of the associations 628a (see FIG. 25a) involving the region 604a and the region 604b of the exemplary implementation 602 of the e-paper 102). The information based on one or more associations can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1113 for receiving signals from embedded sensors. An exemplary implementation may include one or more conformation signal modules 515 of FIG. 19A directing the acquisition through the extra-intra information flow 108 (see FIG. 1) of signals such as receiving signals from embedded sensors (e.g. one or more of the sensors 614 (see FIG. 30) as exemplary implementations of the sensor 144 (see FIG. 4) may send obtained sensor information to the sensor control 142 to be further sent through the sensor interface 146 to units such as the recognition unit 116 (see FIG. 5) by receipt of signals from the sensor interface through the recognition interface 158. The signals from the embedded sensors can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1114 for obtaining selection information associated with one or more positions of one or more portions of one or more regions of the electronic paper assembly. An exemplary implementation may include one or more conformation selection modules 516 of FIG. 19A directing the acquisition through the extra-intra information flow 108 (see FIG. 1) of selection information such as obtaining selection information (e.g. the selection 626 between TV, PDA, cell phone, notebook PC, and eBook functionality (see FIG. 24) may be obtained by having the recognition engine 156 (see FIG. 5) use sensor information from one or more of the sensors 614 (see FIG. 24) in conjunction with predetermined configuration data stored in the conformation memory 200 (see FIG. 8) to recognize one or more changes in one or more sequences of predetermined conformations, which may then be used by the application control 166 (see FIG. 6) of the application unit 118 to select a functionality per data stored in the application memory 176) associated with the one or more changes in one or more sequences of two or more conformations of one or more portions of one or more regions of the electronic paper assembly (e.g. a change in a sequence involving the conformations of the geometry 625 and the geometry 625a of the exemplary implementation 602 of the e-paper 102 including the region 604a and the region 604b as illustrated in FIG. 24). The selection information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 38

Figure 38:
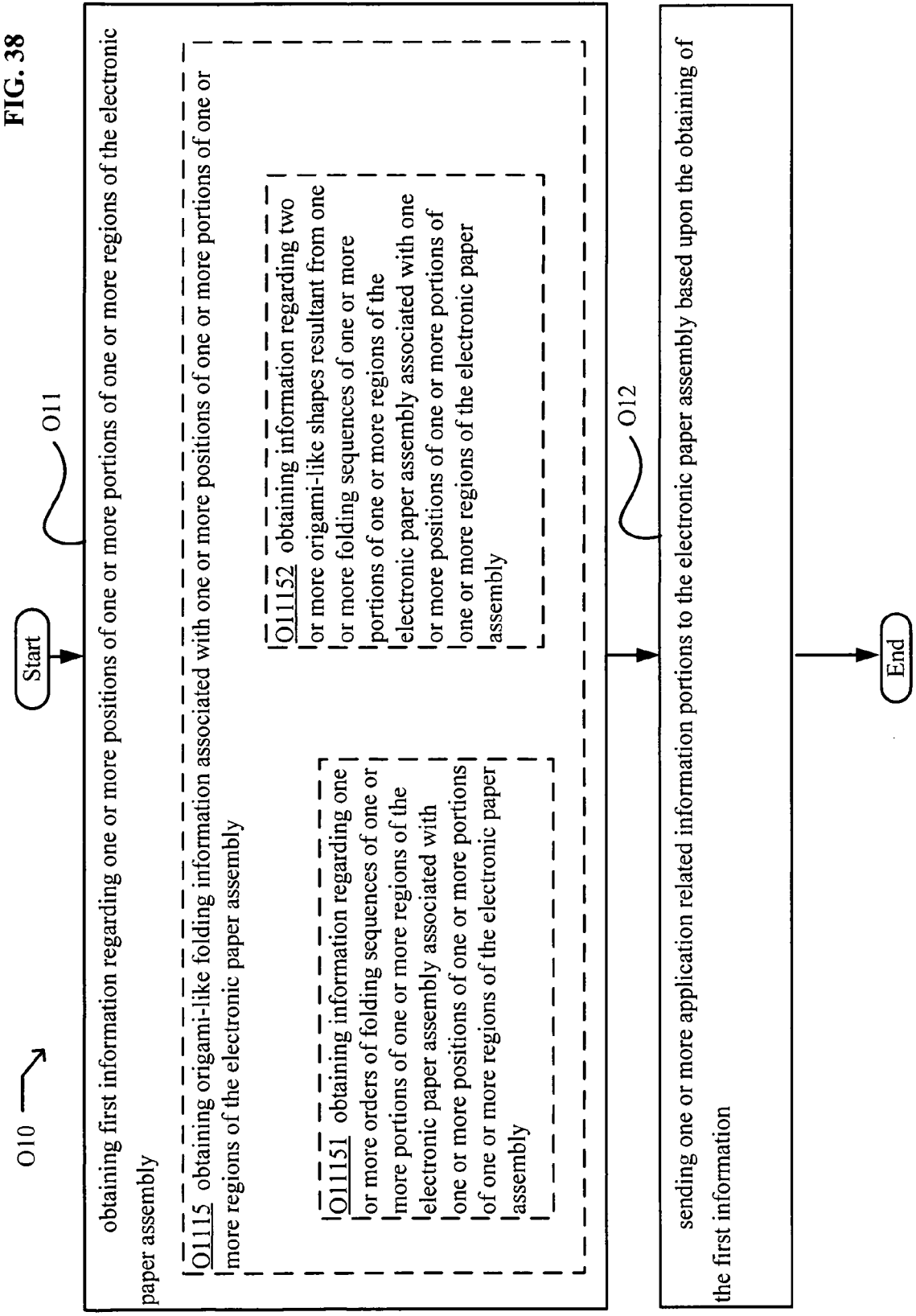
FIG. 38 is a high-level flowchart including exemplary implementations of operation O11 of FIG. 34.

FIG. 38 illustrates various implementations of the exemplary operation O11 of FIG. 34. In particular, FIG. 38 illustrates example implementations where the operation O11 includes the operation O1115, which includes one or more additional operations including, for example, operations O11151, and/or O11152.

For instance, in some implementations, the exemplary operation O11 may include the operation of O1115 for obtaining origami-like folding information associated with one or more positions of one or more portions of one or more regions of the electronic paper assembly. An exemplary implementation may include one or more origami-like folding modules 517 of FIG. 19A directing the acquisition through the extra-intra information flow 108 (see FIG. 1) of origami-like folding information such as obtaining origami-like folding information (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously with respect to one or more predetermined origami-like folding results formed by conformations that the e-paper 102 may assume) associated with one or more positions of one or more portions of one or more regions of the electronic paper assembly (e.g. the conformation unit 122 (see FIG. 8) may maintain in the conformation memory 200 one or more associations between the sensor information previously obtained with respect to one or more positions of one or more predetermined origami-like folding results formed by conformations that the e-paper 102 may assume such as for example a change in a sequence involving the partially folded conformation of the region 604a and the region 604b of the exemplary implementation 602 of the e-paper 102 having the angle of bend 624 and the partially folded conformation having the angle of bend 624a). The origami-like folding information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O1115 may include the operation of O11151 for obtaining information regarding one or more orders of folding sequences of one or more portions of one or more regions of the electronic paper assembly associated with one or more positions of one or more portions of one or more regions of the electronic paper assembly. An exemplary implementation may include one or more of the folding sequence modules 518 of FIG. 19A directing the acquisition through the extra-intra information flow 108 (see FIG. 1) of one or more orders of folding sequences (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more orders of folding sequences that the e-paper 102 may assume such as a folding sequence order involving the first change 630a and the second change 630b of the exemplary sequence 630 of conformations representing a folding sequence order of the region 604a and the region 604b of the exemplary implementation 602 of the e-paper 102 occurring in a time ordered sequence as illustrated in FIG. 26). The information regarding one or more orders of folding sequences can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O1115 may include the operation of O11152 for obtaining information regarding two or more origami-like shapes resultant from one or more folding sequences of one or more portions of one or more regions of the electronic paper assembly associated with one or more positions of one or more portions of one or more regions of the electronic paper assembly. An exemplary implementation may include one or more origami-like shape modules 519 of FIG. 19A directing the acquisition through the extra-intra information flow 108 (see FIG. 1) of information regarding two or more resultant origami-like shapes such as obtaining information regarding two or more origami-like shapes resultant from one or more folding sequences of one or more portions of one or more regions of the electronic paper assembly (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously with respect to two or more resultant origami-like shapes formed by conformations that the e-paper 102 may assume. The conformation unit 122 (see FIG. 8) may maintain in the conformation memory 200 one or more two or more associations between the sensor information previously obtained with respect to one or more resultant origami-like shapes formed by conformations that the e-paper 102 may assume such as for example involving the partially folded conformation of the region 604a and the region 604b of the exemplary implementation 602 of the e-paper 102 having the angle of bend 624 and the partially folded conformation having the angle of bend 624a). The information regarding two or more origami-like shapes can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 39

Figure 39:
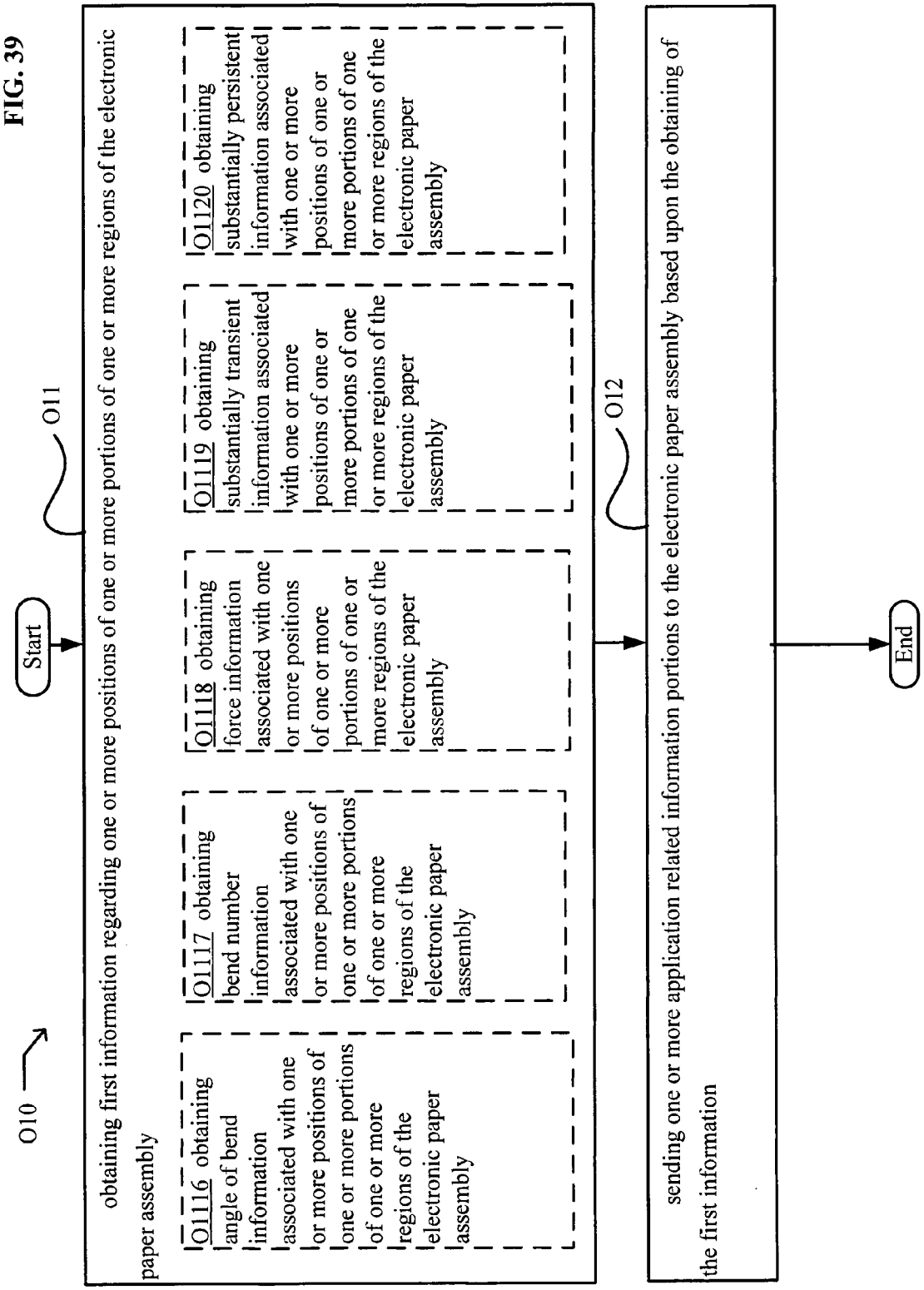
FIG. 39 is a high-level flowchart including exemplary implementations of operation O11 of FIG. 34.

FIG. 39 illustrates various implementations of the exemplary operation O11 of FIG. 34. In particular, FIG. 39 illustrates example implementations where the operation O11 includes one or more additional operations including, for example, operations O1116, O1117, O1118, O1119, and/or O1120.

For instance, in some implementations, the exemplary operation O11 may include the operation of O1116 for obtaining angle of bend information associated with one or more positions of one or more portions of one or more regions of the electronic paper assembly. Since bend number information may be related to the number of folds or bends that a particular conformation may have in general and/or may also relate to the number of various type of folds or bonds such as based upon the orientation and/or extent of each of the folds or bends, bend number information associated with one or more changes in one or more sequences of two or more conformations may regard how bend number changes with changes in the one or more sequences. An exemplary implementation may include one or more bend angle modules 520 of FIG. 19A directing the acquisition through the extra-intra information flow 108 (see FIG. 1) of angle of bend information such as obtaining angle of bend information (e.g. one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching angle of bend information contained in the recognition memory 164 with the sensing data) associated with one or more positions (e.g. involving the partially folded conformation of the exemplary implementation 602 of the e-paper 102 having an angle of bend 624 and the partially folded conformation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). The angle of bend information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1117 for obtaining bend number information associated with one or more positions of one or more portions of one or more regions of the electronic paper assembly. Since bend number information may be related to the number of folds or bends that a particular conformation may have in general and/or may also relate to the number of various type of folds or bonds such as based upon the orientation and/or extent of each of the folds or bends, bend number information associated with one or more changes in one or more sequences of two or more conformations may regard how bend number changes with changes in the one or more sequences. An exemplary implementation may include one or more bend number modules 521 of FIG. 19A directing the acquisition through the extra-intra information flow 108 (see FIG. 1) of bend number information such as obtaining bend number information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined bend conformations that the e-paper 102 may assume) associated with one or more positions of one or more portions of one or more regions of the electronic paper assembly (e.g. the conformation unit 122 (see FIG. 8) may maintain in the conformation memory 200 one or more associations between the sensor information previously obtained with respect to the one or more predetermined bend conformations that the e-paper 102 may assume such as a change in the exemplary sequence 630 of conformations having a bend number of the region 604a and the region 604b of the partially folded conformation of the exemplary implementation 602 of the e-paper 102 having the angle of bend 624 and the partially folded conformation having the angle of bend 624a as illustrated in FIG. 26). The bend number information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1118 for obtaining force information associated with one or more positions of one or more portions of one or more regions of the electronic paper assembly. An exemplary implementation may include one or more conformation force modules 522 of FIG. 19A directing the acquisition through the extra-intra information flow 108 (see FIG. 1) of force information such as obtaining force information (e.g. one or more of the sensors 614 (see FIG. 23) as exemplary implementations of the force sensor 144e (see FIG. 4) of the sensor 144 may obtain force information) associated with one or more positions of one or more portions of one or more regions of the electronic paper assembly (e.g. the conformation unit 122 (see FIG. 8) may maintain in the conformation memory 200 one or more associations between force information to be obtained by the sensors 614 and one or more positions of one or more portions of one or more regions such as the region 604a and the region 604b of the exemplary implementation 602 of the e-paper 102 having the angle of bend 624 and the partially folded conformation having the angle of bend 624a). The force information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1119 for obtaining substantially transient information associated with one or more positions of one or more portions of one or more regions of the electronic paper assembly. An exemplary implementation may include one or more conformation transient modules 523 of FIG. 19A directing the acquisition through the extra-intra information flow 108 (see FIG. 1) of substantially transient information such as obtaining substantially transient information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined periods of time that are deemed "transient" such as with respect to an absolute measure of time such as a certain number of seconds or minutes or such as respect to a relative measure of time such as how long it would typically take to read a portion of a display, etc.) associated with one or more positions of one or more portions of one or more regions of the electronic paper assembly (e.g. the conformation unit 122 (see FIG. 8) may maintain in the conformation memory 200 one or more associations between the sensor information previously obtained with respect to the one or more predetermined periods of time that are deemed "transient" for one or more positions of one or more portions of the e-paper 102 involving the partially folded conformation of the region 604a and the region 604b of the exemplary implementation 602 of the e-paper 102 having the angle of bend 624 and the partially folded conformation having the angle of bend 624a as illustrated in FIG. 26). The substantially transient information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1120 for obtaining substantially persistent information associated with one or more positions of one or more portions of one or more regions of the electronic paper assembly. An exemplary implementation may include one or more conformation persistent modules 524 of FIG. 19A directing the acquisition through the extra-intra information flow 108 (see FIG. 1) of substantially persistent information such as obtaining substantially persistent information (e.g., one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined periods of time that are deemed "persistent" such as with respect to an absolute measure of time such as a certain number of minutes, hours, or days, etc or such as respect to a relative measure of time such as how long it would typically take to read a portion of a book, etc.) associated with one or more positions of one or more portions of one or more regions of the electronic paper assembly (e.g. the conformation unit 122 (see FIG. 8) may maintain in the conformation memory 200 one or more associations between the sensor information previously obtained with respect to the one or more predetermined periods of time that are deemed "persistent" for one or more conformations that the e-paper 102 may assume such involving the partially folded conformation of the region 604a and the region 604b of the exemplary implementation 602 of the e-paper 102 having the angle of bend 624 and the partially folded conformation having the angle of bend 624a as illustrated in FIG. 26). The substantially persistent information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 40

Figure 40:
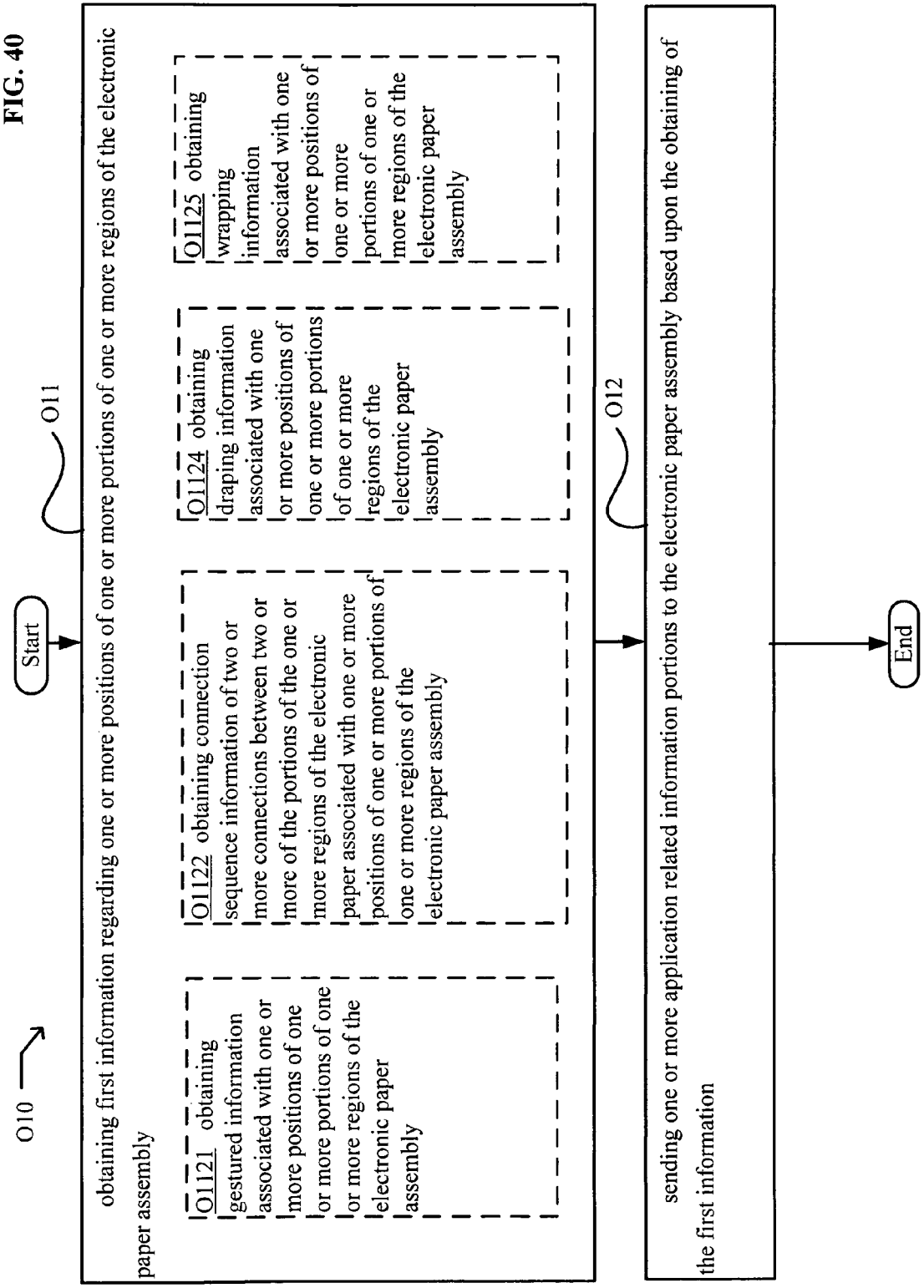
FIG. 40 is a high-level flowchart including exemplary implementations of operation O11 of FIG. 34.

FIG. 40 illustrates various implementations of the exemplary operation O11 of FIG. 34. In particular, FIG. 40 illustrates example implementations where the operation O11 includes one or more additional operations including, for example, operations O1121, O1122, O1124, and/or O1125.

For instance, in some implementations, the exemplary operation O11 may include the operation of O1121 for obtaining gestured information associated with one or more positions of one or more portions of one or more regions of the electronic paper assembly. An exemplary implementation may include one or more conformation gesture modules 525 of FIG. 19A directing the acquisition through the extra-intra information flow 108 (see FIG. 1) of gestured information such as obtaining gestured information (e.g. one or more of the sensors 614 (see FIG. 26) as exemplary implementations of the sensor 144 (see FIG. 4) may obtain sensor information at one point in time or in combination with over one or more periods of time to be compared by the recognition engine 156 (see FIG. 5) with sensor information obtained previously at one point in time or in combination with over one or more periods of time with respect to one or more various types of sensor data such as obtained by the strain sensor 144a, the stress sensor 144b, the optical fiber sensor 144c, the surface sensor 144*d*, the force sensor 144*e*, and/or the gyroscopic sensor 144*f* of the sensor 144 (see FIG. 4)) associated with one or more positions of one or more portions of one or more regions of the electronic paper assembly (e.g. the conformation unit 122 (see FIG. 8) may maintain in the conformation memory 200 one or more associations between the combinations of sensor information previously obtained for conformations that the e-paper 102 may assume such as involving the exemplary partially folded conformation of the exemplary implementation 602 of the e-paper 102 of the region 604*a* and the region 604*b* having the angle of bend 624 and the exemplary folded conformation having the angle of bend 624*a* as illustrated in FIG. 26). The gestured information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1122 for obtaining connection sequence information of two or more connections between two or more of the portions of the one or more regions of the electronic paper associated with one or more positions of one or more portions of one or more regions of the electronic paper assembly. An exemplary implementation may include one or more conformation connection modules 526 of FIG. 19A directing the acquisition through the extra-intra information flow 108 (see FIG. 1) of connection information such as obtaining connection information of one or more positions of one or more portions (e.g. one or more of the sensors 614 (see FIG. 27) may be activated with one or more of a plurality of the exemplary implementations 602 of the e-paper 102 are assembled together in particular sorts of coupling conformations such as the coupling conformation 632 of FIG. 27) of the one or more regions of the electronic paper associated with one or more positions of one or more portions of one or more regions of the electronic paper assembly (such as a change in a sequence involving connection information between the exemplary coupling conformation 632 of the plurality of the regions 604*a* and the plurality of the regions 604*b* of the exemplary implementation 602 of the e-paper 102 and the exemplary coupling conformation 632*a* shown in FIG. 27). The connection sequence information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1124 for obtaining draping information associated with one or more positions of one or more portions of one or more regions of the electronic paper assembly. An exemplary implementation may include one or more conformation draping modules 527 of FIG. 19A directing the acquisition through the extra-intra information flow 108 (see FIG. 1) of draping information such as obtaining draping information (e.g. one or more of the sensors 614 (see FIG. 28) as exemplary implementations of the sensor 144 (see FIG. 4) may obtain sensor information to be compared by the recognition engine 156 (see FIG. 5) with sensor information obtained previously with respect to one or more predetermined draping conformations that the e-paper 102 may assume, for example, by being draped over the object 634 of FIG. 28 or over the object 634*a* of the FIG. 28*a*) associated with one or more positions of one or more portions of one or more regions of the electronic paper assembly (e.g. the conformation unit 122 (see FIG. 8) may maintain in the conformation memory 200 one or more associations between the sensor information previously obtained with respect to the one or more positions of one or portions of one or more regions of one or more draping conformations that the e-paper 102 may assume such as for example involving the exemplary draping conformation 633 over the object 634 (see FIG. 28) and the exemplary draping conformation 633*a* over the object 634*a* (see FIG. 28*a*) of the region 604*a* and the region 604*b* of the exemplary implementation 602 of the e-paper 102). The draping information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1125 for obtaining wrapping information associated with one or more positions of one or more portions of one or more regions of the electronic paper assembly. An exemplary implementation may include one or more wrapping modules 528 of FIG. 19A directing the acquisition through the extra-intra information flow 108 (see FIG. 1) of wrapping information such as obtaining wrapping information (e.g. one or more of the sensors 614 (see FIG. 29) as exemplary implementations of the sensor 144 (see FIG. 4) may obtain sensor information to be compared by the recognition engine 156 (see FIG. 5) with sensor information obtained previously with respect to one or more predetermined wrapping conformations that the e-paper 102 may assume, for example, by being wrapped around the object 636) associated with one or more positions of one or more portions of one or more regions of the electronic paper assembly (e.g. the conformation unit 122 (see FIG. 8) may maintain in the conformation memory 200 one or more associations between the sensor information previously obtained with respect to one or more wrapped conformations that the e-paper 102 may assume such as for example involving the exemplary wrapped conformation 635 around the exemplary object 636 (see FIG. 29) and the exemplary wrapped conformation 635*a* around the exemplary object 636*a* (see FIG. 29*a*) of the region 604*a* and the region 604*b* of the exemplary implementation 602 of the e-paper 102). The wrapping information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 41

Figure 41:
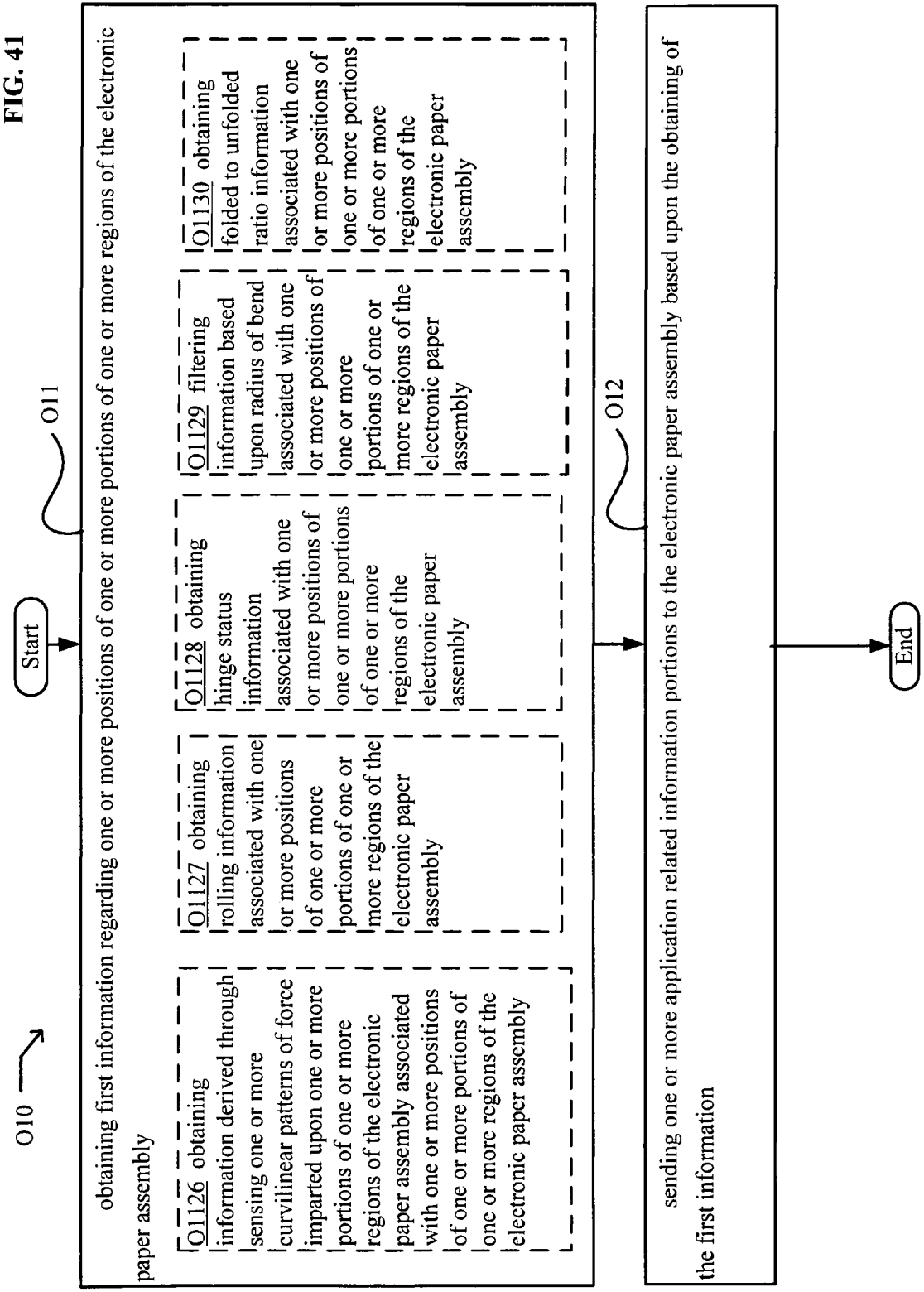
FIG. 41 is a high-level flowchart including an exemplary implementation of operation O11 of FIG. 34.

FIG. 41 illustrates various implementations of the exemplary operation O11 of FIG. 34. In particular, FIG. 41 illustrates example implementations where the operation O11 includes one or more additional operations including, for example, operations O1126, O1127, O1128, O1129, and/or O1130.

For instance, in some implementations, the exemplary operation O11 may include the operation of O1126 for obtaining information derived through sensing one or more curvilinear patterns of force imparted upon one or more portions of one or more regions of the electronic paper assembly associated with one or more positions of one or more portions of one or more regions of the electronic paper assembly. An exemplary implementation may include one or more conformation curvilinear modules 529 of FIG. 19A directing the acquisition through the extra-intra information flow 108 (see FIG. 1) of curvilinear information such as obtaining information derived through sensing one or more curvilinear patterns of force imparted (e.g. one or more of the sensors 614 (see FIG. 30) as exemplary implementations of the force sensor 144*e* (see FIG. 4) of the sensor 144 may obtain force information such as that imparted by the exemplary instrument 638 following a path 640) upon one or more portions of one or more regions of the electronic paper assembly (e.g. the conformation unit 122 (see FIG. 8) may maintain in the conformation memory 200 portions of curvilinear patterns of force to be obtained by the sensors 614 and may also maintain in the content storage 132 (see FIG. 3) information associated with one or more curvilinear patterns of force along the region 604*a* and the region 604*b* of the exemplary implementation 602 of the e-paper 102 for instance, involving the exemplary path 640*a* and the exemplary path 640*b*). The curvilinear force related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1127 for obtaining rolling information associated with one or more positions of one or more portions of one or more regions of the electronic paper assembly. An exemplary implementation may include one or more conformation rolling modules 530 of FIG. 19A directing the acquisition through the extra-intra information flow 108 (see FIG. 1) of rolling information such as obtaining rolling information (e.g. one or more of the sensors 614 (see FIG. 31) as exemplary implementations of the sensor 144 (see FIG. 4) may obtain sensor information to be compared by the recognition engine 156 (see FIG. 5) with sensor information obtained previously with respect to one or more predetermined rolling conformations that the e-paper 102 may assume, for example, the exemplary rolled conformation 643 (see FIG. 31) associated with one or more positions of one or more portions of one or more regions of the electronic paper assembly (e.g. the conformation unit 122 (see FIG. 8) may maintain in the conformation memory 200 one or more associations between the sensor information previously obtained with respect one or more rolled conformations that the e-paper 102 may assume such as for example involving the rolled conformation 643 and the rolled conformation 643*a* of the region 604*a* and the region 604*b* of the exemplary implementation 602 of the e-paper 102 shown in FIG. 31). The rolling information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1128 for obtaining hinge status information associated with one or more positions of one or more portions of one or more regions of the electronic paper assembly. An exemplary implementation may include one or more conformation hinge modules 531 of FIG. 19A directing the acquisition through the extra-intra information flow 108 (see FIG. 1) of hinge status information such as obtaining hinge status information (e.g. one or more of the sensors 614 (see FIG. 32) as exemplary implementations of the sensor 144 (see FIG. 4) of the sensor unit 114 obtaining sensing data in combination with the recognition engine 156 (see FIG. 5) through the recognition logic 162 matching hinge status information contained in the recognition memory 164 with the sensing data) associated with one or more positions of one or more portions of one or more regions of the electronic paper assembly (e.g. involving the partially folded conformation 644 of the exemplary implementation 602 of the e-paper 102 of the region 604*a* and the region 604*b* having a hinge status 645 and the partially folded conformation 644*a* having hinge status 645*a* shown in FIG. 32). The hinge status information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1129 for filtering information based upon radius of bend associated with one or more positions of one or more portions of one or more regions of the electronic paper assembly. An exemplary implementation may include one or more bend radius modules 532 of FIG. 19A directing the filtering of information such as filtering information based on radius of bend (e.g. the recognition engine 156 (see FIG. 5) may use sensor information from one or more of the sensors 614 (see FIG. 33) in conjunction with predetermined configuration data stored in the conformation memory 200 (see FIG. 8) to recognize a predetermined radius of bend conformation, which may then be used by the content control 130 (see FIG. 3) of the content unit 112 to filter information contained in the content memory 140) associated with one or more positions of one or more portions of one or more regions of the electronic paper assembly (e.g. a change in a sequence involving the radius of bend 646 and the radius of bend 646*a* of the exemplary implementation 602 of the e-paper 102 including the region 604*a* and the region 604*b* as illustrated in FIG. 33). The bend radius related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1130 for obtaining folded to unfolded ratio information associated with one or more positions of one or more portions of one or more regions of the electronic paper assembly. An exemplary implementation may include one or more fold ratio modules 533 of FIG. 19A directing the acquisition through the extra-intra information flow 108 (see FIG. 1) of folded to unfolded ratio information such as obtaining folded to unfolded ratio information (e.g. one or more of the sensors 614 (see FIG. 20) as exemplary implementations of the sensor 144 (see FIG. 4) may obtain sensor information to be compared by the recognition engine 156 (see FIG. 5) with sensor information obtained previously with respect to one or more predetermined folded and unfolded conformations that the e-paper 102 may assume along the borders 606 and/or elsewhere, such as the various bends and folds shown with the conformations of FIGS. 23, 24, 25, 26, 28, 29, 31, 32, and 33. The conformation processor 196 (see FIG. 8) of the conformation unit 122 may determine which of the borders 606 and/or elsewhere in the regions 604 are folded and/or bent versus which are unfolded and/or unbent thereby producing a folded to unfolded ratio) associated with one or more changes in one or more sequences in one or more conformations of one or more portions of one or more regions of the electronic paper assembly (e.g. the conformation unit 122 (see FIG. 8) may maintain in the conformation memory 200 one or more associations between folded to unfolded ratios and various conformations that the e-paper 102 may assume thereby being capable of indicating existence of one or more sequences involving such conformations, such as for example a change in a sequence involving the partially folded conformation of the region 604*a* and the region 604*b* of the exemplary implementation 602 of the e-paper 102 having the angle of bend 624 and the partially folded conformation having the angle of bend 624*a* shown in FIG. 23). The fold ratio related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 42

Figure 42:
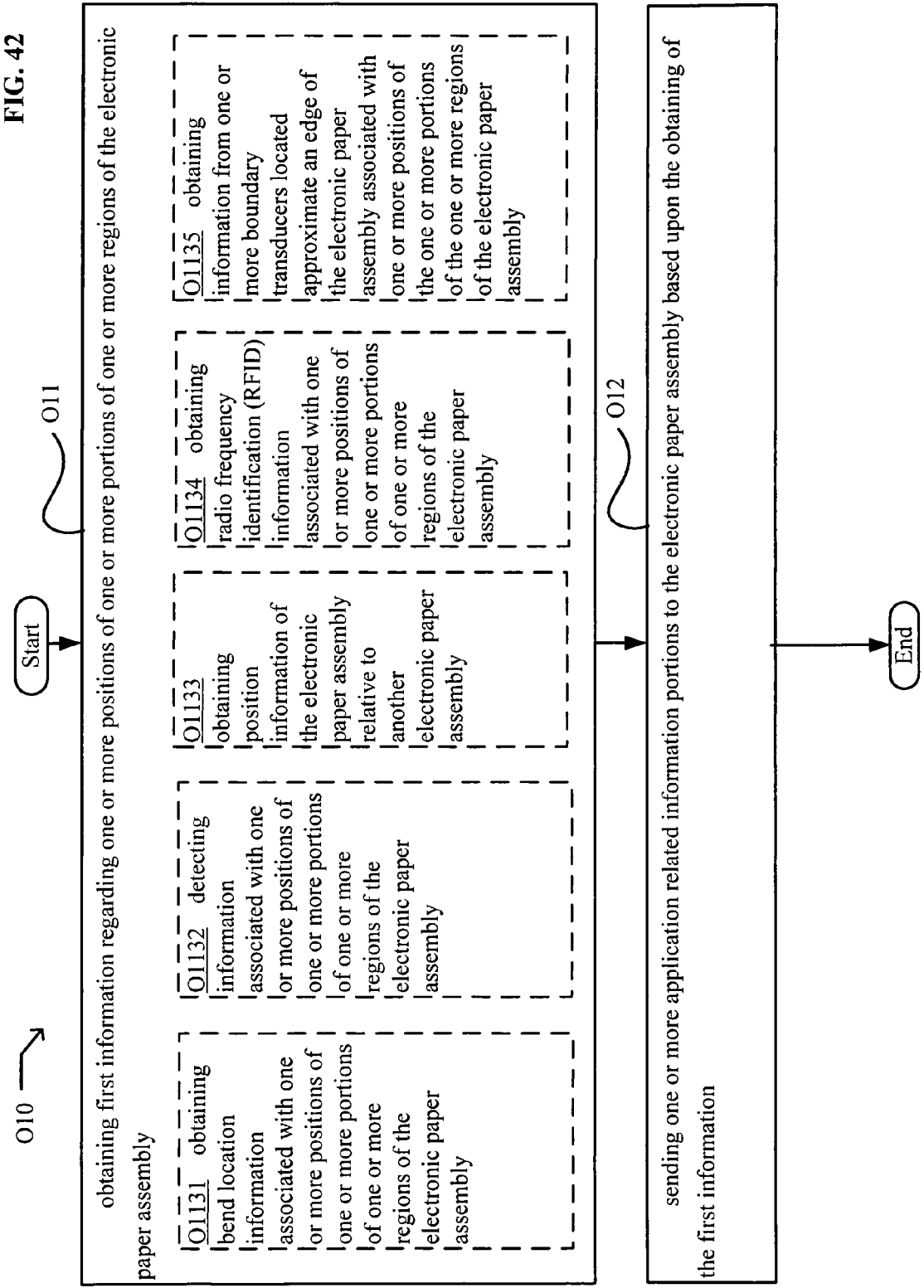
FIG. 42 is a high-level flowchart including exemplary implementations of operation O11 of FIG. 34.

FIG. 42 illustrates various implementations of the exemplary operation O11 of FIG. 34. In particular, FIG. 42 illustrates example implementations where the operation O11 includes one or more additional operations including, for example, operation O1131, O1132, O1133, O1134, and O1135.

For instance, in some implementations, the exemplary operation O11 may include the operation of O1131 for obtaining bend location information associated with one or more positions of one or more portions of one or more regions of the electronic paper assembly. An exemplary implementation may include one or more bend location modules 534 of FIG. 19A directing the acquisition through the extra-intra information flow 108 (see FIG. 1) of bend location information such as obtaining bend location information (e.g. one or more of the sensors 614 (see FIG. 20) as exemplary implementations of the sensor 144 (see FIG. 4) may obtain sensor information to be compared by the recognition engine 156 (see FIG. 5) with sensor information obtained previously with respect to locations on the e-paper 102 that bends may assume along the borders 606 and/or elsewhere, such as the various bends and folds shown with the conformations of FIGS. 23, 24, 25, 26, 28, 29, 31, 32, and 33. The conformation processor 196 (see FIG. 8) of the conformation unit 122 may determine which of the borders 606 and/or elsewhere in the regions 604 are folded and/or bent thereby producing bend location information) associated with one or more positions of one or more portions of one or more regions of the electronic paper assembly (e.g. the conformation unit 122 (see FIG. 8) may maintain in the conformation memory 200 one or more associations between bend locations and various conformations that the e-paper 102 may assume thereby being capable of indicating existence of one or more conformations, such as for example involving the partially folded conformation of the region 604a and the region 604b of the exemplary implementation 602 of the e-paper 102 having the angle of bend 624 and the partially folded conformation having the angle of bend 624a shown in FIG. 23). The bend location information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1132 for detecting information associated with one or more positions of one or more portions of one or more regions of the electronic paper assembly. An exemplary implementation may include one or more position detection modules 536 of FIG. 19B directing the acquisition of information associated with one or more positions of one or more portions of one or more regions of the electronic paper assembly 102. For instance, extra-e-paper sensor 440 of the extra-e-paper sensor unit 404 can detect information, through various technologies including those described above for the sensor unit, associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23.

For instance, in some implementations, the exemplary operation O11 may include the operation of O1133 for obtaining position information of the electronic paper assembly relative to another electronic paper assembly. An exemplary implementation may include one or more relative position obtaining modules 537 of FIG. 19B directing the acquisition through the extra-intra information flow 108 (see FIG. 1) of position information of the electronic paper assembly 102 relative to another electronic paper assembly. For instance, relative association between two or more portions of two or more instances of the exemplary implementation 602 may be determined two or more of the sensors 614 of FIG. 25 of each instance of the exemplary implementation 602 based upon factors such as separation distance or other geometrical factors. The relative position information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1134 for obtaining radio frequency identification (RFID) information associated with one or more positions of one or more portions of one or more regions of the electronic paper assembly. An exemplary implementation may include one or more RFID obtaining modules 538 of FIG. 19B directing the acquisition of RFID information associated with one or more positions of one or more portions of one or more regions of the electronic paper assembly 102. For instance, the intra-e-paper sensor unit 114 can include one or more of the RFID sensor tags 144H that can be detected by one or more of the extra-e-paper sensors 440 located in known positions to provide data for the extra-e-paper sensor control 438 to ascertain one or more positions of one or more portions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23.

For instance, in some implementations, the exemplary operation O11 may include the operation of O1135 for obtaining information from one or more boundary transducers located approximate an edge of the electronic paper assembly associated with one or more positions of the one or more portions of the one or more regions of the electronic paper assembly. An exemplary implementation may include one or more edge obtaining modules 539 of FIG. 19B directing the acquisition through the extra-intra information flow 108 (see FIG. 1) of position information of the electronic paper assembly 102. For instance, position related information from one or more boundary transducers located approximate an edge of the electronic paper assembly (e.g. the sensors 614 located on edges of the exemplary implementation 602 shown in FIG. 27) associated with one or more positions of the one or more portions of the one or more regions of the electronic paper assembly can be acquired by the sensors. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 43

Figure 43:
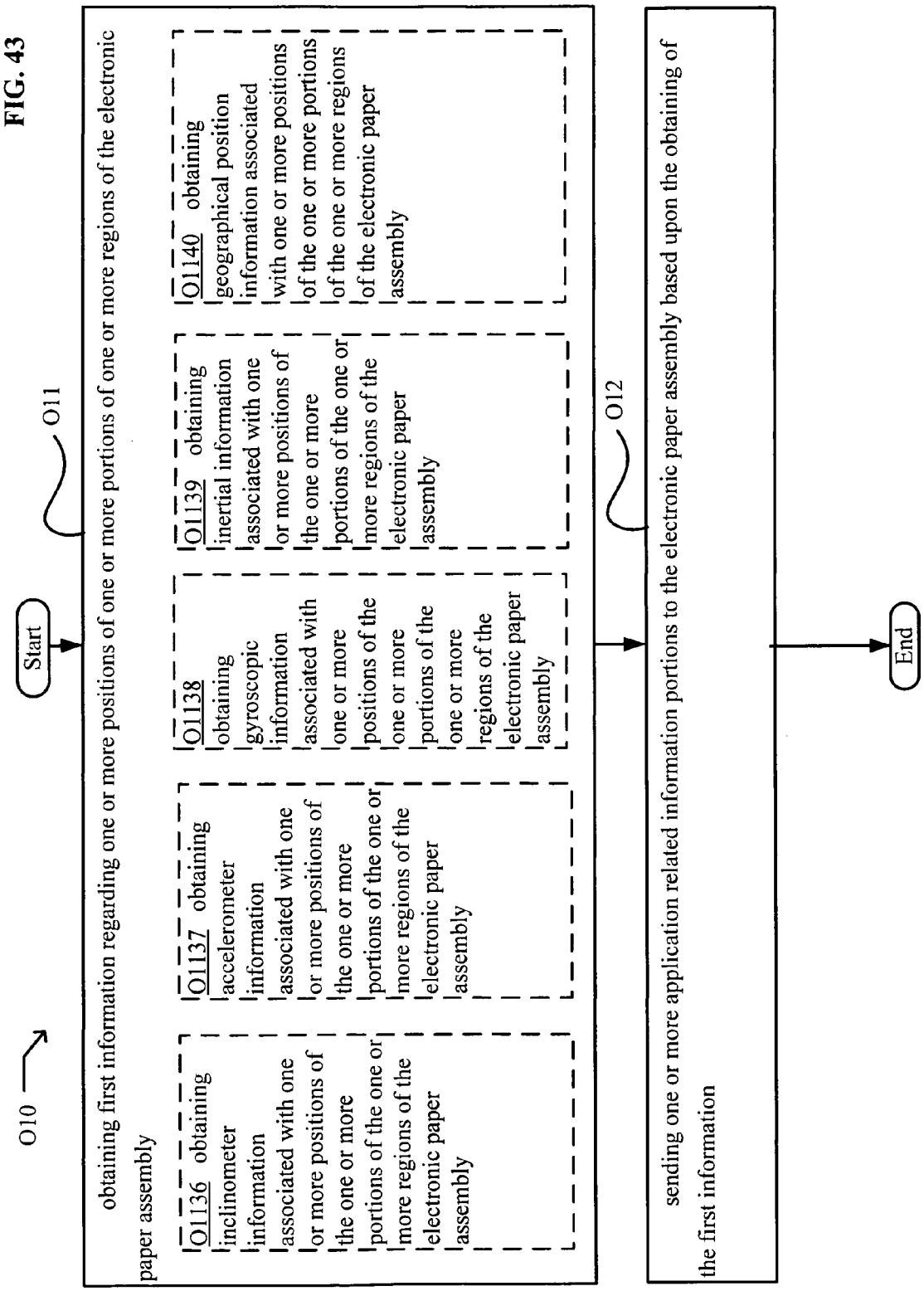
FIG. 43 is a high-level flowchart including exemplary implementations of operation O11 of FIG. 34.

FIG. 43 illustrates various implementations of the exemplary operation O11 of FIG. 34. In particular, FIG. 43 illustrates example implementations where the operation O11 includes one or more additional operations including, for example, operations O1136, O1137, O1138, O1139, and/or O1140.

For instance, in some implementations, the exemplary operation O11 may include the operation of O1136 for obtaining inclinometer information associated with one or more positions of the one or more portions of the one or more regions of the electronic paper assembly. An exemplary implementation may include one or more inclinometer obtaining modules 540 of FIG. 19B directing the acquisition through the extra-intra information flow 108 (see FIG. 1) of position information of the electronic paper assembly 102. For instance, one or more of the inclinometers 144*l* of the intra-e-paper sensor unit 144 can detect inclinometer related information regarding the electronic paper assembly 102 associated with one or more positions of the one or more portions of the one or more regions of the electronic paper assembly can be acquired by the sensors. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1137 for obtaining accelerometer information associated with one or more positions of the one or more portions of the one or more regions of the electronic paper assembly. An exemplary implementation may include one or more accelerometer obtaining modules 541 of FIG. 19B directing the acquisition through the extra-intra information flow 108 (see FIG. 1) of position information of the electronic paper assembly 102. For instance, one or more of the accelerometers 144J of the intra-e-paper sensor unit 144 can detect accelerometer related information regarding the electronic paper assembly 102 associated with one or more positions of the one or more portions of the one or more regions of the electronic paper assembly can be acquired by the sensors. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1138 for obtaining gyroscopic information associated with one or more positions of the one or more portions of the one or more regions of the electronic paper assembly. An exemplary implementation may include one or more gyroscopic obtaining modules 542 of FIG. 19B directing the acquisition through the extra-intra information flow 108 (see FIG. 1) of position information of the electronic paper assembly 102. For instance, one or more of the gyroscopic sensors 144F of the intra-e-paper sensor unit 144 can detect gyroscopic information regarding the electronic paper assembly 102 associated with one or more positions of the one or more portions of the one or more regions of the electronic paper assembly can be acquired by the sensors. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1139 for obtaining inertial information associated with one or more positions of the one or more portions of the one or more regions of the electronic paper assembly. An exemplary implementation may include one or more inertial obtaining modules 543 of FIG. 19B directing the acquisition through the extra-intra information flow 108 (see FIG. 1) of position information of the electronic paper assembly 102. For instance, one or more of the inertial sensors 144K of the intra-e-paper sensor unit 144 can detect inertial information regarding the electronic paper assembly 102 associated with one or more positions of the one or more portions of the one or more regions of the electronic paper assembly can be acquired by the sensors. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1140 for obtaining geographical position information associated with one or more positions of the one or more portions of the one or more regions of the electronic paper assembly. An exemplary implementation may include one or more geographical obtaining modules 544 of FIG. 19B directing the acquisition of information associated with one or more positions of one or more portions of one or more regions of the electronic paper assembly 102. For instance, one or more of the extra-e-paper sensors 440 of the extra-e-paper sensor unit 404 with known geographical locations can detect the presence, through various technologies including those described above for the sensor unit, of the electronic paper assembly 102 with associated with of one or more positions of one or more regions such as for example involving the partially folded conformation of the region 604*a* and the region 604*b* of the exemplary implementation 602 of the e-paper 102 having the angle of bend 624 and the partially folded conformation having the angle of bend 624*a* shown in FIG. 23. Based upon which of the one or more extra-e-paper sensor unit 404 have detected the presence of the e-paper 102, the extra-e-paper sensor control 438 can then determine geographical position information about the e-paper 102.

FIG. 44

Figure 44:
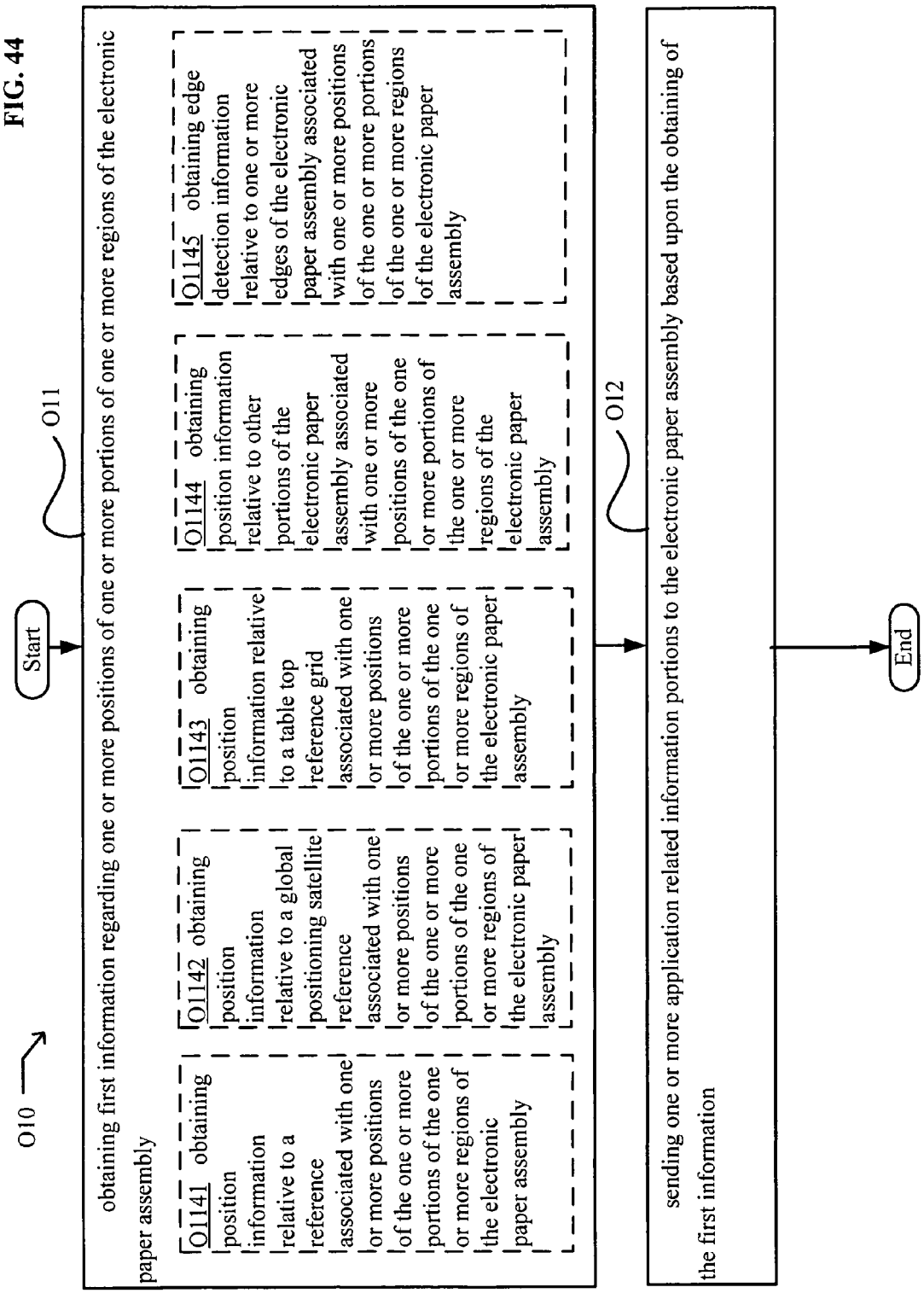
FIG. 44 is a high-level flowchart including exemplary implementations of operation O11 of FIG. 34.

FIG. 44 illustrates various implementations of the exemplary operation O11 of FIG. 34. In particular, FIG. 44 illustrates example implementations where the operation O11 includes one or more additional operations including, for example, operations O1141, O1142, O1143, O1144, and/or O1145.

For instance, in some implementations, the exemplary operation O11 may include the operation of O1141 for obtaining position information relative to a reference associated with one or more positions of the one or more portions of the one or more regions of the electronic paper assembly. An exemplary implementation may include one or more reference obtaining modules 545 of FIG. 19B directing the acquisition of reference information associated with one or more positions of one or more portions of one or more regions of the electronic paper assembly 102. One or more of the extra-e-paper sensors 440 acting as a portion of a reference system discussed above can broadcast a reference signal, beacon, etc, which can then be received by the intra-e-paper sensor unit 114. In turn, the intra-e-paper sensor control 142 can determine, based upon the broadcast, position information relative to the reference associated with one or more positions of the one or more portions of the one or more regions of the electronic paper assembly 102. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1142 for obtaining position information relative to a global positioning satellite reference associated with one or more positions of the one or more portions of the one or more regions of the electronic paper assembly. An exemplary implementation may include one or more GPS obtaining modules 546 of FIG. 19B directing the acquisition of reference information associated with one or more positions of one or more portions of one or more regions of the electronic paper assembly 102. A global reference system, such as the global positioning system (GPS) using satellites in earth orbit can broadcast reference signals, which can then be received by the GPS sensor 144G of the intra-e-paper sensor unit 114. In turn, the intra-e-paper sensor control 142 can determine, based upon the broadcast GPS reference signal position information relative to a global positioning satellite reference associated with one or more positions of the one or more portions of the one or more regions of the electronic paper assembly 102. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1143 for obtaining position information relative to a table top reference grid associated with one or more positions of the one or more portions of the one or more regions of the electronic paper assembly. An exemplary implementation may include one or more table obtaining modules 547 of FIG. 19B directing the acquisition of information associated with one or more positions of one or more portions of one or more regions of the electronic paper assembly 102. For instance, one or more of the extra-e-paper sensors 440 of the extra-e-paper sensor unit 404 being imbedded into a table top upon, which the e-paper 102 can be placed can detect, through various technologies such as a reference grid comprising optical sensors, contact sensors, pressure sensors, electro-static sensors, electromagnetic sensors, etc., the position relative to the table top of the electronic paper assembly 102 with associated with of one or more positions of one or more regions such as for example involving the partially folded conformation of the region 604*a* and the region 604*b* of the exemplary implementation 602 of the e-paper 102 having the angle of bend 624 and the partially folded conformation having the angle of bend 624*a* shown in FIG. 23.

For instance, in some implementations, the exemplary operation O11 may include the operation of O1144 for obtaining position information relative to other portions of the electronic paper assembly associated with one or more positions of the one or more portions of the one or more regions of the electronic paper assembly. An exemplary implementation may include one or more position obtaining modules 536 of FIG. 19B directing the acquisition of information associated with one or more positions of one or more portions of one or more regions of the electronic paper assembly 102. For instance, intra-e-paper user interface 126 of the e-paper 102 can receive input from a user regarding position of the e-paper. Based upon the input, the user-interface control 214 can determine position information regarding the e-paper 102 associated with of one or more positions of one or more regions of the electronic paper assembly 102 such as for example involving the partially folded conformation of the region 604*a* and the region 604*b* of the exemplary implementation 602 of the e-paper 102 having the angle of bend 624 and the partially folded conformation having the angle of bend 624*a* shown in FIG. 23. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1145 for obtaining edge detection information relative to one or more edges of the electronic paper assembly associated with one or more positions of the one or more portions of the one or more regions of the electronic paper assembly. An exemplary implementation may include one or more edge detection modules 549 of FIG. 19B directing the acquisition of edge detection information relative to one or more edges of the electronic paper assembly associated with one or more positions of the one or more portions of the one or more regions of the electronic paper assembly 102. For instance, extra-e-paper sensor 440 of the extra-e-paper sensor unit 404 can acquire edge detection information, through various technologies including those described above for the sensor unit, associated with of one or more positions of one or more regions of the electronic paper assembly 102 such as for example involving the partially folded conformation of the region 604*a* and the region 604*b* of the exemplary implementation 602 of the e-paper 102 having the angle of bend 624 and the partially folded conformation having the angle of bend 624*a* shown in FIG. 23.

FIG. 45

Figure 45:
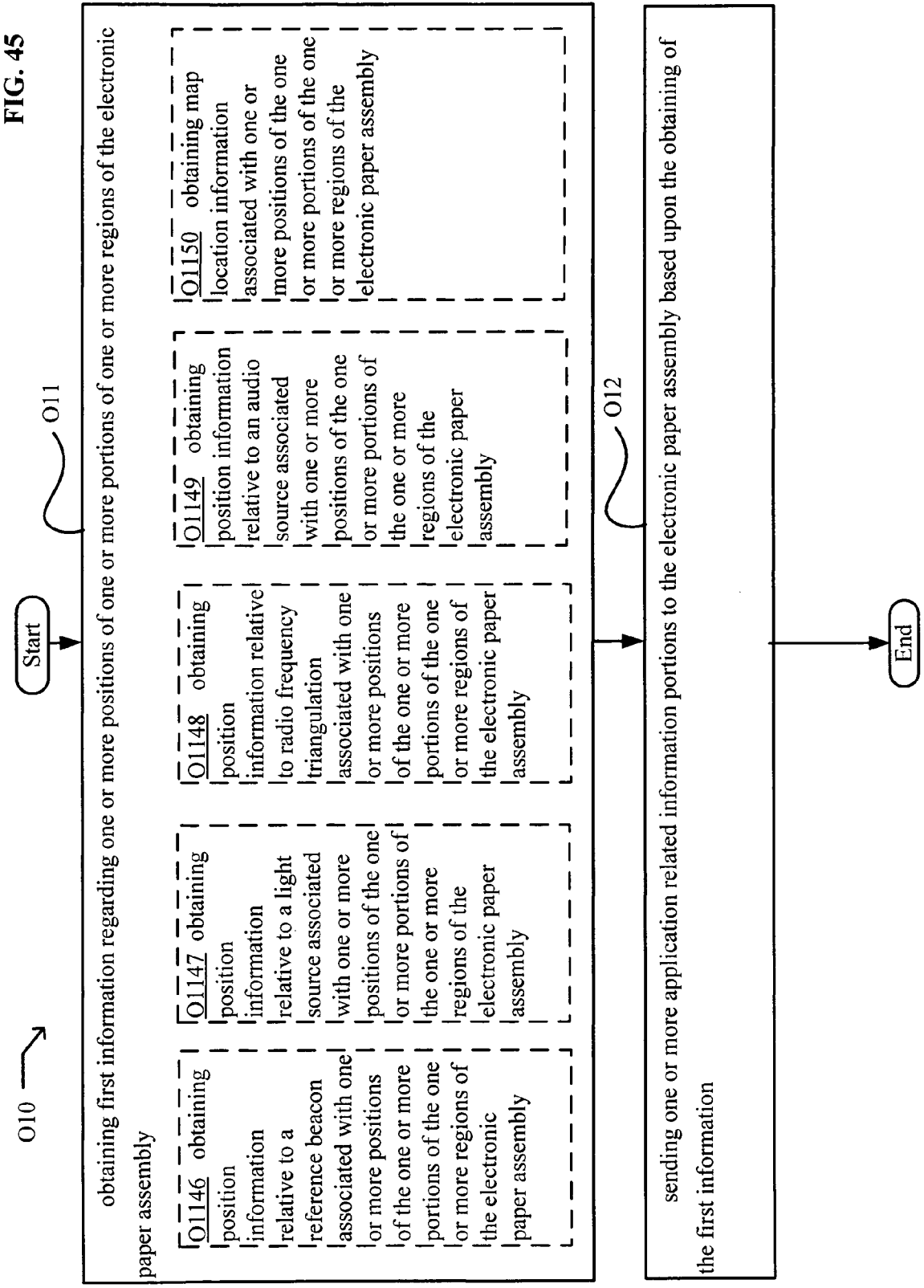
FIG. 45 is a high-level flowchart including an exemplary implementation of operation O11 of FIG. 34.

FIG. 45 illustrates various implementations of the exemplary operation O11 of FIG. 34. In particular, FIG. 45 illustrates example implementations where the operation O11 includes one or more additional operations including, for example, operations O1146, O1147, O1148, O1149, and/or O1150.

For instance, in some implementations, the exemplary operation O11 may include the operation of O1146 for obtaining position information relative to a reference beacon associated with one or more positions of the one or more portions of the one or more regions of the electronic paper assembly. An exemplary implementation may include one or more beacon obtaining modules 550 of FIG. 19B directing the acquisition of information relative to a reference beacon associated with one or more positions of the one or more portions of the one or more regions of the electronic paper assembly 102. One or more of the extra-e-paper sensors 440 acting as a portion of a reference system discussed above can broadcast a reference beacon, which can then be received by the intra-e-paper sensor unit 114. In turn, the intra-e-paper sensor control 142 can determine, based upon the reference beacon, position information relative to the reference beacon associated with one or more positions of the one or more portions of the one or more regions of the electronic paper assembly 102. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1147 for obtaining position information relative to a light source associated with one or more positions of the one or more portions of the one or more regions of the electronic paper assembly. An exemplary implementation may include one or more light obtaining modules 551 of FIG. 19B directing the acquisition of information relative to a reference light associated with one or more positions of the one or more portions of the one or more regions of the electronic paper assembly 102. One or more of the extra-e-paper sensors 440 acting as a portion of a reference system discussed above can broadcast a reference light, which can then be received by the intra-e-paper sensor unit 114. In turn, the intra-e-paper sensor control 142 can determine, based upon the reference light, position information relative to the reference light associated with one or more positions of the one or more portions of the one or more regions of the electronic paper assembly 102. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1148 for obtaining position information relative to radio frequency triangulation associated with one or more positions of the one or more portions of the one or more regions of the electronic paper assembly. An exemplary implementation may include one or more triangulation obtaining modules 552 of FIG. 19B directing the acquisition of information relative to a reference light associated with one or more positions of the one or more portions of the one or more regions of the electronic paper assembly 102. One or more of the extra-e-paper sensors 440 acting as a portion of a reference system discussed above can broadcast radio frequency triangulation reference signals, which can then be received by the intra-e-paper sensor unit 114. In turn, the intra-e-paper sensor control 142 can determine, based upon the radio frequency triangulation reference signals, position information relative to the radio frequency triangulation reference signals associated with one or more positions of the one or more portions of the one or more regions of the electronic paper assembly 102. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1149 for obtaining position information relative to an audio source associated with one or more positions of the one or more portions of the one or more regions of the electronic paper assembly. An exemplary implementation may include one or more audio obtaining modules 553 of FIG. 19B directing the acquisition of information relative to an audio source associated with one or more positions of the one or more portions of the one or more regions of the electronic paper assembly 102. One or more of the extra-e-paper sensors 440 acting as a portion of a reference system discussed above can broadcast audio signals, which can then be received by the intra-e-paper sensor unit 114. In turn, the intra-e-paper sensor control 142 can determine, based upon the audio signals, position information relative to the audio signals associated with one or more positions of the one or more portions of the one or more regions of the electronic paper assembly 102. The position related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1150 for obtaining map location information associated with one or more positions of the one or more portions of the one or more regions of the electronic paper assembly. An exemplary implementation may include one or more map location obtaining modules 554 of FIG. 19B directing the acquisition of information associated with one or more positions of one or more portions of one or more regions of the electronic paper assembly 102. For instance, intra-e-paper user interface 126 of the e-paper 102 can receive input from a user regarding map location of the e-paper. Based upon the input, the user-interface control 214 can determine map location information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The map location related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 46

Figure 46:
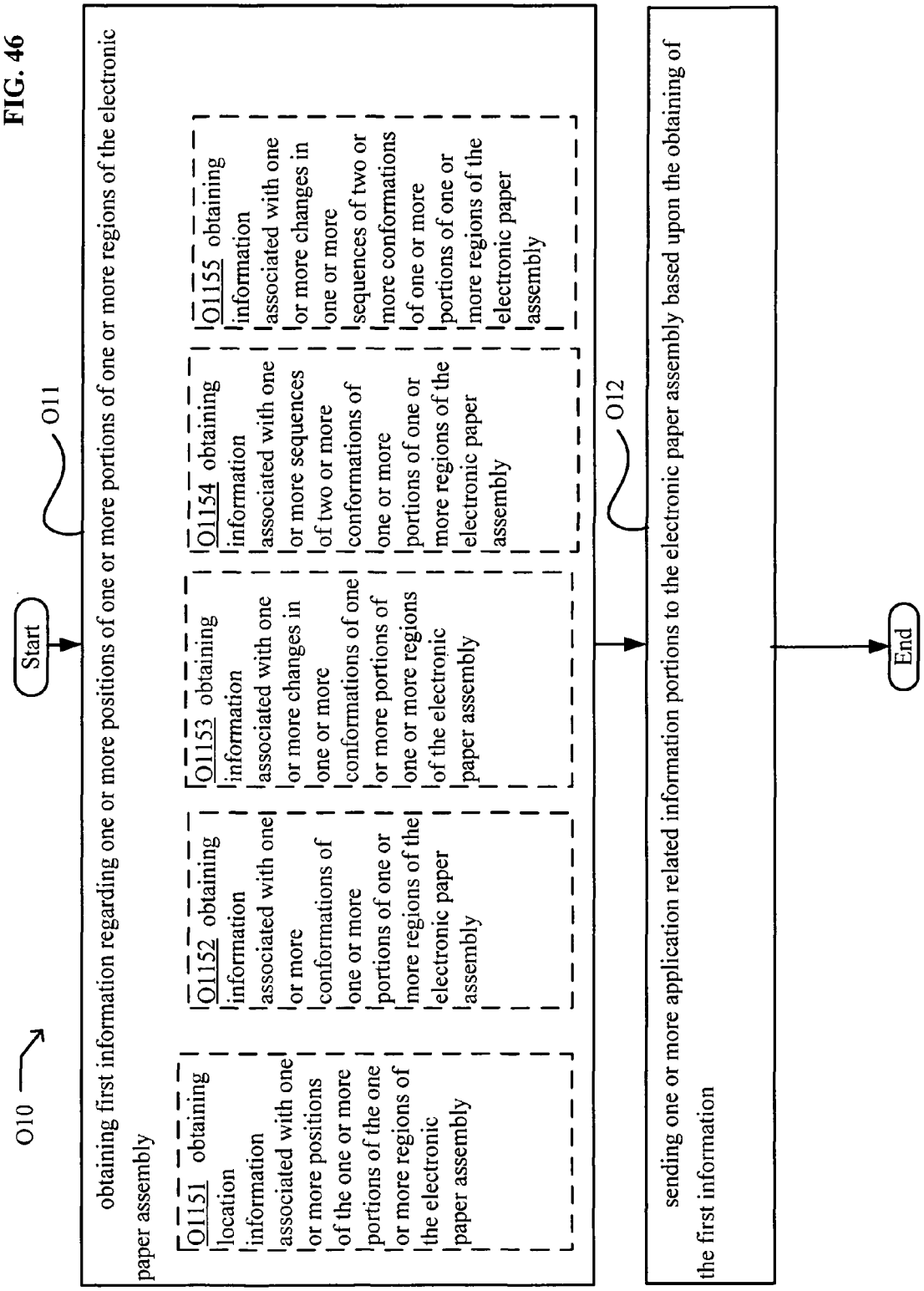
FIG. 46 is a high-level flowchart including exemplary implementations of operation O11 of FIG. 34.

FIG. 46 illustrates various implementations of the exemplary operation O11 of FIG. 34. In particular, FIG. 46 illustrates example implementations where the operation O11 includes one or more additional operations including, for example, operations O1151, O1152, O1153, O1154, and/or O1155.

For instance, in some implementations, the exemplary operation O11 may include the operation of O1151 for obtaining location information associated with one or more positions of the one or more portions of the one or more regions of the electronic paper assembly. An exemplary implementation may include one or more location obtaining modules 555 of FIG. 19B directing the acquisition of information associated with one or more positions of one or more portions of one or more regions of the electronic paper assembly 102. For instance, extra-e-paper sensor 440 of the extra-e-paper sensor unit 404 can detect information, through various technologies including those described above for the sensor unit, associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23.

For instance, in some implementations, the exemplary operation O11 may include the operation of O1152 for obtaining information associated with one or more conformations of one or more portions of one or more regions of the electronic paper assembly. An exemplary implementation may include one or more of the conformation obtaining modules 579 of FIG. 19C directing acquisition of conformation related information such as obtaining information associated with one or more conformations of one or more portions of one or more regions of the electronic paper assembly 102 through the extra-e-paper communication unit 410 of FIG. 18 via the intra-extra information flow 106 of FIG. 1 regarding the regions 604 of the exemplary implementation 602 of the e-paper 102 of FIG. 20. Conformation detecting may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching conformation detail contained in the recognition memory 164 with the sensing data) one or more conformations (e.g. the partially folded conformation of the exemplary implementation 602 of the e-paper 102 shown in FIG. 23) of one or more portions of one or more regions (e.g. the region 604a and the region 604b) of the electronic paper assembly (e.g. the exemplary implementation 602 of the e-paper 102 of FIG. 23). Conformation information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1153 for obtaining information associated with one or more changes in one or more conformations of one or more portions of one or more regions of the electronic paper assembly. An exemplary implementation may include one or more of the change obtaining modules 580 of FIG. 19C directing acquisition of conformation change related information such as obtaining information associated with one or more changes in one or more conformations of one or more portions of one or more regions of the electronic paper assembly 102 through the extra-e-paper communication unit 410 of FIG. 18 via the intra-extra information flow 106 of FIG. 1 regarding the regions 604 of the exemplary implementation 602 of the e-paper 102 of FIG. 20. Change in conformation detection may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching conformation detail contained in the recognition memory 164 with the sensing data) one or more changes in one or more conformations (e.g. change between the partially folded conformation of the exemplary implementation 602 of the e-paper 102 having the angle of bend 624 and the partially folded conformation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). Conformation change information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1154 for obtaining information associated with one or more sequences of two or more conformations of one or more portions of one or more regions of the electronic paper assembly. An exemplary implementation may include one or more of the sequence obtaining modules 581 of FIG. 19C directing acquisition of sequence related information such as obtaining information associated with one or more sequences of two or more conformations of one or more portions of one or more regions of the electronic paper assembly such as through detecting by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching conformation detail contained in the recognition memory 164 with the sensing data such as found with a sequence of two conformations involving the partially folded conformation of the exemplary implementation 602 of the e-paper 102 having the angle of bend 624 and the partially folded conformation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). Conformation sequence information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1155 for obtaining information associated with one or more changes in one or more sequences of two or more conformations of one or more portions of one or more regions of the electronic paper assembly. An exemplary implementation may include one or more of the change obtaining modules 582 of FIG. 19C directing acquisition of sequence change information such as obtaining information associated with one or more changes in one or more sequences of two or more conformations of one or more portions of one or more regions of the electronic paper assembly such as through detecting by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching conformation detail contained in the recognition memory 164 with the sensing data such as found with a change in a sequence of two conformations such as a change in a sequence such as involving the partially folded conformation of the exemplary implementation 602 of the e-paper 102 having the angle of bend 624 and the partially folded conformation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). Conformation sequence information can be sent from the communication unit 120 of FIG. 7 of the e-paper 102 of FIG. 1 to the communication unit 410 of FIG. 18 of the extra-e-paper unit 104 through the intra-extra information flow 106.

FIG. 47

Figure 47:
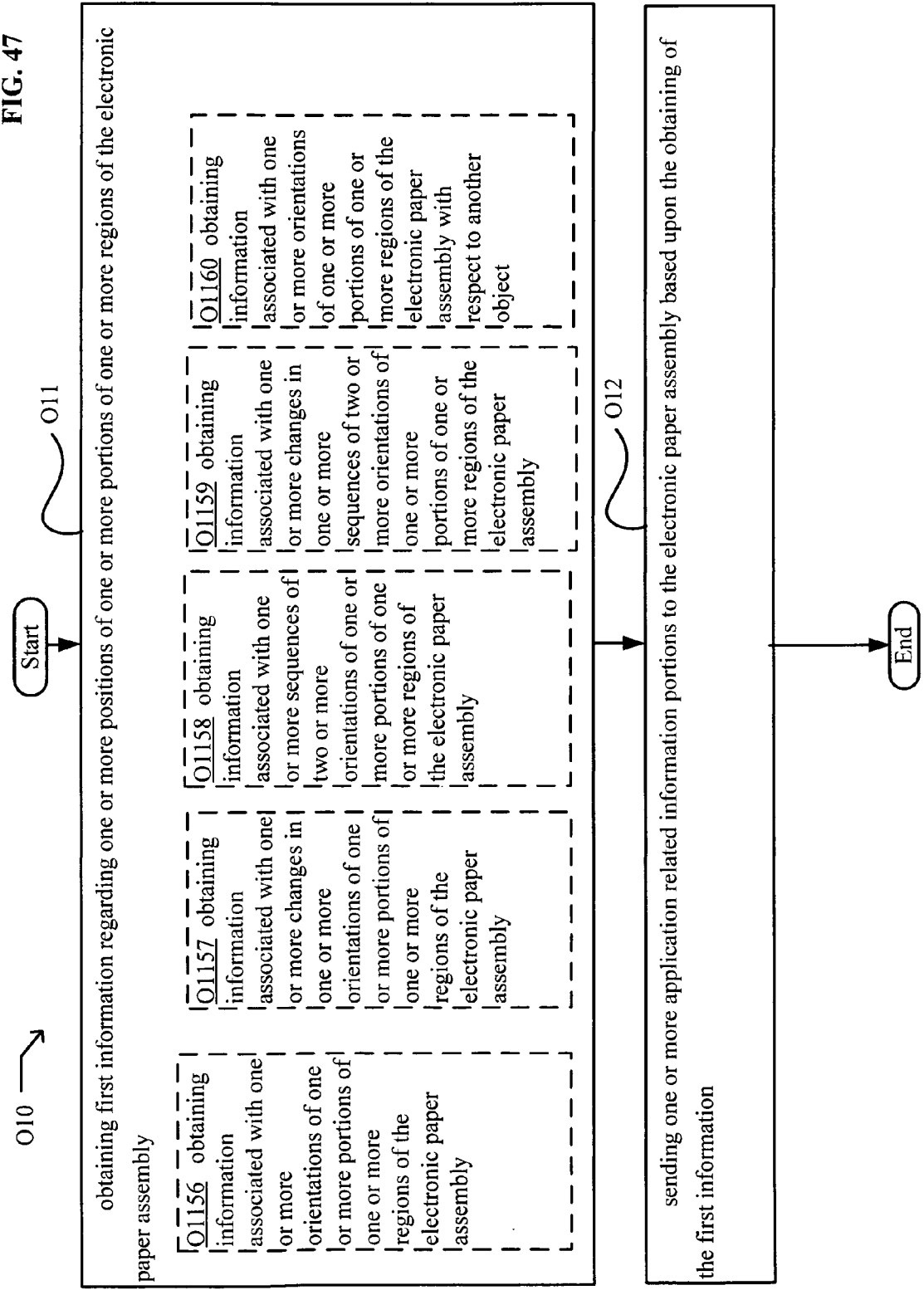
FIG. 47 is a high-level flowchart including an exemplary implementation of operation O11 of FIG. 34.

FIG. 47 illustrates various implementations of the exemplary operation O11 of FIG. 34. In particular, FIG. 47 illustrates example implementations where the operation O11 includes one or more additional operations including, for example, operations O1156, O1157, O1158, O1159, and/or O1160.

For instance, in some implementations, the exemplary operation O11 may include the operation of O1156 for obtaining information associated with one or more orientations of one or more portions of one or more regions of the electronic paper assembly. An exemplary implementation may include one or more of the orientation obtaining modules 583 of FIG. 19C directing acquisition of orientation related information such as obtaining information associated with one or more orientations of one or more portions of one or more regions of the electronic paper assembly 102 through the extra-e-paper communication unit 410 of FIG. 18 via the intra-extra information flow 106 of FIG. 1 regarding the regions 604 of the exemplary implementation 602 of the e-paper 102 of FIG. 20. Orientation detecting may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data) one or more orientations (e.g. the partially folded orientation of the exemplary implementation 602 of the e-paper 102 shown in FIG. 23) of one or more portions of one or more regions (e.g. the region 604a and the region 604b) of the electronic paper assembly (e.g. the exemplary implementation 602 of the e-paper 102 of FIG. 23). Orientation information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1157 for obtaining information associated with one or more changes in one or more orientations of one or more portions of one or more regions of the electronic paper assembly. An exemplary implementation may include one or more of the change obtaining modules 584 of FIG. 19C directing acquisition of orientation change related information such as obtaining information associated with one or more changes in one or more orientations of one or more portions of one or more regions of the electronic paper assembly 102 through the extra-e-paper communication unit 410 of FIG. 18 via the intra-extra information flow 106 of FIG. 1 regarding the regions 604 of the exemplary implementation 602 of the e-paper 102 of FIG. 20. Change in orientation detection may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data) one or more changes in one or more orientations (e.g. change between the partially folded orientation of the exemplary implementation 602 of the e-paper 102 having the angle of bend 624 and the partially folded orientation having the angle of bend 624*a* shown in FIG. 23) of one or more portions of one or more regions (e.g. the region 604*a* and the region 604*b*) of the electronic paper assembly (e.g. the exemplary implementation 602 of the e-paper 102 of FIG. 23). Orientation change information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1158 for obtaining information associated with one or more sequences of two or more orientations of one or more portions of one or more regions of the electronic paper assembly. An exemplary implementation may include one or more of the sequence obtaining modules 585 of FIG. 19C directing acquisition of sequence related information such as obtaining information associated with one or more sequences of two or more orientations of one or more portions of one or more regions of the electronic paper assembly such as through detecting by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data such as found with a sequence of two orientations involving the partially folded orientation of the exemplary implementation 602 of the e-paper 102 having the angle of bend 624 and the partially folded orientation having the angle of bend 624*a* shown in FIG. 23) of one or more portions of one or more regions (e.g. the region 604*a* and the region 604*b*) of the electronic paper assembly (e.g. the exemplary implementation 602 of the e-paper 102 of FIG. 23). Orientation sequence information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1159 for obtaining information associated with one or more changes in one or more sequences of two or more orientations of one or more portions of one or more regions of the electronic paper assembly. An exemplary implementation may include one or more of the change obtaining modules 586 of FIG. 19C directing acquisition of sequence change information such as obtaining information associated with one or more changes in one or more sequences of two or more orientations of one or more portions of one or more regions of the electronic paper assembly such as through detecting by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data such as found with a change in a sequence of two orientations such as a change in a sequence such as involving the partially folded orientation of the exemplary implementation 602 of the e-paper 102 having the angle of bend 624 and the partially folded orientation having the angle of bend 624*a* shown in FIG. 23) of one or more portions of one or more regions (e.g. the region 604*a* and the region 604*b*) of the electronic paper assembly (e.g. the exemplary implementation 602 of the e-paper 102 of FIG. 23). Orientation sequence information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1160 for obtaining information associated with one or more orientations of one or more portions of one or more regions of the electronic paper assembly with respect to another object. An exemplary implementation may include one or more of the orientation obtaining modules 587 of FIG. 19C directing acquisition of orientation related information such as obtaining information associated with one or more orientations of one or more portions of one or more regions of the electronic paper assembly 102 through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28. Orientation detecting may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data) one or more orientations (e.g. the partially folded orientation of the exemplary implementation 602 of the e-paper 102 shown in FIG. 23) of one or more portions of one or more regions (e.g. the region 604*a* and the region 604*b*) of the electronic paper assembly (e.g. the exemplary implementation 602 of the e-paper 102 of FIG. 23). Orientation information can be sent from the communication unit 120 of FIG. 7 of the e-paper 102 of FIG. 1 to the communication unit 410 of FIG. 18 of the extra-e-paper unit 104 through the intra-extra information flow 106.

FIG. 48

Figure 48:
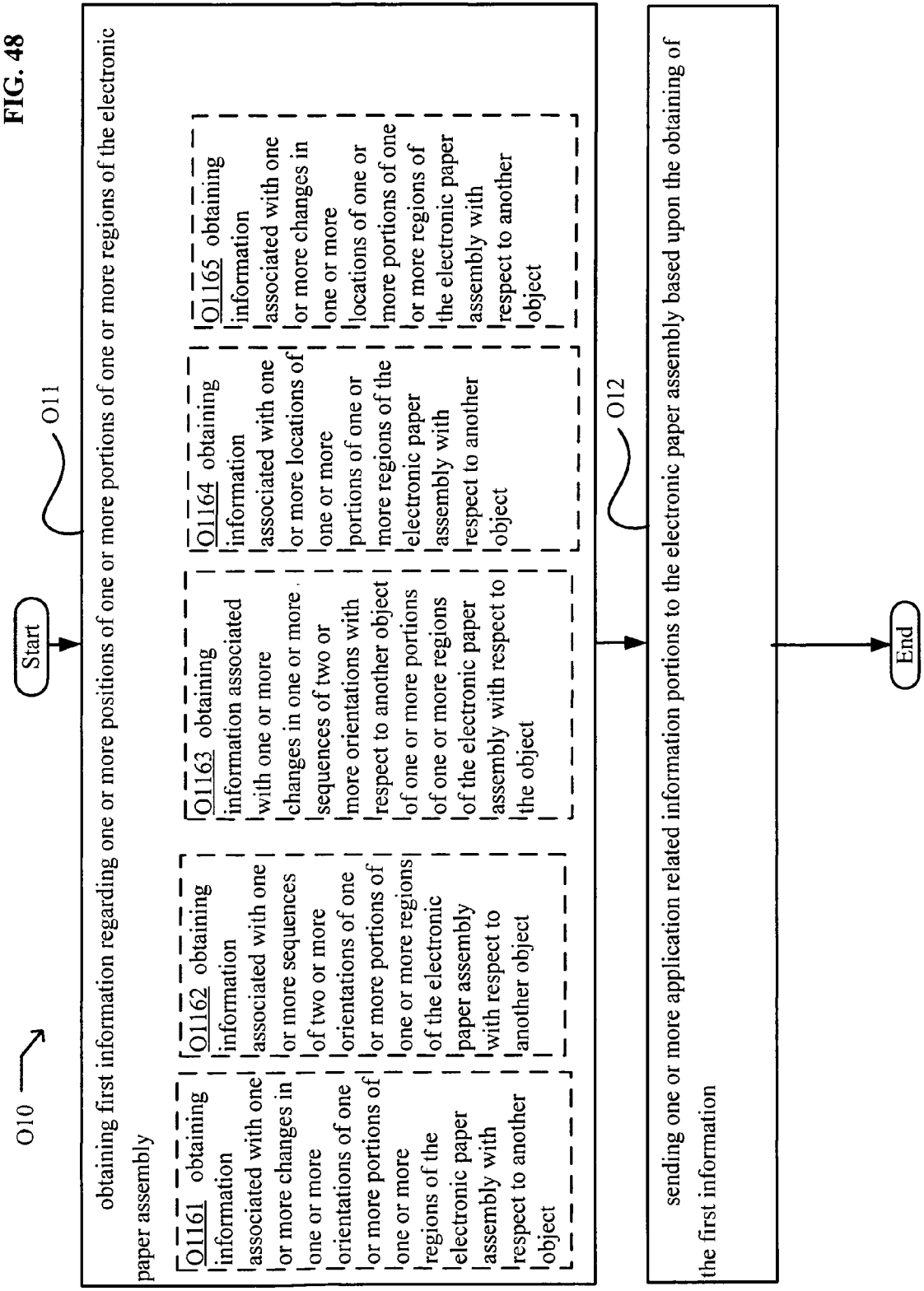
FIG. 48 is a high-level flowchart including an exemplary implementation of operation O11 of FIG. 34.

FIG. 48 illustrates various implementations of the exemplary operation O11 of FIG. 34. In particular, FIG. 48 illustrates example implementations where the operation O11 includes one or more additional operations including, for example, operations O1161, O1162, O1163, O1164, and/or O1165.

For instance, in some implementations, the exemplary operation O11 may include the operation of O1161 for obtaining information associated with one or more changes in one or more orientations of one or more portions of one or more regions of the electronic paper assembly with respect to another object. An exemplary implementation may include one or more of the change obtaining modules 588 of FIG. 19C directing acquisition of orientation change related information such as obtaining information associated with one or more changes in one or more orientations of one or more portions of one or more regions of the electronic paper assembly 102 through the extra-e-paper communication unit 410 of FIG. 18 via the intra-extra information flow 106 of FIG. 1 regarding the regions 604 of the exemplary implementation 602 of the e-paper 102 of FIG. 20 with respect to the exemplary object 634 of FIG. 28. Change in orientation detection may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data) one or more changes in one or more orientations (e.g. change between the partially folded orientation of the exemplary implementation 602 of the e-paper 102 having the angle of bend 624 and the partially folded orientation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). Orientation change information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1162 for obtaining information associated with one or more sequences of two or more orientations of one or more portions of one or more regions of the electronic paper assembly with respect to another object. An exemplary implementation may include one or more of the sequence obtaining modules 589 of FIG. 19C directing acquisition of sequence related information such as obtaining information associated with one or more sequences of two or more orientations of one or more portions of one or more regions of the electronic paper assembly such as through detecting by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data such as found with a sequence of two orientations involving the partially folded orientation of the exemplary implementation 602 of the e-paper 102 having the angle of bend 624 and the partially folded orientation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). The sequence can be recorded with respect to an object such as with respect to the exemplary object 634 of FIG. 28. Orientation sequence information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1163 for obtaining information associated with one or more changes in one or more sequences of two or more orientations with respect to another object of one or more portions of one or more regions of the electronic paper assembly with respect to the object. An exemplary implementation may include one or more of the change obtaining modules 590 of FIG. 19C directing acquisition of sequence change information such as obtaining information associated with one or more changes in one or more sequences of two or more orientations of one or more portions of one or more regions of the electronic paper assembly such as through detecting by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching orientation detail contained in the recognition memory 164 with the sensing data such as found with a change in a sequence of two orientations such as a change in a sequence such as involving the partially folded orientation of the exemplary implementation 602 of the e-paper 102 having the angle of bend 624 and the partially folded orientation having the angle of bend 624a shown in FIG. 23) of one or more portions of one or more regions (e.g. the region 604a and the region 604b) of the electronic paper assembly (e.g. the exemplary implementation 602 of the e-paper 102 of FIG. 23). The sequence can be recorded with respect to an object such as with respect to the exemplary object 634 of FIG. 28. Orientation sequence information can be sent from the communication unit 120 of FIG. 7 of the e-paper 102 of FIG. 1 to the communication unit 410 of FIG. 18 of the extra-e-paper unit 104 through the intra-extra information flow 106.

For instance, in some implementations, the exemplary operation O11 may include the operation of O1164 for obtaining information associated with one or more locations of one or more portions of one or more regions of the electronic paper assembly with respect to another object. An exemplary implementation may include one or more of the location obtaining modules 591 of FIG. 19C directing acquisition of location related information such as obtaining information associated with one or more locations of one or more portions of one or more regions of the electronic paper assembly with respect to another object. For instance, intra-e-paper user interface 126 of the e-paper 102 can receive input from a user regarding location of the e-paper with respect to an object such as with respect to the exemplary object 634 of FIG. 28. Based upon the input, the user-interface control 214 can determine location information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The location related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1165 for obtaining information associated with one or more changes in one or more locations of one or more portions of one or more regions of the electronic paper assembly with respect to another object. An exemplary implementation may include one or more of the change obtaining modules 592 of FIG. 19C directing acquisition of change in location related information such as obtaining information associated with one or more changes in one or more locations of one or more portions of one or more regions of the electronic paper assembly with respect to another object. For instance, intra-e-paper user interface 126 of the e-paper 102 can receive input from a user regarding change in location of the e-paper with respect to an object such as with respect to the exemplary object 634 of FIG. 28. Based upon the input, the user-interface control 214 can determine change in location information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The change in location related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 49

Figure 49:
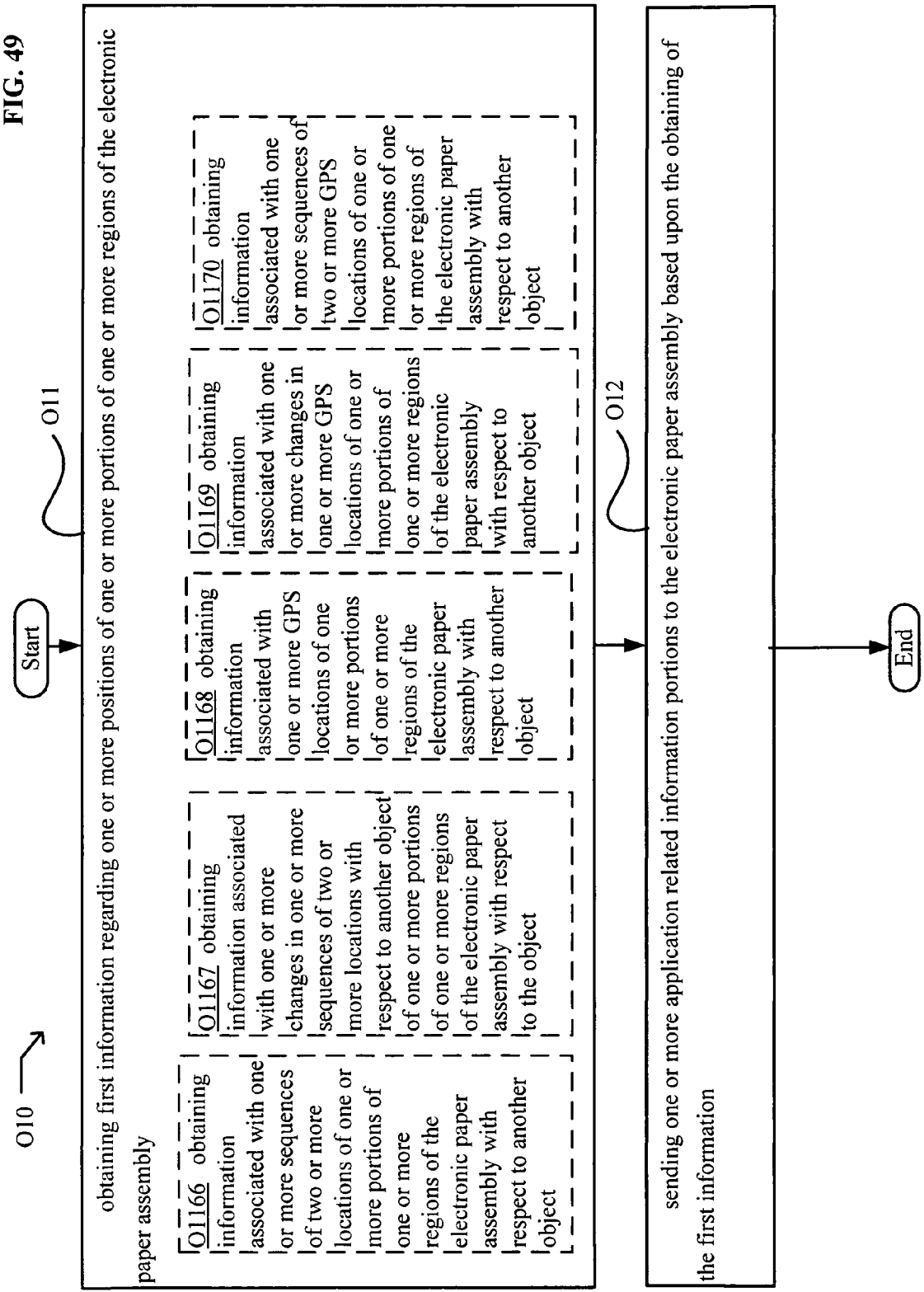
FIG. 49 is a high-level flowchart including an exemplary implementation of operation O11 of FIG. 34.

FIG. 49 illustrates various implementations of the exemplary operation O11 of FIG. 34. In particular, FIG. 49 illustrates example implementations where the operation O11 includes one or more additional operations including, for example, operations O1166, O1167, O1168, O1169, and/or O1170.

For instance, in some implementations, the exemplary operation O11 may include the operation of O1166 for obtaining information associated with one or more sequences of two or more locations of one or more portions of one or more regions of the electronic paper assembly with respect to another object. An exemplary implementation may include one or more of the sequence obtaining modules 593 of FIG. 19C directing acquisition of location sequence related information such as obtaining information associated with one or more sequences of two or more locations of one or more portions of one or more regions of the electronic paper assembly with respect to another object. For instance, intra-e-paper user interface 126 of the e-paper 102 can receive input from a user regarding location sequence of the e-paper with respect to an object such as with respect to the exemplary object 634 of FIG. 28. Based upon the input, the user-interface control 214 can determine location sequence information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The location sequence related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1167 for obtaining information associated with one or more changes in one or more sequences of two or more locations with respect to another object of one or more portions of one or more regions of the electronic paper assembly with respect to the object. An exemplary implementation may include one or more of the change obtaining modules 594 of FIG. 19C directing acquisition of sequence change related information such as obtaining information associated with one or more changes in one or more sequences of two or more locations with respect to another object of one or more portions of one or more regions of the electronic paper assembly with respect to the object. For instance, intra-e-paper user interface 126 of the e-paper 102 can receive input from a user regarding sequence change of the e-paper with respect to an object such as with respect to the exemplary object 634 of FIG. 28. Based upon the input, the user-interface control 214 can determine sequence change information regarding the e-paper 102 associated with of one or more positions of one or more regions of the electronic paper assembly 102 such as for example changing back and forth between the partially folded conformation of the region 604a and the region 604b of the exemplary implementation 602 of the e-paper 102 having the angle of bend 624 and the partially folded conformation having the angle of bend 624a shown in FIG. 23 changing The sequence change related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1168 for obtaining information associated with one or more GPS locations of one or more portions of one or more regions of the electronic paper assembly with respect to another object. An exemplary implementation may include one or more of the GPS location obtaining modules 595 of FIG. 19C directing acquisition of GPS location related information such as obtaining information associated with one or more GPS locations of one or more portions of one or more regions of the electronic paper assembly with respect to another object. For instance, intra-e-paper user interface 126 of the e-paper 102 can receive input from the GPS sensor 144G of FIG. 4 regarding GPS location of the e-paper with respect to an object such as with respect to the exemplary object 634 of FIG. 28. Based upon the input, the sensor control 142 of FIG. 4 can determine GPS location information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The GPS location related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1169 for obtaining information associated with one or more changes in one or more GPS locations of one or more portions of one or more regions of the electronic paper assembly with respect to another object. An exemplary implementation may include one or more of the change obtaining modules 596 of FIG. 19C directing acquisition of change in GPS location related information such as obtaining information associated with one or more changes in one or more GPS locations of one or more portions of one or more regions of the electronic paper assembly with respect to another object. For instance, intra-e-paper user interface 126 of the e-paper 102 can receive input from the GPS sensor 144G of FIG. 4 regarding change in GPS location of the e-paper with respect to an object such as with respect to the exemplary object 634 of FIG. 28. Based upon the input, the sensor control 142 of FIG. 4 can determine change in GPS location information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The change in GPS location related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

For instance, in some implementations, the exemplary operation O11 may include the operation of O1170 for obtaining information associated with one or more sequences of two or more GPS locations of one or more portions of one or more regions of the electronic paper assembly with respect to another object. An exemplary implementation may include one or more of the sequence obtaining modules 597 of FIG. 19C directing acquisition of GPS location sequence related information such as obtaining information associated with one or more sequences of two or more GPS locations of one or more portions of one or more regions of the electronic paper assembly with respect to another object. For instance, intra-e-paper user interface 126 of the e-paper 102 can receive input from a user regarding GPS location sequence of the e-paper with respect to an object such as with respect to the exemplary object 634 of FIG. 28. Based upon the input, the sensor control 142 of FIG. 4 can determine GPS location sequence information regarding the e-paper 102 associated with of one or more positions of one or more regions of the electronic paper assembly 102 such as for example involving the partially folded conformation of the region 604a and the region 604b of the exemplary implementation 602 of the e-paper 102 having the angle of bend 624 and the partially folded conformation having the angle of bend 624a shown in FIG. 23. The GPS location sequence related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 50

Figure 50:
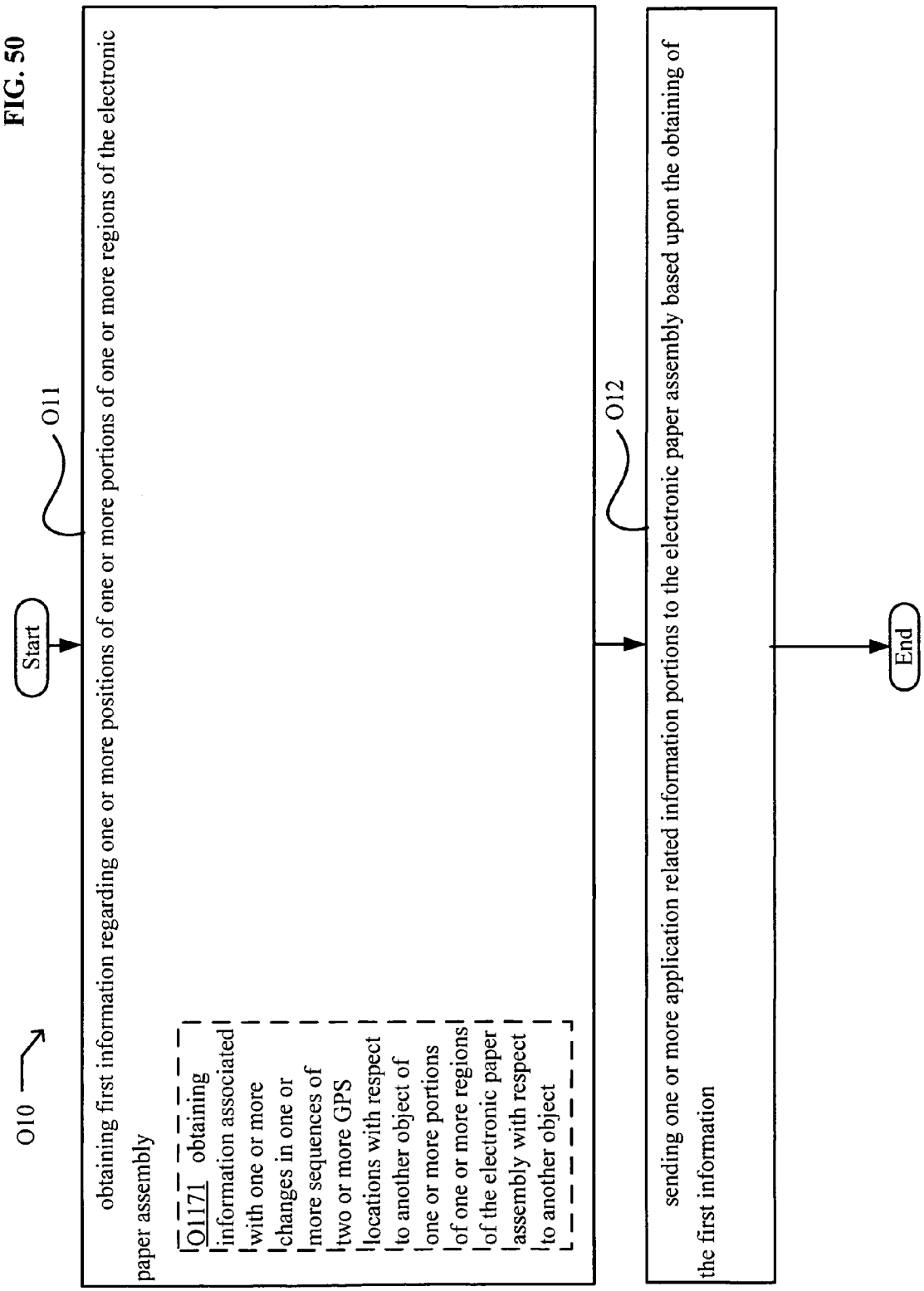
FIG. 50 is a high-level flowchart including an exemplary implementation of operation O11 of FIG. 34.

FIG. 50 illustrates various implementations of the exemplary operation O11 of FIG. 34. In particular, FIG. 50 illustrates example implementations where the operation O11 includes one or more additional operations including, for example, operations O1171.

For instance, in some implementations, the exemplary operation O11 may include the operation of O1171 for obtaining information associated with one or more changes in one or more sequences of two or more GPS locations with respect to another object of one or more portions of one or more regions of the electronic paper assembly with respect to another object. An exemplary implementation may include one or more of the change obtaining modules 598 of FIG. 19C directing acquisition of sequence change related information such as obtaining information associated with one or more changes in one or more sequences of two or more GPS locations with respect to another object of one or more portions of one or more regions of the electronic paper assembly with respect to the object. For instance, intra-e-paper user interface 126 of the e-paper 102 can receive input from a user regarding sequence change of the e-paper with respect to an object such as with respect to the exemplary object 634 of FIG. 28. Based upon the input, the sensor control 142 of FIG. 4 can determine sequence change information regarding the e-paper 102 associated with of one or more positions of one or more regions of the electronic paper assembly 102 such as for example changing back and forth between the partially folded conformation of the region 604a and the region 604b of the exemplary implementation 602 of the e-paper 102 having the angle of bend 624 and the partially folded conformation having the angle of bend 624a shown in FIG. 23 changing The sequence change related information can then be sent from the communication unit 120 of the e-paper 102 (see FIG. 7) to the communication unit 410 of the extra-e-paper assembly 104 (see FIG. 18) through the intra-extra information flow 106 (see FIG. 1).

FIG. 51

Figure 51:
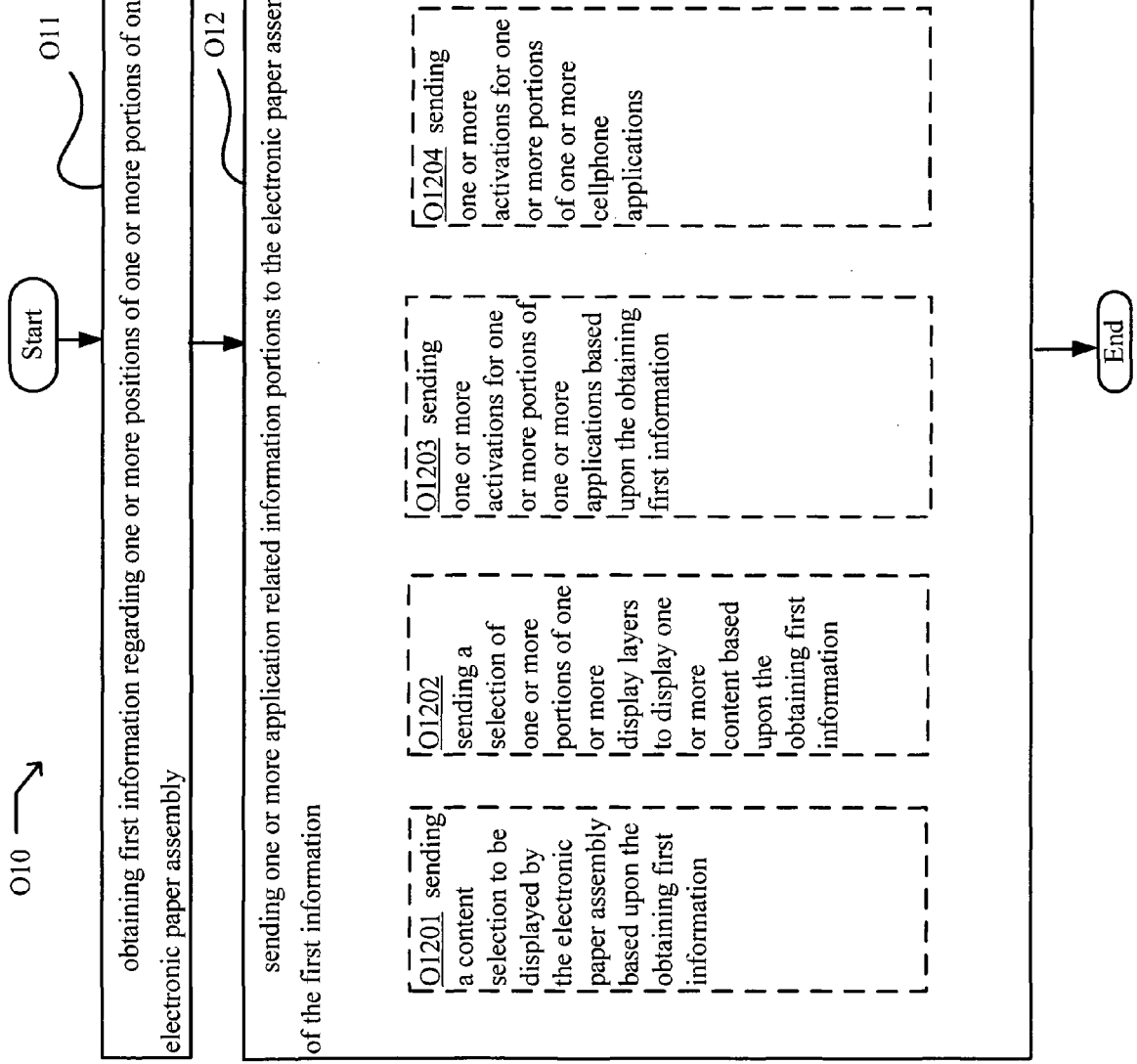
FIG. 51 is a high-level flowchart including an exemplary implementation of operation O11 of FIG. 34.

FIG. 51 illustrates various implementations of the exemplary operation O12 of FIG. 34. In particular, FIG. 51 illustrates example implementations where the operation O12 includes one or more additional operations including, for example, operations O1201, O1202, O1203, O1204, and/or O1205.

For instance, in some implementations, the exemplary operation O12 may include the operation of O1201 for sending a content selection to be displayed by the electronic paper assembly based upon the obtaining first information. An exemplary implementation may include one or more of the selection sending modules 701 of FIG. 19C directing transmission of selection related information such as sending a content selection to be displayed by the electronic paper assembly based upon the obtaining first information such as sending from the extra-e-paper communication unit 410 of FIG. 18 via the extra-intra information flow 108 of FIG. 1 a selection to the be displayed in one or more of the regions 604 of the exemplary implementation 602 of the e-paper 102 of FIG. 20 on the display layers 608 of FIG. 19.

For instance, in some implementations, the exemplary operation O12 may include the operation of O1202 for sending a selection of one or more portions of one or more display layers to display one or more content based upon the obtaining first information. An exemplary implementation may include one or more of the selection sending modules 702 of FIG. 19C directing transmission of selection related information such as sending a selection of one or more portions of one or more display layers to display one or more content based upon the obtaining first information such as sending from the extra-e-paper communication unit 410 of FIG. 18 via the extra-intra information flow 108 of FIG. 1 a selection to be displayed in one or more of the regions 604 of the exemplary implementation 602 of the e-paper 102 of FIG. 20 on the display layers 608 of FIG. 19.

For instance, in some implementations, the exemplary operation O12 may include the operation of O1203 for sending one or more activations for one or more portions of one or more applications based upon the obtaining first information. An exemplary implementation may include one or more of the activation sending modules 703 of FIG. 19C directing transmission of activation information such as sending one or more activations for one or more portions of one or more applications based upon the obtaining first information such as sending from the extra-e-paper application unit 408 of FIG. 17 via the extra-intra information flow 108 of FIG. 1 an activation of the cell phone application 176a found in the application memory 176 of FIG. 6 of the e-paper 102 of FIG. 20.

For instance, in some implementations, the exemplary operation O12 may include the operation of O1204 for sending one or more activations for one or more portions of one or more cell phone applications. An exemplary implementation may include one or more of the activation sending modules 704 of FIG. 19C directing transmission of activation information such as sending one or more activations for one or more portions of one or more cell phone applications such as sending from the extra-e-paper application unit 408 of FIG. 17 via the extra-intra information flow 108 of FIG. 1 an activation of the cell phone application 176a found in the application memory 176 of FIG. 6 of the e-paper 102 of FIG. 20.

For instance, in some implementations, the exemplary operation O12 may include the operation of O1205 for sending one or more activations for one or more portions of one or more television applications. An exemplary implementation may include one or more of the activation sending modules 705 of FIG. 19C directing transmission of activation related information such as sending one or more activations for one or more portions of one or more television applications such as sending from the extra-e-paper application unit 408 of FIG. 17 via the extra-intra information flow 108 of FIG. 1 an activation of the television application 176b found in the application memory 176 of FIG. 6 of the e-paper 102 of FIG. 20.

FIG. 52

Figure 52:
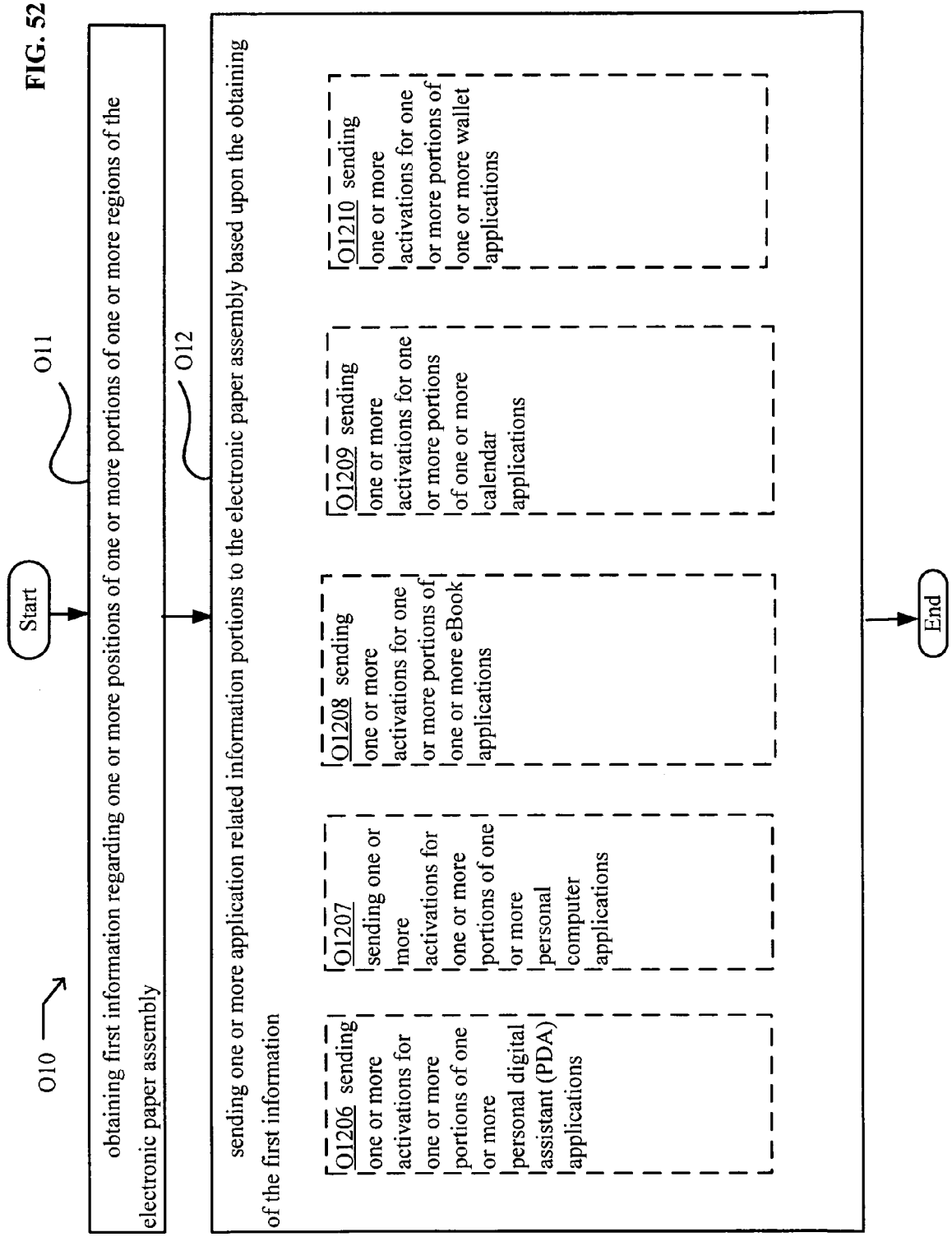
FIG. 52 is a high-level flowchart including an exemplary implementation of operation O11 of FIG. 34.

FIG. 52 illustrates various implementations of the exemplary operation O12 of FIG. 34. In particular, FIG. 52 illustrates example implementations where the operation O12 includes one or more additional operations including, for example, operations O1206, O1207, O1208, O1209, and/or O1210.

For instance, in some implementations, the exemplary operation O12 may include the operation of O1206 for sending one or more activations for one or more portions of one or more personal digital assistant (PDA) applications. An exemplary implementation may include one or more of the activation sending modules 706 of FIG. 19C directing transmission of activation related information such as sending one or more activations for one or more portions of one or more personal digital assistant (PDA) applications such as sending from the extra-e-paper application unit 408 of FIG. 17 via the extra-intra information flow 108 of FIG. 1 an activation of the PDA application 176c found in the application memory 176 of FIG. 6 of the e-paper 102 of FIG. 20.

For instance, in some implementations, the exemplary operation O12 may include the operation of O1207 for sending one or more activations for one or more portions of one or more personal computer applications. An exemplary implementation may include one or more of the activation sending modules 707 of FIG. 19C directing transmission of activation related information such as sending one or more activations for one or more portions of one or more personal computer applications such as sending from the extra-e-paper application unit 408 of FIG. 17 via the extra-intra information flow 108 of FIG. 1 an activation of the personal computer application 176d found in the application memory 176 of FIG. 6 of the e-paper 102 of FIG. 20.

For instance, in some implementations, the exemplary operation O12 may include the operation of O1208 for sending one or more activations for one or more portions of one or more eBook applications. An exemplary implementation may include one or more of the activation sending modules 708 of FIG. 19C directing transmission of activation related information such as sending one or more activations for one or more portions of one or more eBook applications such as sending from the extra-e-paper application unit 408 of FIG. 17 via the extra-intra information flow 108 of FIG. 1 an activation of the eBook application 176e found in the application memory 176 of FIG. 6 of the e-paper 102 of FIG. 20.

For instance, in some implementations, the exemplary operation O12 may include the operation of O1209 for sending one or more activations for one or more portions of one or more calendar applications. An exemplary implementation may include one or more of the activation sending modules 709 of FIG. 19C directing transmission of activation related information such as sending one or more activations for one or more portions of one or more calendar applications such as sending from the extra-e-paper application unit 408 of FIG. 17 via the extra-intra information flow 108 of FIG. 1 an activation of the calendar application 176f found in the application memory 176 of FIG. 6 of the e-paper 102 of FIG. 20.

For instance, in some implementations, the exemplary operation O12 may include the operation of O1210 for sending one or more activations for one or more portions of one or more wallet applications. An exemplary implementation may include one or more of the activation sending modules 710 of FIG. 19C directing transmission of activation related information such as sending one or more activations for one or more portions of one or more wallet applications such as sending from the extra-e-paper application unit 408 of FIG. 17 via the extra-intra information flow 108 of FIG. 1 an activation of the wallet application 176g found in the application memory 176 of FIG. 6 of the e-paper 102 of FIG. 20.

FIG. 53

Figure 53:
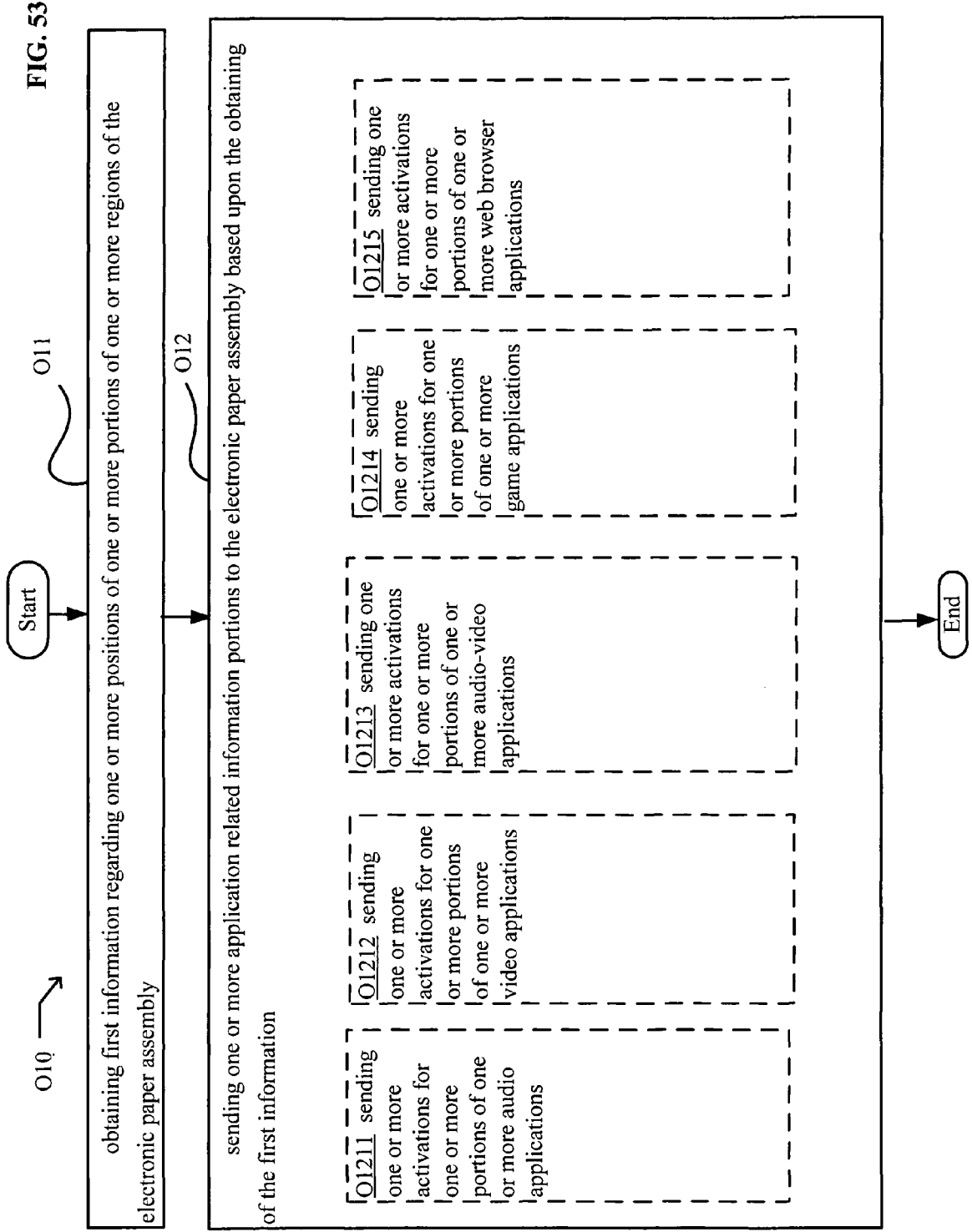
FIG. 53 is a high-level flowchart including an exemplary implementation of operation O11 of FIG. 34.

FIG. 53 illustrates various implementations of the exemplary operation O12 of FIG. 34. In particular, FIG. 53 illustrates example implementations where the operation O12 includes one or more additional operations including, for example, operations O1211, O1212, O1213, O1214, and/or O1215.

For instance, in some implementations, the exemplary operation O12 may include the operation of O1211 for sending one or more activations for one or more portions of one or more audio applications. An exemplary implementation may include one or more of the activation sending modules 711 of FIG. 19C directing transmission of activation related information such as sending one or more activations for one or more portions of one or more audio applications such as sending from the extra-e-paper application unit 408 of FIG. 17 via the extra-intra information flow 108 of FIG. 1 an activation of the audio application 176h found in the application memory 176 of FIG. 6 of the e-paper 102 of FIG. 20.

For instance, in some implementations, the exemplary operation O12 may include the operation of O1212 for sending one or more activations for one or more portions of one or more video applications. An exemplary implementation may include one or more of the activation sending modules 712 of FIG. 19D directing transmission of activation related information such as sending one or more activations for one or more portions of one or more video applications such as sending from the extra-e-paper application unit 408 of FIG. 17 via the extra-intra information flow 108 of FIG. 1 an activation of the video application 176i found in the application memory 176 of FIG. 6 of the e-paper 102 of FIG. 20.

For instance, in some implementations, the exemplary operation O12 may include the operation of O1213 for sending one or more activations for one or more portions of one or more audio-video applications. An exemplary implementation may include one or more of the activation sending modules 713 of FIG. 19D directing transmission of activation related information such as sending one or more activations for one or more portions of one or more audio-video applications such as sending from the extra-e-paper application unit 408 of FIG. 17 via the extra-intra information flow 108 of FIG. 1 an activation of the audio-video application 176j found in the application memory 176 of FIG. 6 of the e-paper 102 of FIG. 20.

For instance, in some implementations, the exemplary operation O12 may include the operation of O1214 for sending one or more activations for one or more portions of one or more game applications. An exemplary implementation may include one or more of the activation sending modules 714 of FIG. 19D directing transmission of activation related information such as sending one or more activations for one or more portions of one or more game applications such as sending from the extra-e-paper application unit 408 of FIG. 17 via the extra-intra information flow 108 of FIG. 1 an activation of the game application 176k found in the application memory 176 of FIG. 6 of the e-paper 102 of FIG. 20.

For instance, in some implementations, the exemplary operation O12 may include the operation of O1215 for sending one or more activations for one or more portions of one or more web browser applications. An exemplary implementation may include one or more of the activation sending modules 715 of FIG. 19D directing transmission of activation related information such as sending one or more activations for one or more portions of one or more web browser applications such as sending from the extra-e-paper application unit 408 of FIG. 17 via the extra-intra information flow 108 of FIG. 1 an activation of the web browser application 176*l* found in the application memory 176 of FIG. 6 of the e-paper 102 of FIG. 20.

FIG. 54

Figure 54:
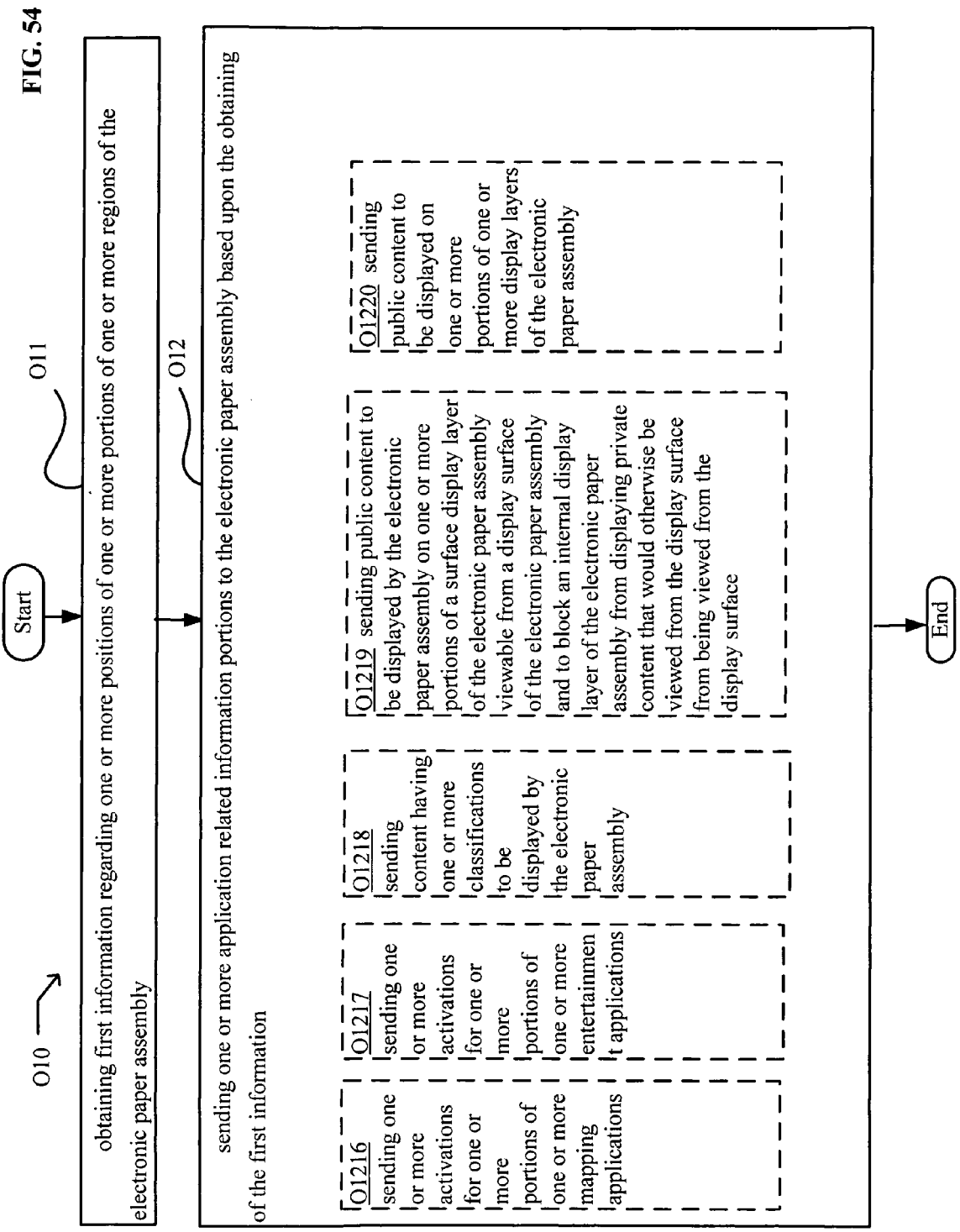
FIG. 54 is a high-level flowchart including an exemplary implementation of operation O11 of FIG. 34.

FIG. 54 illustrates various implementations of the exemplary operation O12 of FIG. 34. In particular, FIG. 54 illustrates example implementations where the operation O12 includes one or more additional operations including, for example, operations O1216, O1217, O1218, O1219, and/or O1220.

For instance, in some implementations, the exemplary operation O12 may include the operation of O1216 for sending one or more activations for one or more portions of one or more mapping applications. An exemplary implementation may include one or more of the activation sending modules 716 of FIG. 19D directing transmission of activation related information such as sending one or more activations for one or more portions of one or more mapping applications such as sending from the extra-e-paper application unit 408 of FIG. 17 via the extra-intra information flow 108 of FIG. 1 an activation of the mapping application 176*m* found in the application memory 176 of FIG. 6 of the e-paper 102 of FIG. 20.

For instance, in some implementations, the exemplary operation O12 may include the operation of O1217 for sending one or more activations for one or more portions of one or more entertainment applications. An exemplary implementation may include one or more of the activation sending modules 717 of FIG. 19D directing transmission of activation related information such as sending one or more activations for one or more portions of one or more entertainment applications such as sending from the extra-e-paper application unit 408 of FIG. 17 via the extra-intra information flow 108 of FIG. 1 an activation of the entertainment application 176*n* found in the application memory 176 of FIG. 6 of the e-paper 102 of FIG. 20.

For instance, in some implementations, the exemplary operation O12 may include the operation of O1218 for sending content having one or more classifications to be displayed by the electronic paper assembly. An exemplary implementation may include one or more of the content sending modules 718 of FIG. 19D directing transmission of content related information such as sending content having one or more classifications to be displayed by the electronic paper assembly such as sending content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

For instance, in some implementations, the exemplary operation O12 may include the operation of O1219 for sending public content to be displayed by the electronic paper assembly on one or more portions of a surface display layer of the electronic paper assembly viewable from a display surface of the electronic paper assembly and to block an internal display layer of the electronic paper assembly from displaying private content that would otherwise be viewed from the display surface from being viewed from the display surface. An exemplary implementation may include one or more of the content sending modules 719 of FIG. 19D directing transmission of content related information such as sending public content to be displayed by the electronic paper assembly on one or more portions of a surface display layer of the electronic paper assembly viewable from a display surface of the electronic paper assembly and to block an internal display layer of the electronic paper assembly from displaying private content that would otherwise be viewed from the display surface from being viewed from the display surface such as sending public content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

For instance, in some implementations, the exemplary operation O12 may include the operation of O1220 for sending public content to be displayed on one or more portions of one or more display layers of the electronic paper assembly. An exemplary implementation may include one or more of the content sending modules 720 of FIG. 19D directing transmission of content related information such as sending public content to be displayed on one or more portions of one or more display layers of the electronic paper assembly such as sending public content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

FIG. 55

Figure 55:
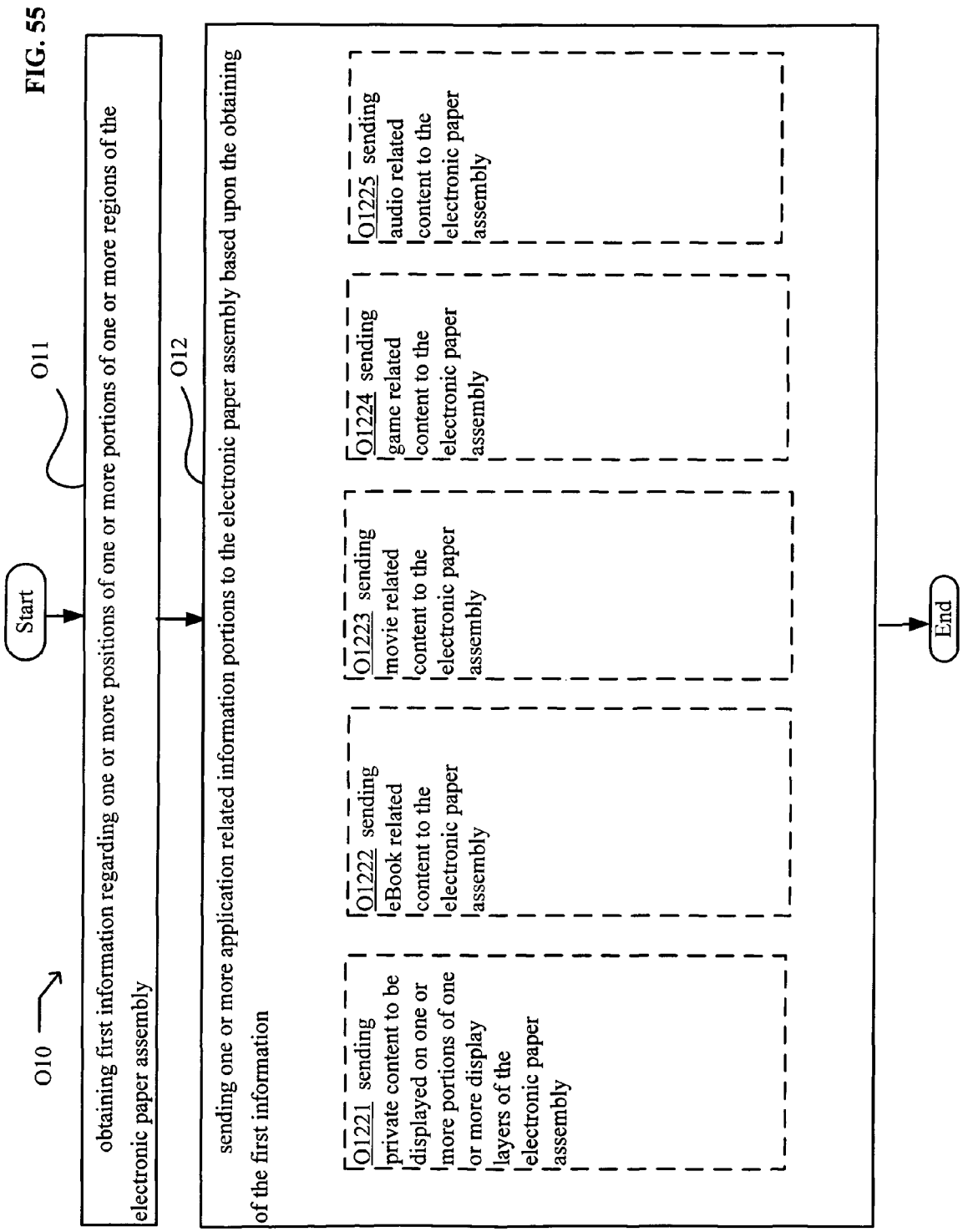
FIG. 55 is a high-level flowchart including an exemplary implementation of operation O11 of FIG. 34.

FIG. 55 illustrates various implementations of the exemplary operation O12 of FIG. 34. In particular, FIG. 55 illustrates example implementations where the operation O12 includes one or more additional operations including, for example, operations O1221, O1222, O1223, O1224, and/or O1225.

For instance, in some implementations, the exemplary operation O12 may include the operation of O1221 for sending private content to be displayed on one or more portions of one or more display layers of the electronic paper assembly. An exemplary implementation may include one or more of the content sending modules 721 of FIG. 19D directing transmission of content related information such as sending private content to be displayed on one or more portions of one or more display layers of the electronic paper assembly such as sending private content from the extra-e-paper content unit 402 of FIG. 14 via the extra-intra information flow 108 of FIG. 1 to the be displayed in one or more of the regions 604 of the exemplary implementation 602 of the e-paper 102 of FIG. 20 on the display layers 608 of FIG. 19.

For instance, in some implementations, the exemplary operation O12 may include the operation of O1222 for sending eBook related content to the electronic paper assembly. An exemplary implementation may include one or more of the content sending modules 722 of FIG. 19D directing transmission of content related information such as sending eBook related content to the electronic paper assembly such as sending the eBook related content 436*a* of the content memory 436 of the extra-e-paper content unit 402 of FIG. 14 to the e-paper 102 of FIG. 20 via the extra-intra information flow 108 of FIG. 1.

For instance, in some implementations, the exemplary operation O12 may include the operation of O1223 for sending movie related content to the electronic paper assembly. An exemplary implementation may include one or more of the content sending modules 723 of FIG. 19D directing transmission of content related information such as sending movie related content to the electronic paper assembly such as sending the movie related content 436*b* of the content memory 436 of the extra-e-paper content unit 402 of FIG. 14 to the e-paper 102 of FIG. 20 via the extra-intra information flow 108 of FIG. 1.

For instance, in some implementations, the exemplary operation O12 may include the operation of O1224 for sending game related content to the electronic paper assembly. An exemplary implementation may include one or more of the content sending modules 724 of FIG. 19D directing transmission of content related information such as sending game related content to the electronic paper assembly such as sending the game related content 436*c* of the content memory 436 of the extra-e-paper content unit 402 of FIG. 14 to the e-paper 102 of FIG. 20 via the extra-intra information flow 108 of FIG. 1.

For instance, in some implementations, the exemplary operation O12 may include the operation of O1225 for sending audio related content to the electronic paper assembly. An exemplary implementation may include one or more of the content sending module 725 of FIG. 19D directing transmission of content related information such as sending audio related content to the electronic paper assembly such as sending the audio related content 436*d* of the content memory 436 of the extra-e-paper content unit 402 of FIG. 14 to the e-paper 102 of FIG. 20 via the extra-intra information flow 108 of FIG. 1.

FIG. 56

Figure 56:
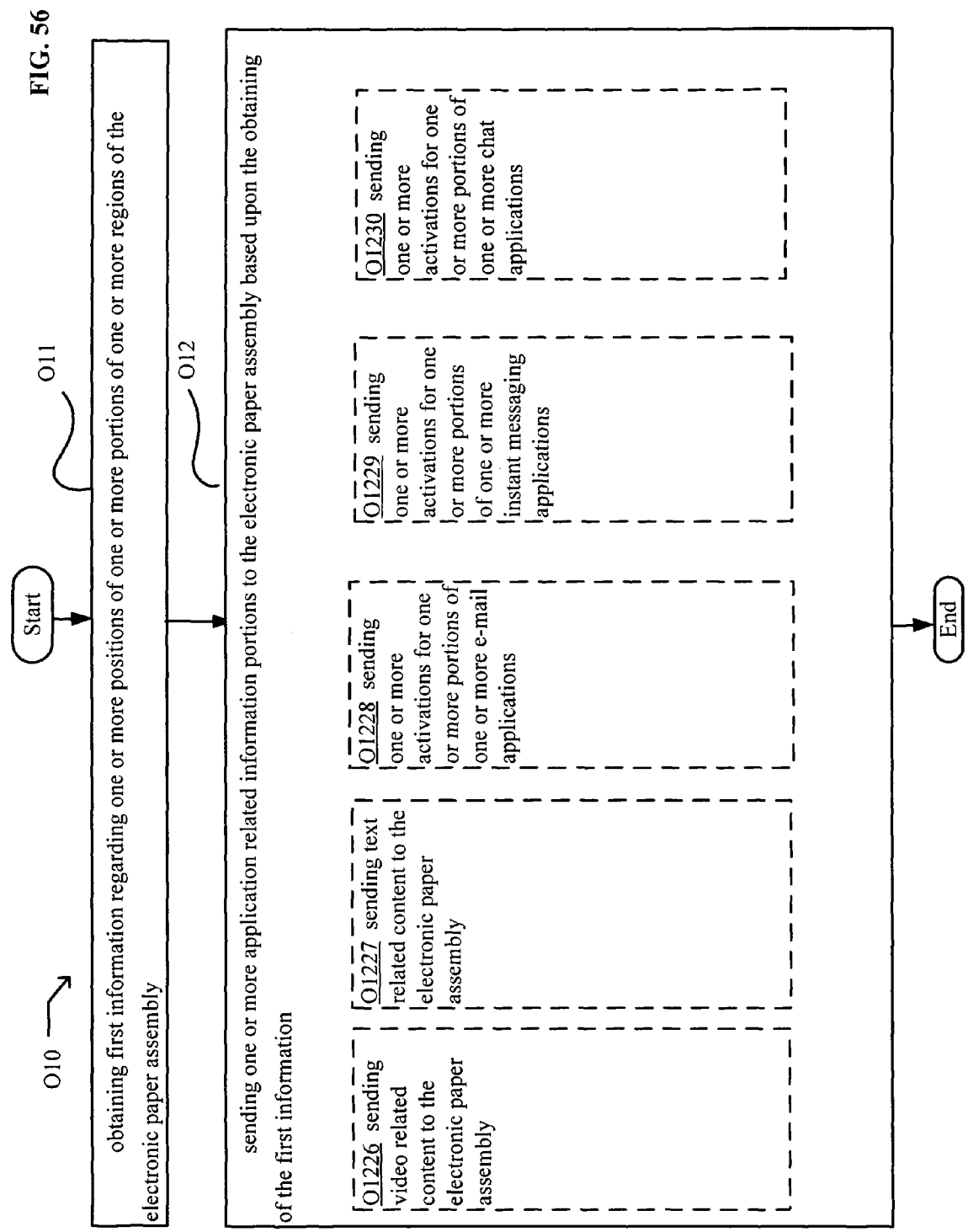
FIG. 56 is a high-level flowchart including an exemplary implementation of operation O11 of FIG. 34.

FIG. 56 illustrates various implementations of the exemplary operation O12 of FIG. 34. In particular, FIG. 56 illustrates example implementations where the operation O12 includes one or more additional operations including, for example, operations O1226, O1227, O1228, O1229, and/or O1230.

For instance, in some implementations, the exemplary operation O12 may include the operation of O1226 for sending video related content to the electronic paper assembly. An exemplary implementation may include one or more of the content sending modules 726 of FIG. 19D directing transmission of content related information such as sending video related content to the electronic paper assembly such as sending the video related content 436*e* of the content memory 436 of the extra-e-paper content unit 402 of FIG. 14 to the e-paper 102 of FIG. 20 via the extra-intra information flow 108 of FIG. 1.

For instance, in some implementations, the exemplary operation O12 may include the operation of O1227 for sending text related content to the electronic paper assembly. An exemplary implementation may include one or more of the content sending modules 727 of FIG. 19D directing transmission of content related information such as sending text related content to the electronic paper assembly such as sending the text related content 436*f* of the content memory 436 of the extra-e-paper content unit 402 of FIG. 14 to the e-paper 102 of FIG. 20 via the extra-intra information flow 108 of FIG. 1.

For instance, in some implementations, the exemplary operation O12 may include the operation of O1228 for sending one or more activations for one or more portions of one or more e-mail applications. An exemplary implementation may include one or more of the activation sending modules 728 of FIG. 19D directing transmission of activation related information such as sending one or more activations for one or more portions of one or more e-mail applications such as sending from the extra-e-paper application unit 408 of FIG. 17 via the extra-intra information flow 108 of FIG. 1 an activation of the e-mail application 176*o* found in the application memory 176 of FIG. 6 of the e-paper 102 of FIG. 20.

For instance, in some implementations, the exemplary operation O12 may include the operation of O1229 for sending one or more activations for one or more portions of one or more instant messaging applications. An exemplary implementation may include one or more of the activation sending modules 729 of FIG. 19D directing transmission of activation related information such as sending one or more activations for one or more portions of one or more instant messaging applications such as sending from the extra-e-paper application unit 408 of FIG. 17 via the extra-intra information flow 108 of FIG. 1 an activation of the instant messaging (IM) application 176*p* found in the application memory 176 of FIG. 6 of the e-paper 102 of FIG. 20.

For instance, in some implementations, the exemplary operation O12 may include the operation of O1230 for sending one or more activations for one or more portions of one or more chat applications. An exemplary implementation may include one or more of the activation sending modules 730 of FIG. 19D directing transmission of activation related information such as sending one or more activations for one or more portions of one or more chat applications such as sending from the extra-e-paper application unit 408 of FIG. 17 via the extra-intra information flow 108 of FIG. 1 an activation of the chat application 176*q* found in the application memory 176 of FIG. 6 of the e-paper 102 of FIG. 20.

FIG. 57

Figure 57:
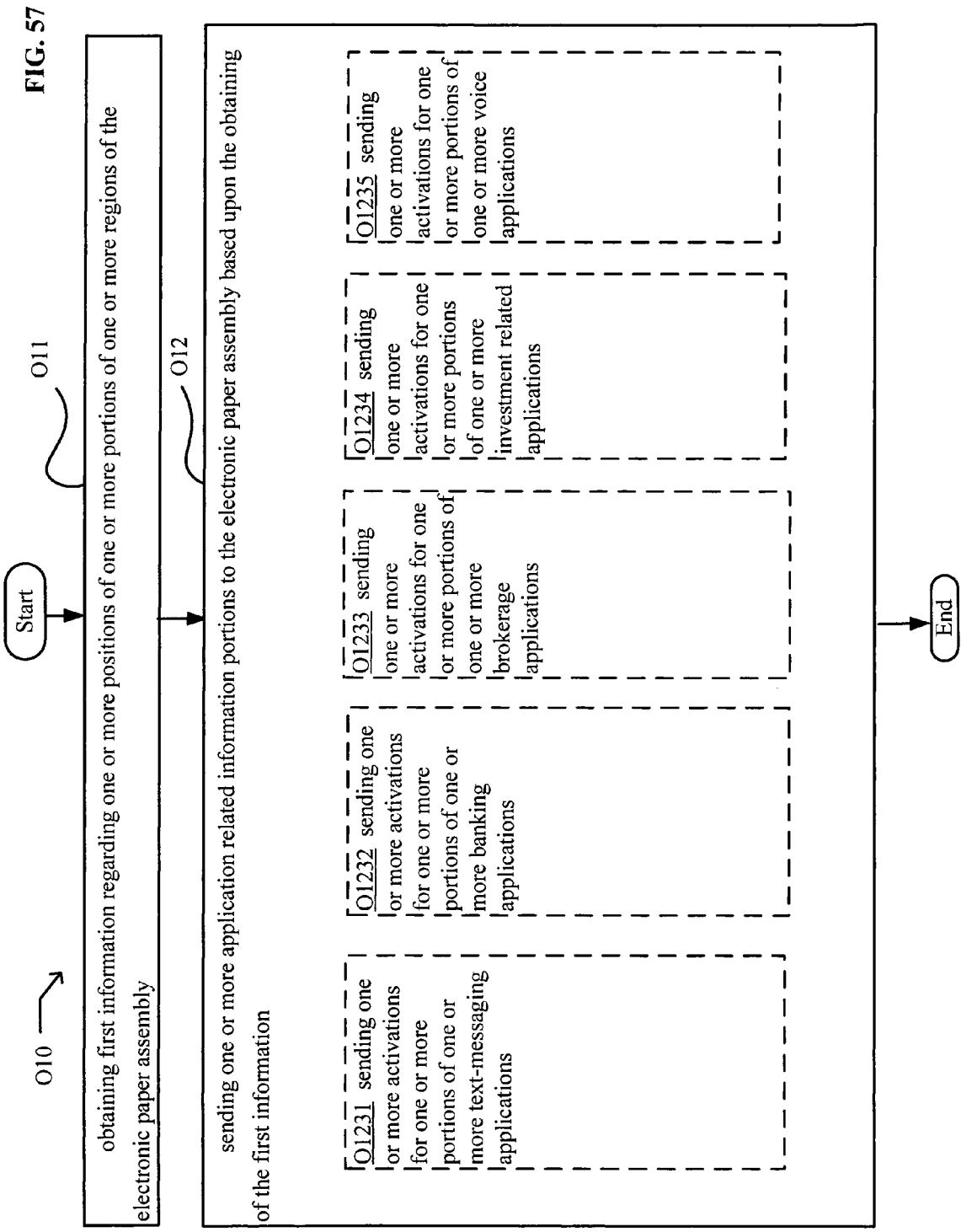
FIG. 57 is a high-level flowchart including an exemplary implementation of operation O11 of FIG. 34.

FIG. 57 illustrates various implementations of the exemplary operation O12 of FIG. 34. In particular, FIG. 57 illustrates example implementations where the operation O12 includes one or more additional operations including, for example, operations O1231, O1232, O1233, O1234, and/or O1235.

For instance, in some implementations, the exemplary operation O12 may include the operation of O1231 for sending one or more activations for one or more portions of one or more text-messaging applications. An exemplary implementation may include one or more of the activation sending modules 731 of FIG. 19D directing transmission of activation related information such as sending one or more activations for one or more portions of one or more text-messaging applications such as sending from the extra-e-paper application unit 408 of FIG. 17 via the extra-intra information flow 108 of FIG. 1 an activation of the text-messaging application 176*r* found in the application memory 176 of FIG. 6 of the e-paper 102 of FIG. 20.

For instance, in some implementations, the exemplary operation O12 may include the operation of O1232 for sending one or more activations for one or more portions of one or more banking applications. An exemplary implementation may include one or more of the activation sending modules 732 of FIG. 19D directing transmission of activation related information such as sending one or more activations for one or more portions of one or more banking applications such as sending from the extra-e-paper application unit 408 of FIG. 17 via the extra-intra information flow 108 of FIG. 1 an activation of the banking application 176*s* found in the application memory 176 of FIG. 6 of the e-paper 102 of FIG. 20.

For instance, in some implementations, the exemplary operation O12 may include the operation of O1233 for sending one or more activations for one or more portions of one or more brokerage applications. An exemplary implementation may include one or more of the activation sending modules 733 of FIG. 19D directing transmission of activation related information such as sending one or more activations for one or more portions of one or more brokerage applications such as sending from the extra-e-paper application unit 408 of FIG. 17 via the extra-intra information flow 108 of FIG. 1 an activation of the brokerage application 176*t* found in the application memory 176 of FIG. 6 of the e-paper 102 of FIG. 20.

For instance, in some implementations, the exemplary operation O12 may include the operation of O1234 for sending one or more activations for one or more portions of one or more investment related applications. An exemplary implementation may include one or more of the activation sending modules 734 of FIG. 19D directing transmission of activation related information such as sending one or more activations for one or more portions of one or more investment related applications such as sending from the extra-e-paper application unit 408 of FIG. 17 via the extra-intra information flow 108 of FIG. 1 an activation of the investment related application 176*u* found in the application memory 176 of FIG. 6 of the e-paper 102 of FIG. 20.

For instance, in some implementations, the exemplary operation O12 may include the operation of O1235 for sending one or more activations for one or more portions of one or more voice applications. An exemplary implementation may include one or more of the activation sending modules 735 of FIG. 19D directing transmission of activation related information such as sending one or more activations for one or more portions of one or more voice applications such as sending from the extra-e-paper application unit 408 of FIG. 17 via the extra-intra information flow 108 of FIG. 1 an activation of the voice application 176*v* found in the application memory 176 of FIG. 6 of the e-paper 102 of FIG. 20.

FIG. 58

Figure 58:
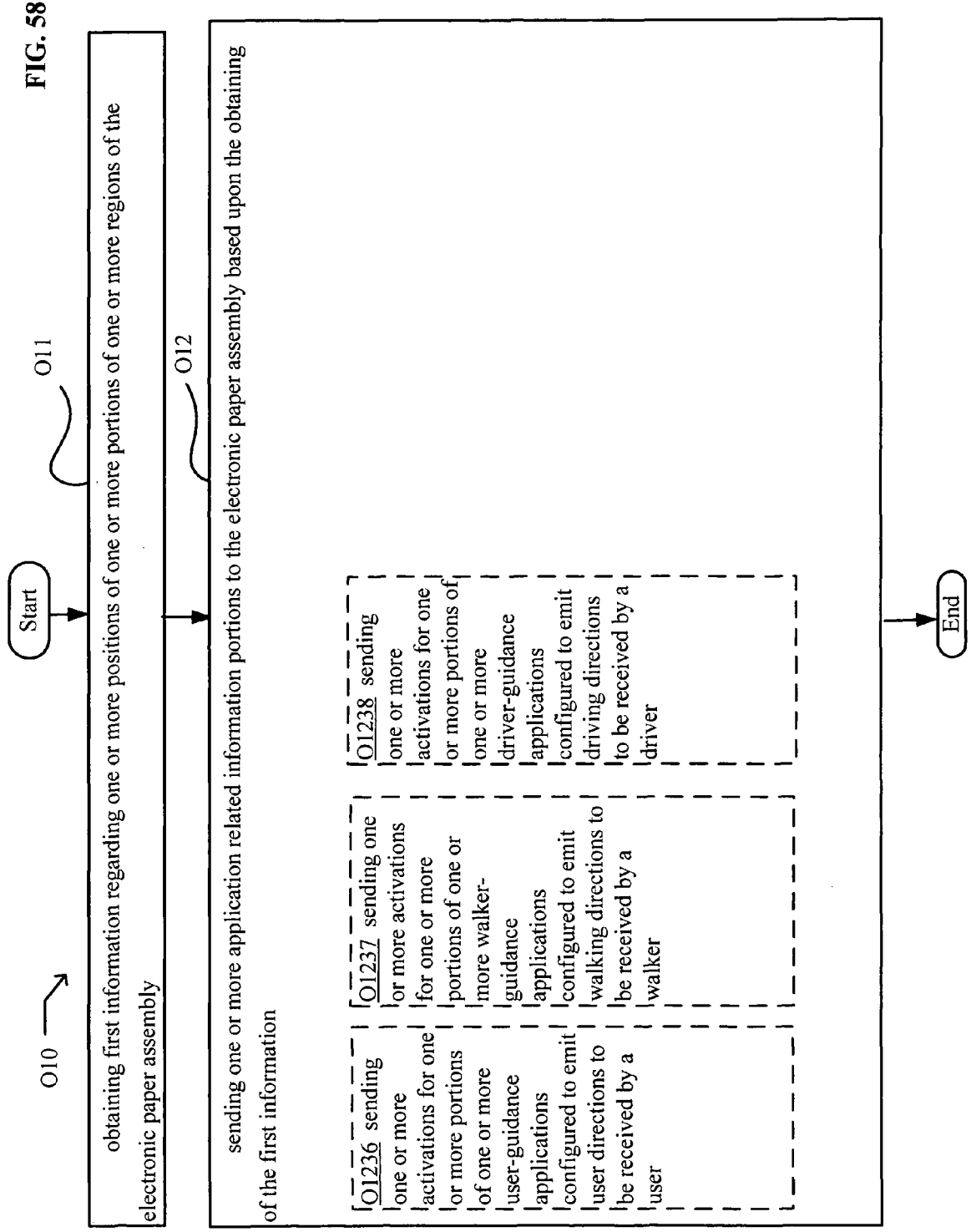
FIG. 58 is a high-level flowchart including an exemplary implementation of operation O11 of FIG. 34.

FIG. 58 illustrates various implementations of the exemplary operation O12 of FIG. 34. In particular, FIG. 58 illustrates example implementations where the operation O12 includes one or more additional operations including, for example, operations O1236, O1237, and/or O1238.

For instance, in some implementations, the exemplary operation O12 may include the operation of O1236 for sending one or more activations for one or more portions of one or more user-guidance applications configured to emit user directions to be received by a user. An exemplary implementation may include one or more of the activation sending modules 736 of FIG. 19D directing transmission of activation related information such as sending one or more activations for one or more portions of one or more user-guidance applications configured to emit user directions to be received by a user such as sending from the extra-e-paper application unit 408 of FIG. 17 via the extra-intra information flow 108 of FIG. 1 an activation of the user-guidance application 176*w* found in the application memory 176 of FIG. 6 of the e-paper 102 of FIG. 20.

For instance, in some implementations, the exemplary operation O12 may include the operation of O1237 for sending one or more activations for one or more portions of one or more walker-guidance applications configured to emit walking directions to be received by a walker. An exemplary implementation may include one or more of the activation sending modules 737 of FIG. 19D directing transmission of activation related information such as sending one or more activations for one or more portions of one or more walker-guidance applications configured to emit walking directions to be received by a walker such as sending from the extra-e-paper application unit 408 of FIG. 17 via the extra-intra information flow 108 of FIG. 1 an activation of the walker-guidance application 176*x* found in the application memory 176 of FIG. 6 of the e-paper 102 of FIG. 20.

For instance, in some implementations, the exemplary operation O12 may include the operation of O1238 for sending one or more activations for one or more portions of one or more driver-guidance applications configured to emit driving directions to be received by a driver. An exemplary implementation may include one or more of the activation sending modules 738 of FIG. 19D directing transmission of activation related information such as sending one or more activations for one or more portions of one or more driver-guidance applications configured to emit driving directions to be received by a driver such as sending from the extra-e-paper application unit 408 of FIG. 17 via the extra-intra information flow 108 of FIG. 1 an activation of the driver-guidance application 176*y* found in the application memory 176 of FIG. 6 of the e-paper 102 of FIG. 20.

FIG. 59

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Figure 59:
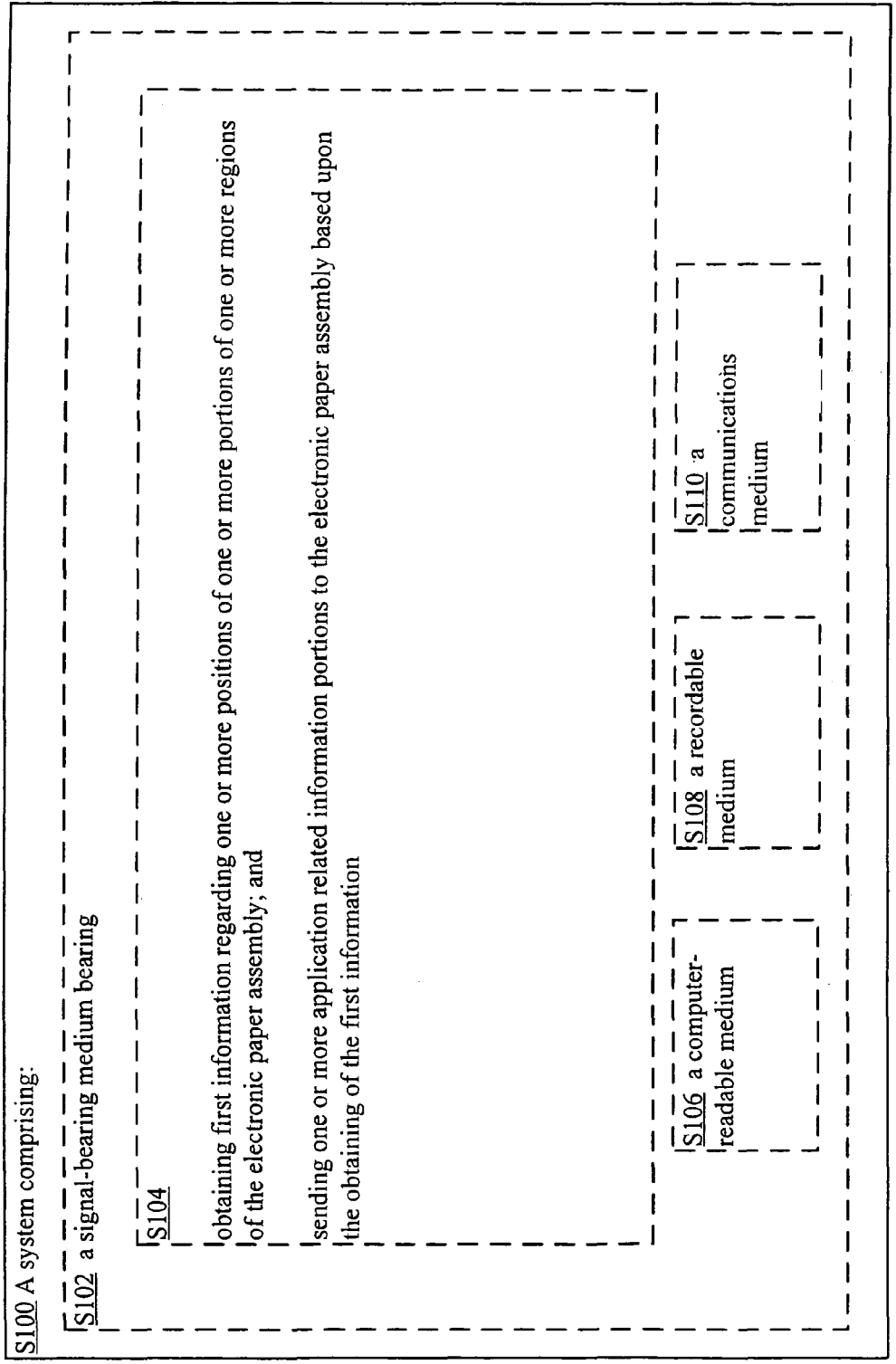
FIG. 59 illustrates a partial view of a system S100 that includes a computer program for executing a computer process on a computing device.

A partial view of a system S100 is shown in FIG. 59 that includes a computer program S104 for executing a computer process on a computing device. An implementation of the system S100 is provided using a signal-bearing medium S102 bearing one or more instructions for obtaining first information regarding one or more positions of one or more portions of one or more regions of the electronic paper assembly. An exemplary implementation may be, executed by, for example, the extra-e-paper assembly 104 obtaining first information through the intra-extra information flow 106 and the extra-intra information flow 108 from the sensor unit 114 of the e-paper 102 of FIG. 2 and/or acquisition of the first information may be directed by one or more position obtaining modules 501 of FIG. 19A. An exemplary implementation may include obtaining (e.g. obtaining may be performed through one or more of the sensors 614 (see FIG. 23) as exemplary implementations of the sensor 144 (see FIG. 4)) information regarding one or more positions of one or more portions of one or more regions of the e-paper 102 (e.g. a position may involve the angle of bend 624 (see FIG. 23) of the exemplary implementation 602 of the e-paper 102 in which the one or more positions may be relative or another reference or an absolute position. The one or more of the sensors 614 as exemplary implementations of the sensor 144 may relay the information about the first information through the sensor interface 146 (see FIG. 4) to be communicated from the e-paper 102 through the intra-extra information flow 106 to the communication unit 410 of FIG. 18 of the to the extra-e-paper assembly 104 of FIG. 1.

The implementation of the system S100 is also provided using the signal-bearing medium S102 bearing one or more instructions for sending one or more application related information portions to the electronic paper assembly based upon the obtaining of the first information. An exemplary implementation may be executed by the application information sending module 578 and/or, for example, the communication unit of FIG. 410 of FIG. 18 of the extra-e-paper application unit 408 of FIG. 17 sending from the communication memory 484 of FIG. 18 via the extra-intra information flow 108 of FIG. 1 an activation of one or more portions of the video application 176*i* found in the application memory 176 of FIG. 6 of the e-paper 102 of FIG. 20.

The one or more instructions may be, for example, computer executable and/or logic-implemented instructions. In some implementations, the signal-bearing medium S102 may include a computer-readable medium S106. In some implementations, the signal-bearing medium S102 may include a recordable medium S108. In some implementations, the signal-bearing medium S102 may include a communication medium S110.

Those having ordinary skill in the art will recognize that the state of the art has progressed to the point where there is little distinction left between hardware and software implementations of aspects of systems; the use of hardware or software is generally (but not always, in that in certain contexts the choice between hardware and software may become significant) a design choice representing cost vs. efficiency tradeoffs. Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which may be implemented, individually and/or collectively, by a wide range of hardware, software, firmware, or any combination thereof may be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those of ordinary skill in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

What is claimed is:

1. A system comprising:
   one or more obtaining modules configured for obtaining first information associated with one or more conformations of one or more portions of at least one electronic paper assembly that includes two or more display layers; and
   one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content.

2. The system of claim 1, wherein the one or more obtaining modules configured for obtaining first information associated with one or more conformations of one or more portions of at least one electronic paper assembly that includes two or more display layers comprises:
   one or more obtaining modules configured for obtaining strain information associated with one or more conformations of one or more portions of at least one electronic paper assembly that includes two or more display layers.

3. The system of claim 1, wherein the one or more obtaining modules configured for obtaining first information associated with one or more conformations of one or more portions of at least one electronic paper assembly that includes two or more display layers comprises:
   one or more obtaining modules configured for obtaining pattern information associated with one or more conformations of one or more portions of at least one electronic paper assembly that includes two or more display layers.

4. The system of claim 1, wherein the one or more obtaining modules configured for obtaining first information associated with one or more conformations of one or more portions of at least one electronic paper assembly that includes two or more display layers comprises:
   one or more obtaining modules configured for obtaining geometrical information associated with one or more conformations of one or more portions of at least one electronic paper assembly that includes two or more display layers.

5. The system of claim 1, wherein the one or more obtaining modules configured for obtaining first information associated with one or more conformations of one or more portions of at least one electronic paper assembly that includes two or more display layers comprises:
   one or more obtaining modules configured for obtaining optical fiber derived information associated with one or more conformations of one or more portions of at least one electronic paper assembly that includes two or more display layers.

6. The system of claim 1, wherein the one or more obtaining modules configured for obtaining first information associated with one or more conformations of one or more portions of at least one electronic paper assembly that includes two or more display layers comprises:

one or more obtaining modules configured for obtaining position information associated with one or more conformations of one or more portions of at least one electronic paper assembly that includes two or more display layers.

7. The system of claim 1, wherein the one or more obtaining modules configured for obtaining first information associated with one or more conformations of one or more portions of at least one electronic paper assembly that includes two or more display layers comprises:

one or more obtaining modules configured for obtaining origami-like information associated with one or more conformations of one or more portions of at least one electronic paper assembly that includes two or more display layers.

8. The system of claim 1, wherein the one or more obtaining modules configured for obtaining first information associated with one or more conformations of one or more portions of at least one electronic paper assembly that includes two or more display layers comprises:

one or more obtaining modules configured for obtaining angle information associated with one or more conformations of one or more portions of at least one electronic paper assembly that includes two or more display layers.

9. The system of claim 1, wherein the one or more obtaining modules configured for obtaining first information associated with one or more conformations of one or more portions of at least one electronic paper assembly that includes two or more display layers comprises:

one or more obtaining modules configured for obtaining sequence information associated with one or more conformations of one or more portions of at least one electronic paper assembly that includes two or more display layers.

10. The system of claim 1, wherein the one or more obtaining modules configured for obtaining first information associated with one or more conformations of one or more portions of at least one electronic paper assembly that includes two or more display layers comprises:

one or more obtaining modules configured for obtaining bend information associated with one or more conformations of one or more portions of at least one electronic paper assembly that includes two or more display layers.

11. The system of claim 1, wherein the one or more obtaining modules configured for obtaining first information associated with one or more conformations of one or more portions of at least one electronic paper assembly that includes two or more display layers comprises:

one or more obtaining modules configured for obtaining edge information associated with one or more conformations of one or more portions of at least one electronic paper assembly that includes two or more display layers.

12. The system of claim 1, wherein the one or more obtaining modules configured for obtaining first information associated with one or more conformations of one or more portions of at least one electronic paper assembly that includes two or more display layers comprises:

one or more obtaining modules configured for obtaining gyroscopic information associated with one or more conformations of one or more portions of at least one electronic paper assembly that includes two or more display layers.

13. The system of claim 1, wherein the one or more obtaining modules configured for obtaining first information associated with one or more conformations of one or more portions of at least one electronic paper assembly that includes two or more display layers comprises:

one or more obtaining modules configured for obtaining geographical information associated with one or more conformations of one or more portions of at least one electronic paper assembly that includes two or more display layers.

14. The system of claim 1, wherein the one or more obtaining modules configured for obtaining first information associated with one or more conformations of one or more portions of at least one electronic paper assembly that includes two or more display layers comprises:

one or more obtaining modules configured for obtaining GPS information associated with one or more conformations of one or more portions of at least one electronic paper assembly that includes two or more display layers.

15. The system of claim 1, wherein the one or more obtaining modules configured for obtaining first information associated with one or more conformations of one or more portions of at least one electronic paper assembly that includes two or more display layers comprises:

one or more obtaining modules configured for obtaining triangulation information associated with one or more conformations of one or more portions of at least one electronic paper assembly that includes two or more display layers.

16. The system of claim 1, wherein the one or more obtaining modules configured for obtaining first information associated with one or more conformations of one or more portions of at least one electronic paper assembly that includes two or more display layers comprises:

one or more obtaining modules configured for obtaining map location information associated with one or more conformations of one or more portions of at least one electronic paper assembly that includes two or more display layers.

17. The system of claim 1, wherein the one or more obtaining modules configured for obtaining first information associated with one or more conformations of one or more portions of at least one electronic paper assembly that includes two or more display layers comprises:

one or more obtaining modules configured for obtaining first information associated with one or more flexures of one or more portions of at least one electronic paper assembly that includes two or more display layers.

18. The system of claim 1, wherein the one or more obtaining modules configured for obtaining first information associated with one or more conformations of one or more portions of at least one electronic paper assembly that includes two or more display layers comprises:

one or more obtaining modules configured for obtaining sequence information associated with two or more conformations of one or more portions of at least one electronic paper assembly that includes two or more display layers.

19. The system of claim 1, wherein the one or more obtaining modules configured for obtaining first information associated with one or more conformations of one or more portions of at least one electronic paper assembly that includes two or more display layers comprises:

one or more obtaining modules configured for obtaining orientation information associated with one or more conformations of one or more portions of at least one electronic paper assembly that includes two or more display layers.

20. The system of claim 1, wherein the one or more obtaining modules configured for obtaining first information associated with one or more conformations of one or more portions of at least one electronic paper assembly that includes two or more display layers comprises:
- one or more obtaining modules configured for obtaining change information associated with one or more conformations of one or more portions of at least one electronic paper assembly that includes two or more display layers.

21. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
- one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, signaling to enable at least some television functionality and identifying at least one of the two or more display layers of the at least one electronic paper assembly for display of content.

22. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
- one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, signaling to enable at least some eBook functionality and identifying at least one of the two or more display layers of the at least one electronic paper assembly for display of content.

23. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
- one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, signaling to enable at least some audio functionality and identifying at least one of the two or more display layers of the at least one electronic paper assembly for display of content.

24. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
- one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, signaling to enable at least some game functionality and identifying at least one of the two or more display layers of the at least one electronic paper assembly for display of content.

25. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:

one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of public content.

26. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
   one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of movie-related content.

27. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
   one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of video content.

28. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
   one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, signaling to enable at least some instant message functionality and identifying at least one of the two or more display layers of the at least one electronic paper assembly for display of content.

29. The system of claim 1, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:
   one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, signaling to enable at least some walker guidance functionality and identifying at least one of the two or more display layers of the at least one electronic paper assembly for display of content.

30. The system of claim 1, wherein the one or more obtaining modules configured for obtaining first information associated with one or more conformations of one or more portions of at least one electronic paper assembly that includes two or more display layers comprises:
   one or more obtaining modules configured for obtaining first information associated with one or more conformations of one or more portions of at least one electronic paper assembly that includes two or more at least partially overlapping display layers.

31. The system of claim 30, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content comprises:

one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined flexure and, if the first information associated with one or more conformations of one or more portions of the at least one electronic paper assembly is indicative of at least one predetermined flexure, identifying at least one outside display layer of the two or more display layers of the at least one electronic paper assembly for display of content.

32. The system of claim 31, wherein the one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined flexure and, if the first information associated with one or more conformations of one or more portions of the at least one electronic paper assembly is indicative of at least one predetermined flexure, identifying at least one outside display layer of the two or more display layers of the at least one electronic paper assembly for display of content comprises:

one or more processing modules configured for processing the first information associated with one or more conformations of one or more portions of the at least one electronic paper assembly including determining whether the first information associated with one or more conformations of one or more portions of the at least one electronic paper assembly is indicative of at least one predetermined flexure and, if the first information associated with one or more conformations of one or more portions of the at least one electronic paper assembly is indicative of at least one predetermined flexure, identifying at least one outside display layer of the two or more display layers of the at least one electronic paper assembly for display of first content and identifying at least one inside display layer of the two or more display layers of the at least one electronic paper assembly for display of second content.

33. A system comprising:

circuitry configured for obtaining first information associated with one or more conformations of one or more portions of at least one electronic paper assembly that includes two or more display layers; and circuitry configured for processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content.

34. A method comprising:

obtaining first information associated with one or more conformations of one or more portions of at least one electronic paper assembly that includes two or more display layers; and processing the first information associated with one or more conformations of one or more portions of the at least one electronic paper assembly including determining whether the first information associated with one or more conformations of one or more portions of the at least one electronic paper assembly is indicative of at least one predetermined value and, if the first information associated with one or more conformations of one or more portions of the at least one electronic paper assembly is indicative of at least one predetermined value, identifying at least one of the two or more display layers of the at least one electronic paper assembly for display of content.

* * * * *